United States Patent [19]

Bahn

[11] Patent Number: 5,406,184

[45] Date of Patent: Apr. 11, 1995

[54] HIGH-SPEED PLURAL-PHASE RELUCTANCE TYPE MOTOR INCLUDING A PLURALITY OF SEMICONDUCTOR SWITCHING ELEMENTS EACH REPECTIVELY CONNECTED TO ONE OF A PLURALITY OF ARMATURE COILS FOR QUICKLY REDUCING OR BUILDING UP EXCITING CURRENT

[75] Inventor: Itsuki Bahn, Tokyo, Japan

[73] Assignee: Kabushikigaisha Sekogiken, Shibuya, Japan

[21] Appl. No.: 81,377

[22] PCT Filed: Oct. 9, 1992

[86] PCT No.: PCT/JP92/01319

§ 371 Date: Jun. 28, 1993

§ 102(e) Date: Jun. 28, 1993

[87] PCT Pub. No.: WO93/09594

PCT Pub. Date: May 13, 1993

[30] Foreign Application Priority Data

Oct. 30, 1991 [JP] Japan .................. 3-347592
Nov. 5, 1991 [JP] Japan .................. 3-349347
Feb. 5, 1992 [JP] Japan .................. 4-064366

[51] Int. Cl.[6] ............................ H02P 5/38
[52] U.S. Cl. ...................... 318/701; 318/439
[58] Field of Search ......... 318/696, 685, 701, 439, 318/254, 138

[56] References Cited

U.S. PATENT DOCUMENTS 4,336,484  6/1982  Marinko ..................... 318/696
4,434,392  2/1984  Brasseur .................. 318/685 X
4,661,882  4/1987  Presley .................... 318/696 X

FOREIGN PATENT DOCUMENTS 1-194888  8/1989  Japan .
2-193590  7/1990  Japan .
3-3699    1/1991  Japan .

Primary Examiner—William M. Shoop, Jr.
Assistant Examiner—Brian Sircus
Attorney, Agent, or Firm—Staas & Halsey

[57] ABSTRACT

Armature current is maintained at a predetermined level by a chopper circuit, and part of the magnetic energy stored in magnetic cores of armature coils is transferred to a small-capacitance capacitor to be stored as an electrostatic energy in accordance with a chopper frequency when the armature coil is deactivated. The charged electrostatic energy is utilized to compensate energy loss such as iron loss and copper loss occurring when activation of the armature coils is switched so as to make the armature current build up quickly, thereby realizing a reluctance type motor capable of operating in a high-speed region with large torque. The above-described technical feature can be applied to a three-phase DC motor with a magnet rotor and a stepping motor in the same manner to obtain similar function and effect.

12 Claims, 30 Drawing Sheets

HIGH-SPEED PLURAL-PHASE RELUCTANCE TYPE MOTOR INCLUDING A PLURALITY OF SEMICONDUCTOR SWITCHING ELEMENTS EACH REPECTIVELY CONNECTED TO ONE OF A PLURALITY OF ARMATURE COILS FOR QUICKLY REDUCING OR BUILDING UP EXCITING CURRENT

BACKGROUND OF THE INVENTION

1. Field of the Invention

The present invention relates to a high-speed motor, such as brushless motors, reluctance type motors, stepping motors, and DC motors, which are required to be capable of rotating in a high speed region without causing fall of output torque.

2. Description of the Related Art

Conventionally, a reluctance type motor has so many disadvantages that few reluctance type motor have ever been practically utilized, regardless of its advantages such as large output torque and no need of magnet rotor. A utilization of a stepping motor, having a large output, is restricted only to a special purpose because of its slow stepping speed. Although high-speed DC or brushless motors have been available, they have never widely been used because of their low efficiency in a high-speed region.

The first problem of the motor according to the above-described conventional prior art lies in that it requires respective armature coils to be controlled by switching elements connected to both ends thereof for activating or deactivating these armature coils, necessitating to use a number of expensive power elements, which entails the increase of manufacturing cost.

Furthermore, switching elements provided at a positive terminal side of an electric power source require input electric signals to be supplied from another electric power source for controlling currents supplied to the armature coils, thereby contributing to the increase of manufacturing cost.

The second problem of a reluctance type motor rises from that it has a rotor equipped with numerous salient poles, thereby causing large inductance; this further causes increases of magnetic energy amount stored into or discharged from magnetic poles or salient poles and increase in repetition frequency of such energy storage and discharge during one complete revolution of the rotor, which eventually leads to a problem that the reluctance type motor is unable to rotate in a high-speed region regardless of its large output torque. Also, in the case of a DC motor, similar problem would occur if required to rotate at a higher speed. Here, a low speed should be referred to as around 300 r.p.m, and a high speed as around 20 thousands rpm.

The third problem rises from that, in the case of a motor having a large output, an extraordinarily large inductance of the armature coil will cause a slow building-up of exciting current at an initial stage of the current supply period, as well as from a slow trailing-edge at a terminating stage of the current supply period. The former will cause a lower output torque, and the latter a counter torque.

If power source voltage is increased in order to rapidly building up armature current in the initial stage of the current supply period, the armature current will build up sharply after the magnetic saturation point. This will cause vibrations and electric noises of the motor, thereby adding to the disadvantages coupled with the fact that the above-described building-up section of the armature current corresponds to a section where the torque is small.

In other words, the problem lies in that a high-speed rotation (i.e. several tens of thousands rpm) cannot be realized due to above-described fall of torque and occurrence of counter torque. Even if the rotational speed is reduced to a generally used speed region (i.e. several thousands rpm), a significant amount of torque fall and counter torque still occur, thereby causing the fall of the efficiency of a motor. A possible measure for increasing a rotational speed will require an electric power source voltage to be increased up to 1000 volts or more, which will lack in practical utility.

Finally, the fourth problem would be that a solution of the first problem by providing one switching element only at a negative terminal side of the armature coil may render the circuit configuration complicated, because an additional circuit will be required for reducing charge/discharge time of magnetic energy in the armature coil.

SUMMARY OF INVENTION

Accordingly, the present invention has a purpose of providing a high-speed motor having good efficiency and high torque in a high-speed region.

The above object is achieved by providing a high-speed plural-phase reluctance type motor with a fixed armature and a magnetic rotor. The motor includes a plurality of salient poles having the same width, disposed on an outer surface of the magnetic rotor and being equally spaced from each other at regular intervals of the same angle. The motor further includes 2n pieces of magnetic poles protruding from an inner peripheral surface of the fixed armature so as to confront the salient poles at a slight gap therebetween. The magnetic poles are symmetrically disposed at regular intervals and have between a 120 and 180 degree circumferential width in terms of electric angle, where two of the pieces of the magnetic poles are in-phase. The motor further includes 2n plural-phase armature coils each wound around each of the magnetic poles and a position detecting device for detecting rotational positions of the salient poles and generated corresponding plural-phase position detecting signals each having a signal width.

In addition, the motor includes a plurality of semiconductor switching elements, each respectively connected to one of the armature coils such that only one semiconductor switching element is connected to one armature coil, to control an activation and a deactivation of each of the respective armature coils. The motor also includes a first diode connected in a forward direction between a positive voltage side of one of the armature coils and one of the respective semiconductor switching elements, a DC electric power source supplying electric power to a serial joint unit including the first diode, the one semiconductor switching element, and the respective one armature coil, where the one semiconductor switching element is interposed between a positive terminal of the DC electric power source and the respective one armature coil.

The motor further includes a current supply control circuit, including the plurality of semiconductor switching elements, for supplying current to the plural-phase armature coils by turning on a corresponding one of the switching elements connected to a respective one of the armature coils, in response to the plural-phase position detecting signals by an amount of signal width of a corresponding position detecting signal, so as to obtain output torque. A first electric circuitry includes a second diode and a third diode for transferring magnetic energy stored in the one armature coil through the second diode into a small-capacitance capacitor from a connecting point of the respective semiconductor switching element and the one armature coil, and the capacitor holding the transferred magnetic energy therein to quickly reduce exciting current to the one armature coil when the respective semiconductor switching element is turned off at a terminal end of the one position detecting signal. A second electric circuitry discharges electrostatic energy stored in the small-capacitance capacitor through the one semiconductor switching element into the one armature coil from a connecting point of the first diode and the one semiconductor switching element to quickly build up exciting current at the time when the one armature coil is again activated in response to the one position detecting signal by the signal width of the position detecting signal after the magnetic rotor rotates a predetermined angle.

The high-speed motor may further include a detecting circuit for detecting excitation current of respective armature coils to obtain a current detection electric signal, and a chopper circuit for turning off the one semiconductor switching element when the detection electric signal exceeds a reference voltage so as to transfer a part of the magnetic energy stored in the respective one armature coil through the second diode to the small-capacitance capacitor, and for turning on the one semiconductor switching element after a predetermined time has elapsed, and for compensating energy loss where a part of magnetic energy of the armature coil is discharged into the small-capacitance capacitor for charging and storage in accordance with a chopper frequency used to compensate energy loss such as iron loss and copper loss occurring when magnetic energy transfers between armature coils.

According to the present invention, armature coils are activated in response to stepping electric signals or position detecting signals. When they are deactivated at terminal ends of the stepping electric signals or the position detecting signals, magnetic energy stored in the armature coils is discharged into a small-capacitance capacitor to charge it at a high voltage.

Accordingly, a time period required for extinguish magnetic energy becomes so short that no counter torque is generated. In response to the next position detecting signal arriving after a predetermined time has elapsed, current supply operation is initiated. In this case, a voltage value supplied to the armature coil becomes a summation of the charged voltage of said capacitor and the electric power source voltage. Therefore, building-up of armature current becomes sharp.

Accordingly, no torque reduction occurs. As can be understood from the foregoing explanation, according to the present invention, disadvantage of the reluctance type motor of not being able to rotate in a high speed region can be removed. Thus, the second and the third problems can be solved. Furthermore, providing the chopper circuit brings the following additional function and effect.

When current value of an armature coil exceeds a predetermined value, a switching element associated with this armature coil turns off, so that a part of magnetic energy stored in the armature coil is transferred into the small-capacitance capacitor as electrostatic energy.

Accordingly, electrostatic energy in proportion to chopper frequency is charged and held. Furthermore, magnetic energy is added to the small-capacitance capacitor when the armature coil is deactivated at the terminal end of the position detecting signal.

This electrostatic energy makes armature current of the next activated armature coil build up further quickly.

Although the increase of exciting current is braked at an intermediate portion of its building-up curve due to iron loss of magnetic poles and copper loss of armature coils occurring when magnetic energy transfers between armature coils, above-described countermeasure can make waveform of building-up current almost rectangular so as to overcome this problem. It is especially effective in the case where the electric power source voltage is low. Moreover, the number of expensive circuit components can be reduced to half, since only one switching element is provided on a negative terminal side of the electric power source for controlling activation of each armature coil. Still further, as the switching element is provided on the negative terminal side of the electric power source, circuit configuration of the current supply control circuit can be simplified. Accordingly, the first problem can be solved.

The number of the semiconductor elements provided in the discharge circuit of previously described small-capacitance capacitor can be smaller than that of armature coils; therefore, the forth problem can be resolved.

Furthermore, as the activation of each armature coil can be controlled by only one power element provided on a negative terminal side of the electric power source, an overall cost of the current supply control circuit can be reduced.

Furthermore, it becomes possible to obtain a motor capable of rotating at a high speed (approximately 100 thousands rpm) without causing torque reduction and counter torque. Thus high efficiency is obtained.

Moreover, when one armature coil is deactivated, the magnetic energy stored in this armature coil is converted into the electrostatic energy of the capacitor. The electrostatic energy is then converted into the magnetic energy of an armature coil to be next activated. Accordingly, by changing the capacitance of the capacitor, building-up and trailing-off of the armature current can be adjusted to a required rate. Thus, a motor having good efficiency in a high-speed region can be obtained.

Still further, the chopper circuit not only maintains armature current at a predetermined level but compensates copper losses of the armature coils and iron losses of the magnetic cores occurring when the magnetic energy transfers between the armature coils by using magnetic energy stored in the inductance coil. Therefore, it is possible to make building-up and trailing-off of the armature current remarkably sharp. Thus, a motor having large output torque in a high-speed region can be obtained. Moreover, it is possible to drive a motor by a low-voltage electric power source.

DETAILED DESCRIPTION OF THE PREFERRED EMBODIMENTS

Figure 1:
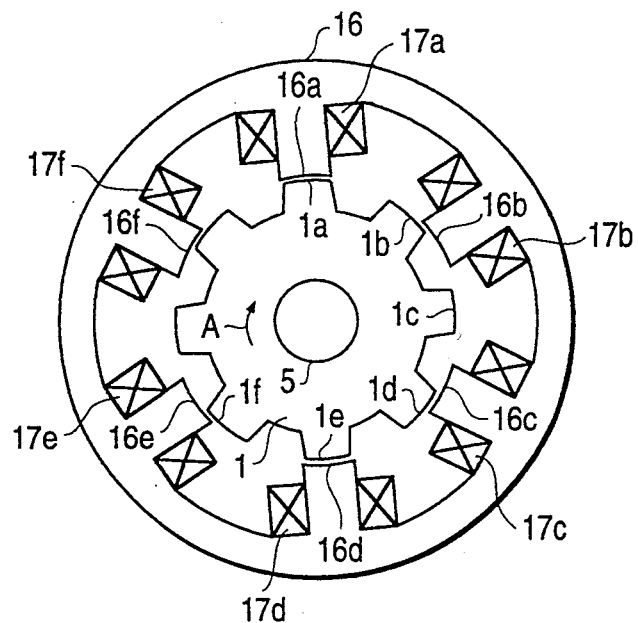
FIG. 1 (prior art) is a plane view showing a three-phase half-wave reluctance type motor in accordance with the present invention.

With reference to the drawing of FIG. 1 and the following drawings, preferred embodiments of the present invention will be explained. The same reference numerals in respective drawings denote the like component and thus will not be repeated in explanation. In the following explanation, all the angles are expressed in electric angles.

First, explanation will be made for a constitution of a three-phase half-wave reluctance type motor embodying the present invention. FIG. 1 is a plane view showing a fixed armature and a rotor.

In FIG. 1, reference numeral 1 represents a rotor which is equipped with a plurality of salient poles 1a–1h, having the same width of 180 degrees and mutually spaced at regular intervals of 360 degrees.

The rotor 1 is made from well-known laminated silicon steel sheets, and has a rotational shaft 5. A fixed armature 16 is provided with magnetic poles 16a, 16b, 16c, 16d, 16e and 16f, having the same width of 180 degrees and mutually spaced at regular intervals. The salient pole and the magnetic pole are formed to have the same 180-degree width. The number of the salient poles is eight, and the number of the magnetic poles is six. The armature 16 is also made in the same manner as the rotor 1. The magnetic poles 16a–16f are associated with armature coils 17a–17f.

Figure 3:
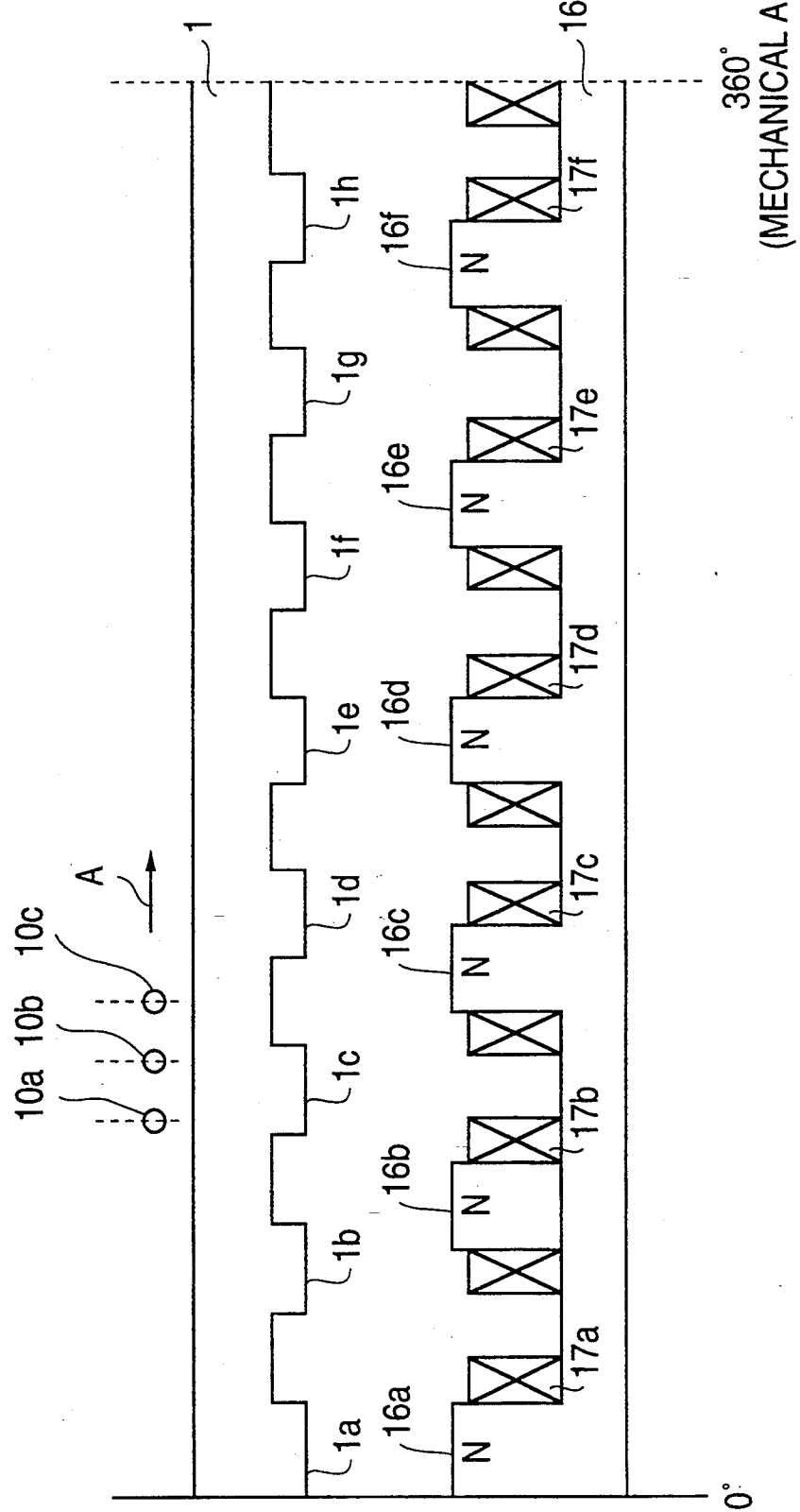
FIG. 3 (prior art) is a development, showing an armature and a rotor of the motor of FIG. 1.

FIG. 3 is a development of the magnetic poles and the rotor of FIG. 1. In FIG. 1, a circular ring portion 16 and magnetic poles 16a–16f cooperatively constitute a fixed armature by being fixed on an outer casing (not shown). The circular ring portion 16 is a core serving as a magnetic path.

The armature coils 17a and 17d are connected in series or in parallel, and this joint unit is referred to as all armature coil 32a. The armature coils 17b and 17e and the armature coils 17c and 17f are also connected similarly, and these joint units are referred to as an armature coil 32b and an armature coil 32c, respectively.

When the armature coil 32b is activated, the salient poles 1b and 1f are magnetically attracted and the rotor 1 rotates in a direction A. When the rotor 1 rotates 120 degrees, the armature coil 32b is deactivated, and the armature coil 32c is activated. When the rotor 1 further rotates 120 degrees, the armature coil 32c is deactivated, and the armature coil 32a is activated.

A current supply mode is cyclically alternated every 120-degree rotation in the order of the armature coil 32a →the armature coil 32b →the armature coil 32c, so that the motor can be driven as a three-phase half-wave motor.

In this case, symmetrically disposed magnetic poles are magnetized to N-poles and S-poles as shown in the drawing. Since two magnetic poles excited simultaneously are always magnetized to have opposite polarities, leaking magnetic fluxes passing non-excited magnetic pules become mutually opposite, and, therefore, counter torque is prevented from being generated.

In order to further reduce the above-described leaking magnetic flux, No.1-phase magnetic poles 16a and 16d are respectively constituted as a set of two magnetic poles, and respective magnetic poles are magnetized to an N-pole and an S-pole respectively by activating their corresponding armature coils. Leaking magnetic fluxes occurring in respective sets of two magnetic poles are cancelled by other magnetic poles to disappear, so that almost all the leaking magnetic fluxes is extinguished. Other magnetic poles 16b–16f are respectively constituted as a set of two magnetic poles, which are magnetized to an N-pole and an S-pole respectively. Similar effect can be enjoyed, and leaking magnetic fluxes are extinguished.

In this case, the number of the salient poles 1a–1h becomes 16, and a resultant output torque becomes twice. The armature coils 32a, 32b and 32c are referred to as No.1-, No.2- and No.3-phase armature coils.

Though the number of the salient poles of the rotor 1 shown in FIG. 1 is 8, it is possible to reduce the number of the salient poles to 4 in order to reduce a diameter of the rotor 1. In this case, however, a number of the magnetic pole becomes 6. FIG. 3 is a development showing salient poles and magnetic poles of the motor of FIG. 1.

Coils 10a, 10b and 10c of FIG. 3 are position detecting elements for detecting positions of the salient poles lay 1a–1h, and are fixed on the armature 16 as shown in the drawings. Their coil surfaces face to side surfaces of the salient poles 1a–1h over an air gap. The coils 10a, 10b and 10c are spaced one another by an amount of 120 degrees. The coil is of a 100-turn air-core having a diameter of 5 mm.

Figure 7:
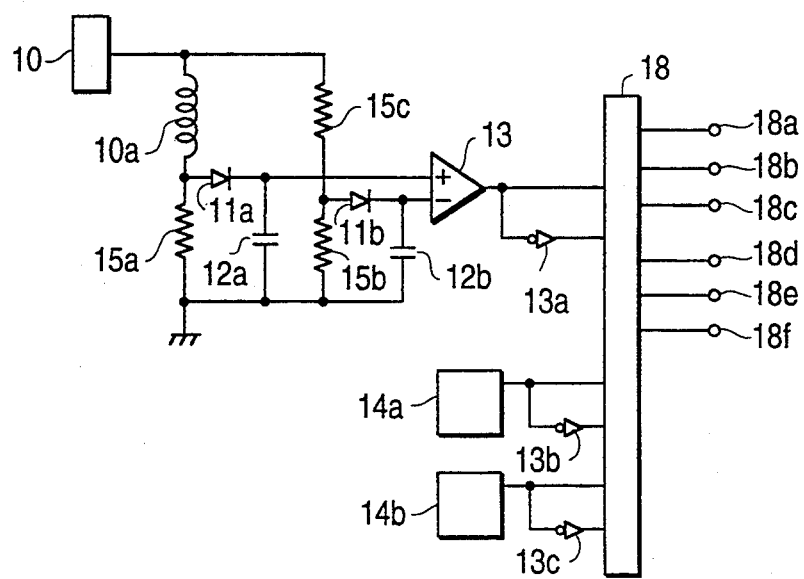
FIG. 7 (prior art) is a circuit diagram showing a three-phase position detecting device.

FIG. 7 shows a device for obtaining position detecting signals from the coils 10a, 10b and 10c. In FIG. 7, the coil 10a and resistances 15a, 15b and 15c constitute a bridge circuit. This bridge circuit is adjusted to balance when the coil 10a does not directly confront with the salient poles 1a–1h.

Accordingly, an output of a low-pass filter consisting of a diode 11a and a capacitor 12a and an output of a low-pass filter consisting of a diode 11b and a capacitor 12b are equal, and, therefore, an output of the operational amplifier 13 becomes a LOW-level.

An oscillator 10 causes approximately 1 MHz oscillations. When the coil 10a directly confronts with the salient poles 1a–1h, an impedance is reduced due to iron loss (i.e. eddy loss and hysteresis loss). Therefore, a voltage drop in the resistance 15a becomes so large that the output of the operational amplifier 13 becomes a HIGH-level.

Figure 15:
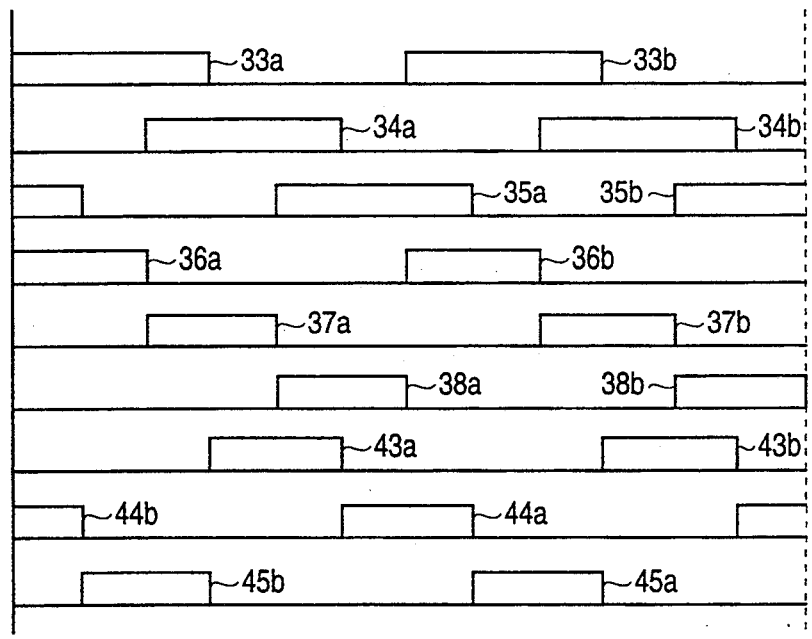
FIG. 15 is a time chart showing three-phase position detecting signals.

Inputs to the block circuit 18 are shown by curves 33a and 33b, in a time chart of FIG. 15, and inputs supplied through an inversion circuit 13a coincide with inverted curves of the curves 33a and 33b. Block circuits 14a and 14b in FIG. 7 have the same constitution as above-described block circuits including the coils 10b and 10c, respectively. The oscillator 10 can be utilized commonly among these block circuits.

An output of the block circuit 14a and an output of the inversion circuit 13b are inputted to the block circuit 18, and their output signals become curves 34a and 34b, as shown in FIG. 15 and inverted curves of the curves 34a, 34b.

An output of the block circuit 14b and an output of the inversion circuit 13c are inputted into the block circuit 18, and their output signals become curves 35a and 35b, as shown in FIG. 15 and inverted curves of the curves 35a and 35b. The curves 34a and 34b, are delayed 120 degrees in phase with respect to the curves 33a and 33b. In the same way, the curves 35a and 35b are delayed 120 degrees in phase with respect to the curves 34a and 34b.

The block circuit 18 is a circuit conventionally utilized in a control circuit of a three-phase Y-type semiconductor motor. That is, the block circuit 18 is a logic circuit generating 120-degree width rectangular-waveform electric signals from terminals 18a–18f in response to the above-described position detecting signals. Outputs from the terminals 18a, 18b and 18c are shown by curves 36a and 36b, curves 37a and 37b, and curves 38a and 38b in FIG. 15, respectively. Outputs from the terminals 18d, 18e and 18f are shown by curves 43a and 43b, curves 44a and 44b, and curves 45a and 45b respectively.

The outputs of the terminal 18a and the terminal 18d, the outputs of the terminal 18b and the terminal 18e, and the outputs of the terminal 18c and the terminal 18f, respectively have a mutual phase difference of 180 degrees. The output signals from the terminals 18a, 18b and 18c are successively delayed one another by 120 degrees. In the same manner, the output signals from the terminals 18d, 18e and 18f are successively delayed one another by 120 degrees. The same effect can be obtained even if an aluminum plate, synchronously rotating together with the rotor 1 of FIG. 1 and having the same configuration, is used instead of the salient poles 1a and 1b facing to the coils 10a, 10b and 10c.

Magnetic attraction forces derived from the excited magnetic pole and the salient pole, which are symmetrically disposed about an axis, are balanced in a radial direction, so that vibration is suppressed from generating. A means for supplying currents to the armature coils is next explained with reference to FIG. 12.

At upper ends of the armature coils 32a, 32b and 32c are inserted with transistors 20a, 20b and 20c. The transistors 20a, 20b and 20c serve as semiconductor switching elements and can be substituted by other semiconductor elements having the same effect. A DC electric power source supplies electric power from its positive and negative terminals 2a and 2b.

Figure 8:
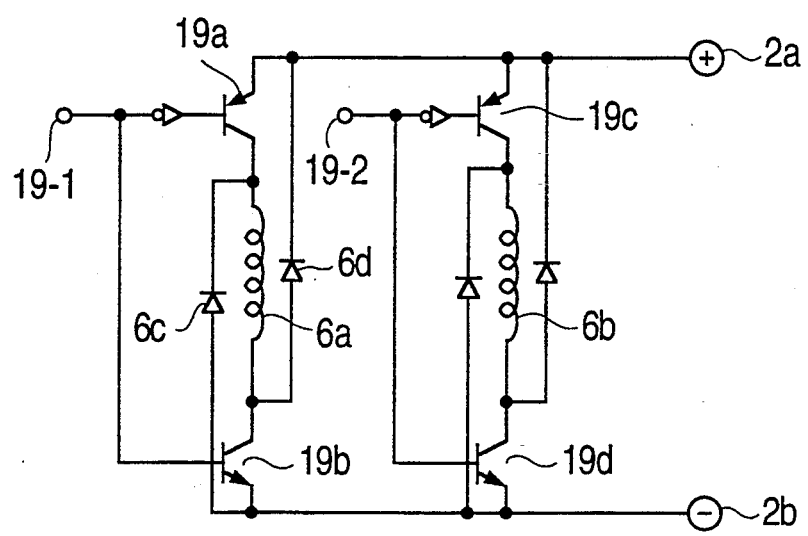
FIG. 8 (prior art) is a current supply control circuit for conventional armature coils.

This embodiment is characterized by a simplified circuit configuration, in which only one transistor (transistor 20a, 20b, or 20c) is provided at an upper end of each armature coil, i.e. a positive terminal side of the DC electric power source. FIG. 8 shows a conventional circuit, in which two transistors 19a, 19b or 19c, 19d are provided respectively at both ends of each of armature coils 6a and 6b. Accordingly, a number of transistors per armature coil doubles. As the transistors 19a–19d must serve as power elements, this conventional circuit becomes expensive. The circuit embodying the present invention is therefore able to reduce the cost of circuit.

When an armature coil is activated, building-up of its exciting current will be delayed due to large inductance, and this large inductance also causes the reduction of current to delay when the magnetic energy stored in the armature coil is returned through diodes 6c, 6d to the DC electric power when deactivated in this case. Accordingly, both rotational speed and efficiency will fall. Although such disadvantages may be removed by increasing DC electric power source voltage, rotating a motor at 10 thousands r.p.m. with 1 Kw output will require too high voltage, e.g. 1000 volts or more, which is too high for practical use. The present invention can solve such a problem, too. Terminals 19-1 and 19-2 are input terminals for inputting position detection signals to control the activation.

Details of FIG. 12 will be explained below. Position detecting signals curves 36a and 36b curves 37a and 37b and curves 38a and 38b in FIG. 15 are inputted from terminals 42a, 42b and 42c.

In response to these input signals fed through AND circuits 24a, 24b, 24c, transistors 5a, 5b, 5c and transistors 20a, 20b, 20c are turned on to activate armature coils 32a, 32b and 32c.

A terminal 40 is supplied with a reference voltage specifying an armature current. By changing a voltage of the terminal 40, an output torque can be changed. When an electric power switch (not shown) is turned on, an output of an operational amplifier 40a becomes a LOW-level since an input of a positive terminal of the operational amplifier 40a is lower than that of its negative terminal. In this case, as an output of a monostable circuit 28a is at a LOW-level, an output of an inversion circuit 28b becomes a HIGH-level. Accordingly, a downside input terminal of the AND circuit 24a becomes a HIGH-level. If an upside input terminal is supplied with a signal in this condition, the transistors 5a, 20a are turned on to activate the armature coil 32a. A resistance 22a is provided for detecting armature current flowing in the armature coils 32a, 32b and 32c.

Figure 14:
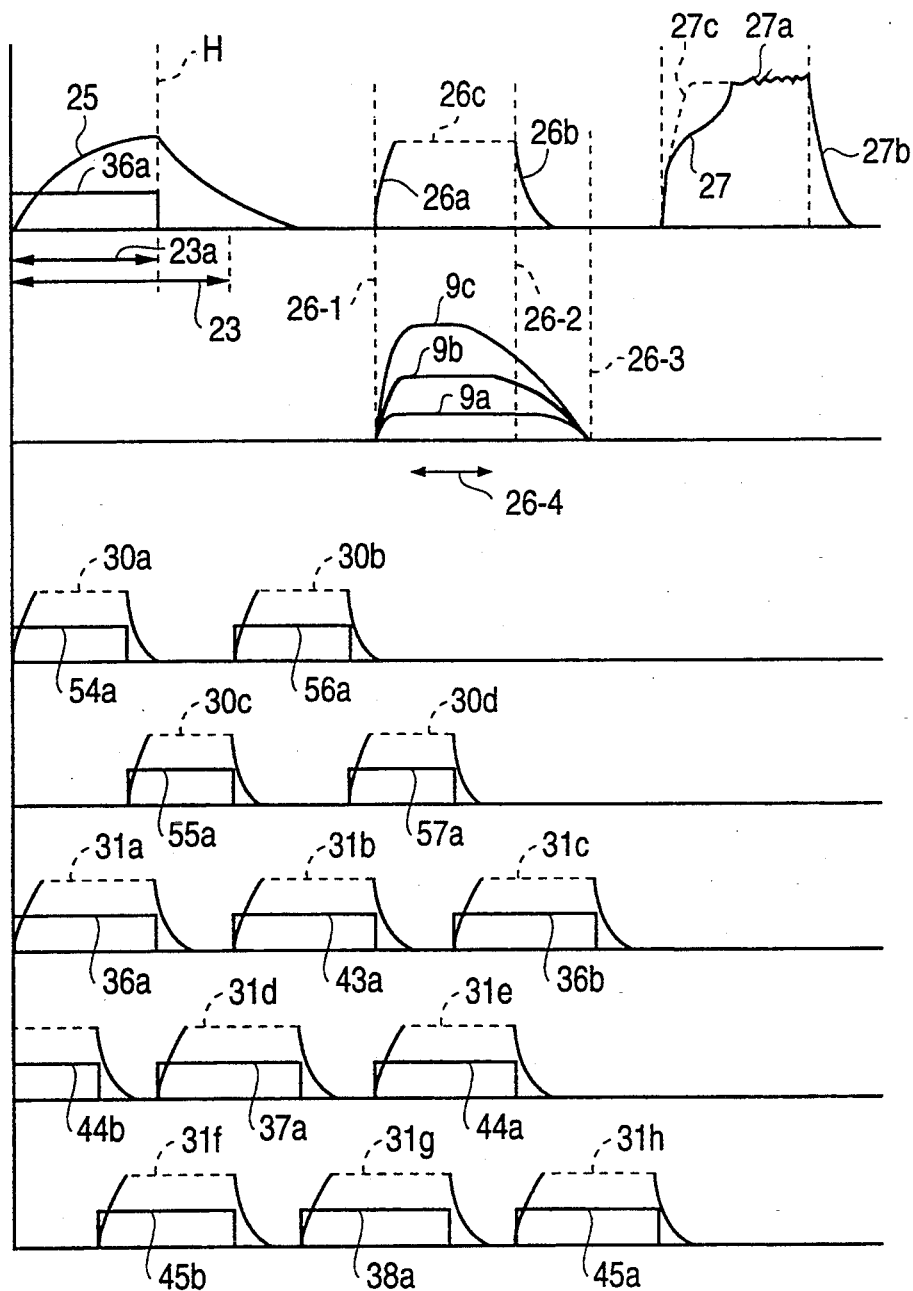
FIG. 14 is a time chart showing position detecting signals and exciting current of armature coils.

One of above-described position detecting signal curves is shown as a curve 36a in a time chart of FIG. 14. The armature coil 32a is supplied with an exciting current during a time period corresponding to this curve 36a. An arrow 23a shows a current supply angle of 120 degrees.

In an initial stage of the current supply period, the building-up of the exciting current is delayed due to an inductance of the armature coil. If the current is stopped, magnetic energy stored in the armature coil is discharged though diodes 6c and 6d in the case of FIG. 8 to return to the electric power source. Therefore, the current decreases as shown by a second half portion of the curve 25; i.e. a right side of the dotted line H.

A section generating a positive torque is a 180-degree section shown by an arrow 23; therefore, counter torque is generated to decrease both output torque and efficiency. This phenomenon will grow in intensity as the speed increases, and, eventually, it will become impossible for the motor to be used practically in a high-speed region.

This is because a time width of a positive torque generating section 23 decreases in proportion to an increase of the rotational speed, while a time width of a counter torque generating section will not vary even if the motor speed comes to run at a high speed.

The same explanation is applicable to the current supply operation of the armature coils 32b and 32c based on other position detecting signals 37a and 38a.

Since a building-up portion of the curve 25 is also delayed, an output torque is decreased. That is, torque reduction occurs. This is because the magnetic pole and the salient pole interact to close the magnetic path to have a large inductance.

Disadvantage of the reluctance type motor such that it cannot increase its rotational speed notwithstanding an advantage of being capable of producing a large output torque is due to the occurrence of above-described counter torque and torque reduction.

Figure 12:
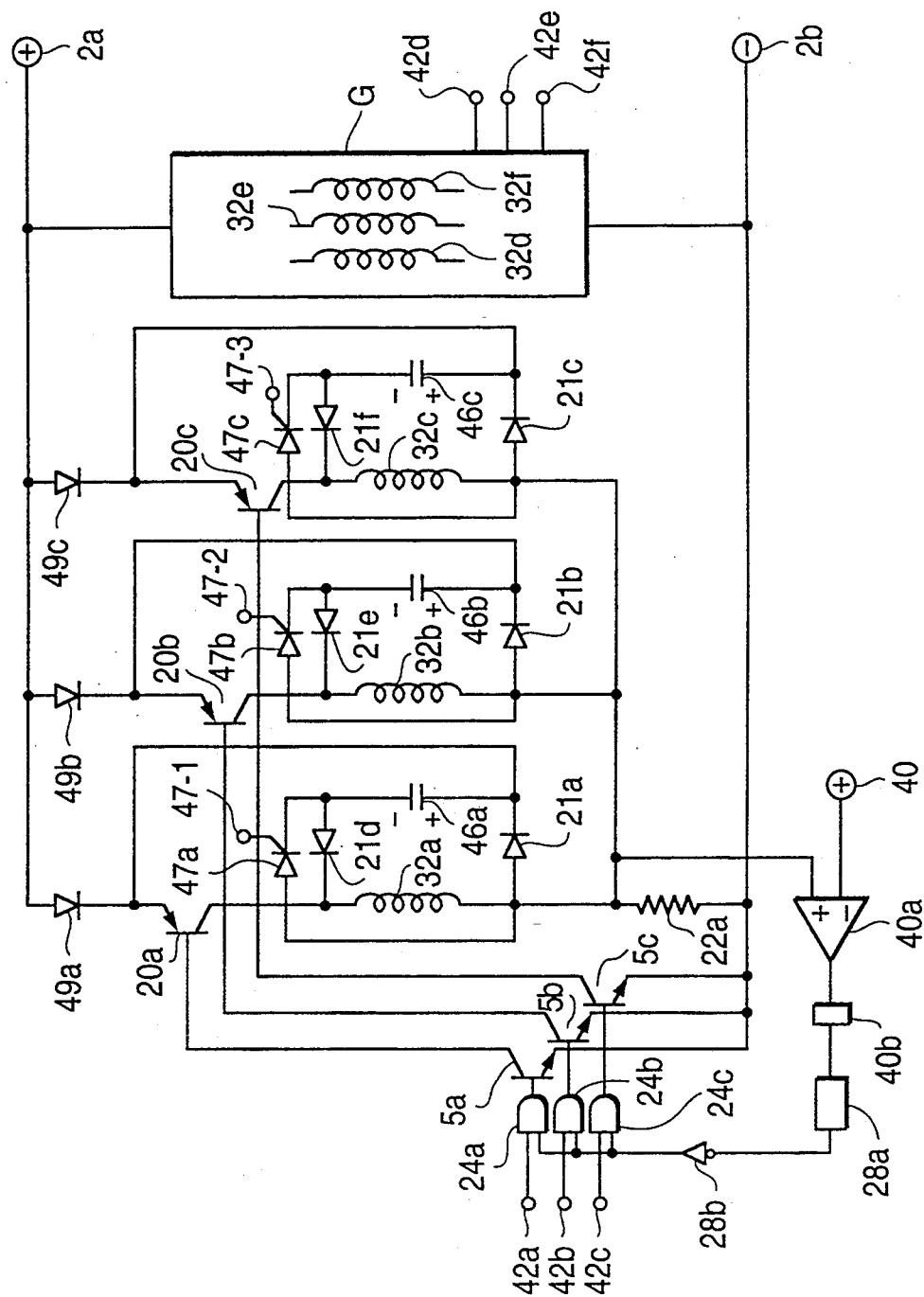
FIG. 12 is a circuit diagram showing still another embodiment of current supply control circuit of a three-phase half-wave or full-wave reluctance type motor.

An apparatus in accordance with the present invention is characterized by that above-mentioned disadvantage is eliminated by additionally providing back-flow preventing diodes 49a, 49b, 49c, small-capacitance capacitors 46a, 46b, 46c, and diodes 21a, 21b, 21c shown in FIG. 12, and that only one semiconductor switching element (20a, 20b, or 20c), which is for controlling activation/deactivation of each armature coil, is provided at a positive voltage side of the DC electric power source.

When current is terminated at the terminal end of the curve 36a, magnetic energy stored in the armature coil 32a is discharged through the diodes 21a and 21d to the capacitor 46a so as to charge it up to a high voltage with polarities shown in the drawing, being prevented from returning to the DC electric power source side by a function of the back-flow preventing diode 49a. Accordingly, the magnetic energy is sharply extinguished and the current decreases steeply.

Curves 27, 27a and 27b of the first stage shown in the time chart of FIG. 14 cooperatively represent a curve of current flowing in the armature coil 32a. Both dotted lines are spaced 120 degrees. The armature current decreases steeply like the curve 27b and therefore no counter torque is generated. The capacitor 46a is charged up to a high voltage and held to this voltage.

Next, in response to the position detecting signal curve 36b, the transistors 5a and 20a are turned on to activate the armature coil 32a again. A voltage equivalent to a summation of the charged voltage of the capacitor 46a and the DC electric power source voltage (a voltage between the terminals 2a, 2b) is applied to the armature coil 32a in this case; therefore an exciting current of the armature coil 32a builds up sharply.

By virtue of this function, the exciting current builds up abruptly as shown by the curve 27. The building-up portion of the current 27 becomes slow or moderate at its intermediate portion, because the magnetic energy is transformed into thermal energy due to copper loss of coils and iron loss of magnetic cores when the magnetic energy is transferred between armature coils. A countermeasure for eliminating such a disadvantage will be discussed later.

In the case explained above, the torque reduction and the counter torque are removed, and the exciting current becomes substantially the rectangular waveform to increase an output torque.

Discharged current flows from a positive electrode of the capacitor 46a to a connecting point between the diode 49a and the transistor 20a, and it further flows through the armature coil 32a and an SCR (Silicon Controlled Rectifier) 47a to a negative electrode to close a discharge circuit. The SCR 47a has a gate input terminal 47-1 for receiving an output pulse of a monostable circuit, which is operative in response to a differential pulse generated by a building-up portion of a position detecting signal inputted from the terminal 42a. The capacitor 46a is discharged during a period of time in which the SCR 47a is activated in response to this output pulse to make an exciting current of the armature coil 32a to builed up sharply. The diode 21d prevents a discharge current from directly flowing from the transistor 20a to the negative electrode of the capacitor 46a without passing through the armature coil 32a.

Next, a chopper circuit will be explained. When the armature current of the armature coil 32a increases, causing the increase of the voltage drop in the resistance 22a, which detects armature current value, until exceeding the reference voltage of the reference voltage terminal 40 (i.e. an input voltage of the negative terminal of the operational amplifier 40a), an output of the operational amplifier 40a turns to a HIGH-level. Accordingly, the differential circuit 40b generates a differential pulse to activate the monostable circuit 28a, whose output becomes an electric pulse having a narrow width. As this output electric pulse is converted into a LOW-level electric pulse by the inversion circuit 28b, an output of the AND circuit 24a becomes a LOW-level signal having a predetermined narrow width, during which the transistors 5a and 20a are deactivated.

Accordingly a current flowing in the armature coil 32a decreases and then this current flows through diodes 21a, 21d into the capacitor 46a to charge it up. When the output of the monostable circuit 28a returns to a HIGH-level, the transistors 5a, 20a are turned on to increase exciting current of the armature coil 32a. When an input of the positive terminal of the operational amplifier 40a exceeds that of the negative terminal (i.e. the voltage of the reference voltage terminal 40), the transistors 5a, 20a are again turned off during a predetermined short period of time. Repetition of such a cycle constitutes a chopper circuit wherein the exciting current is maintained at a predetermined value.

A section indicated by the curve 27a in FIG. 14 is a section being chopper controlled. A height of the curve 27a is regulated by a voltage of the reference voltage terminal 40.

The armature coil 32b of FIG. 12 is activated by turning on the transistors 5b, 20b in accordance with widths of the position detecting signal curves 37a, 37b, —inputted from the terminal 42b, and the chopper control is carried out by the operational amplifier 40a and the resistance 22a. Functions and effects of diodes 49b, 21b, 21e and a capacitor 46b are substantially identical with like components of the armature coil 32a.

Above-described circumstances are also applicable to the armature coil 32c. That is, the current supply control for the armature coil 32c is executed by inputting the position detecting signal curves 38a and 38b of FIG. 15 to the terminal 42c.

Functions and effects of transistors 5c, 20c, operational amplifier 40a, a resistance 22a, diodes 49c, 21c, 21f and a capacitor 46c are substantially identical with previously described like components. Electric pulse having predetermined width, which is supplied from building-up portion of position detecting signal inputted through terminals 42b and 42c though monostable circuit, is inputted to gate terminals 47-2 and 47-3 respectively.

Function and effect of these gate input terminals 47-2, 47-3 are substantially the same as those of the previously described gate input terminal 47-1 of the SCR 47a. Thus, functions and effects of SCRs 47b, 47c are substantially the same as the SCR 47a.

During a chopper control of the armature coil 32a, the capacitor 46a is charged to increase its voltage in accordance with chopper frequency and current attenuation amount. When current is terminated at an end of the position detecting signal, all the magnetic energy stored in the armature coil 32a is discharged and the capacitor 47a is charged up to a higher voltage.

When the armature coil 32a is next activated upon turning-on of the transistor 20a, an exciting current builds up sharply due to the high voltage of the capacitor 46a. As the electrostatic energy in the capacitor 46a includes above-described chopper component in this case, the building-up of the exciting current is very quick.

Although iron loss and copper loss delays or moderates the increase of the exciting current at an intermediate portion of its building-up curve as previously explained with reference to the curve 27 of FIG. 14, the electrostatic energy added by the chopper function enables the exciting current to build up sharply as shown by the dotted curve 27c, which builds up so steeply that its waveform is almost rectangular. In this manner, function and effect of the present invention are further emphasized. Substantially the same function and effect can be obtained with respect to other armature coils 32b and 32c.

Exciting current for respective armature coils may be supplied from any time within an approximately 30-degree section after the salient poles come to confront with the magnetic poles. This timing may be adjusted depending on rotational speed, efficiency and output torque so that the positions of the detecting coils 10a, 10b and 10c to be fixed on the armature side for serving as position detecting elements can be changed accordingly.

As is apparent from the foregoing description, according to present invention, it becomes possible to drive a motor at a high speed with good efficiency and large output as a three-phase half-wave current supply type motor. Thus, the purpose of the present invention can be accomplished. In the case of a three-phase full-wave current supply mode, the same purpose can be accomplished by combining two sets of above-described half-wave current supply circuits.

Curves 26a, 26b and 26c of the first stage shown in FIG. 14 cooperatively represent a current supply curve for the armature coil. A gap between a dotted line 26-1 and a dotted line 26-2 represents a 120-degree width of the position detecting signal. A gap between the dotted line 26-1 and a dotted line 26-3 represents a 180-degree width of the output torque generating section.

Curves 9a, 9b and 9c show output torque curves. At the point of the dotted line 26-1, the current supply operation is initiated, and the salient poles begin confronting the magnetic poles at the same time. The curve 9a represents a case where a current supplied to the armature coil is small. Its torque becomes relatively flat. However, as shown by the curves 9b and 9c, a peak value of the torque tends to shift toward a left side as the current value increases, and a width of the peak value becomes narrow.

In consideration of above-described torque characteristics and supplied current value, it is preferable to set an initiation timing of the current supply operation at an intermediate point of a 30-degree section after the salient poles begin confronting with the magnetic poles by adjusting the fixing points of the position detecting coils 10a, 10b and 10c.

Charging voltage required for charging the capacitors 46a, 46b and 46c will be higher as their capacitance become smaller. Therefore, with small-capacitance capacitors 46a, 46b and 46c, the exciting current of the armature coils can be built up sharply and reduced steeply. Thus, the motor can operate even in a high-speed region, thereby eliminating the disadvantage of the conventional reluctance type motor. Therefore, it is preferable for the capacitor to have the smallest possible capacitance not to damage transistors in the circuit.

The electric circuit of FIG. 12 allows to constitute a stepping motor. Stepping signals of three-phase half-wave current supply mode can be obtained through a conventional means. A No.1-phase stepping electric signal is inputted from the terminal 42a, and No.2-phase and No.3-phase stepping electric signals from the terminals 42b, 42c, respectively. Above-described stepping electric signals can be obtained, for example, by inputting pulse outputs of a well-known pulse generator into a pulse distributer. The No.1-phase stepping electric signals have 180-degree width and are spaced 180 degrees one another. The No.2- and No.3-phase stepping electric signals are substantially the same as the No.1-phase stepping electric signals, but are successively delayed 120 degrees from the No.1-phase stepping electric signals.

The rotor 1 having a construction shown in FIG. 1 is driven to rotate as a rotor of three-phase half-wave stepping motor.

As the capacitors 46a, 46b and 46c speed storage and extinction of magnetic energy of each armature coil, a stepping motor capable of operating in a high-speed region can be realized, thereby accomplishing the purpose of the present invention.

Although this embodiment is disclosed as a three-phase type, a stepping motor having four phases or more can also be obtained in the same manner. A stepping motor will require a chopper circuit to be independently provided to each phase armature coil.

Figure 2:
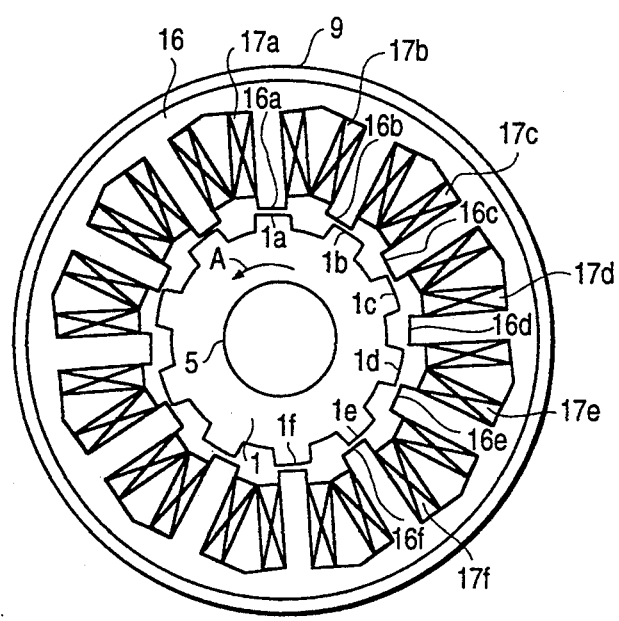
FIG. 2 (prior art) is a plane view showing a three-phase full-wave reluctance type motor in accordance with the present invention.

Next explained is an embodiment in which the present invention is applied to a three-phase full-wave reluctance type motor. FIG. 2 is a plane view and FIG. 4 is a development.

Figure 4:
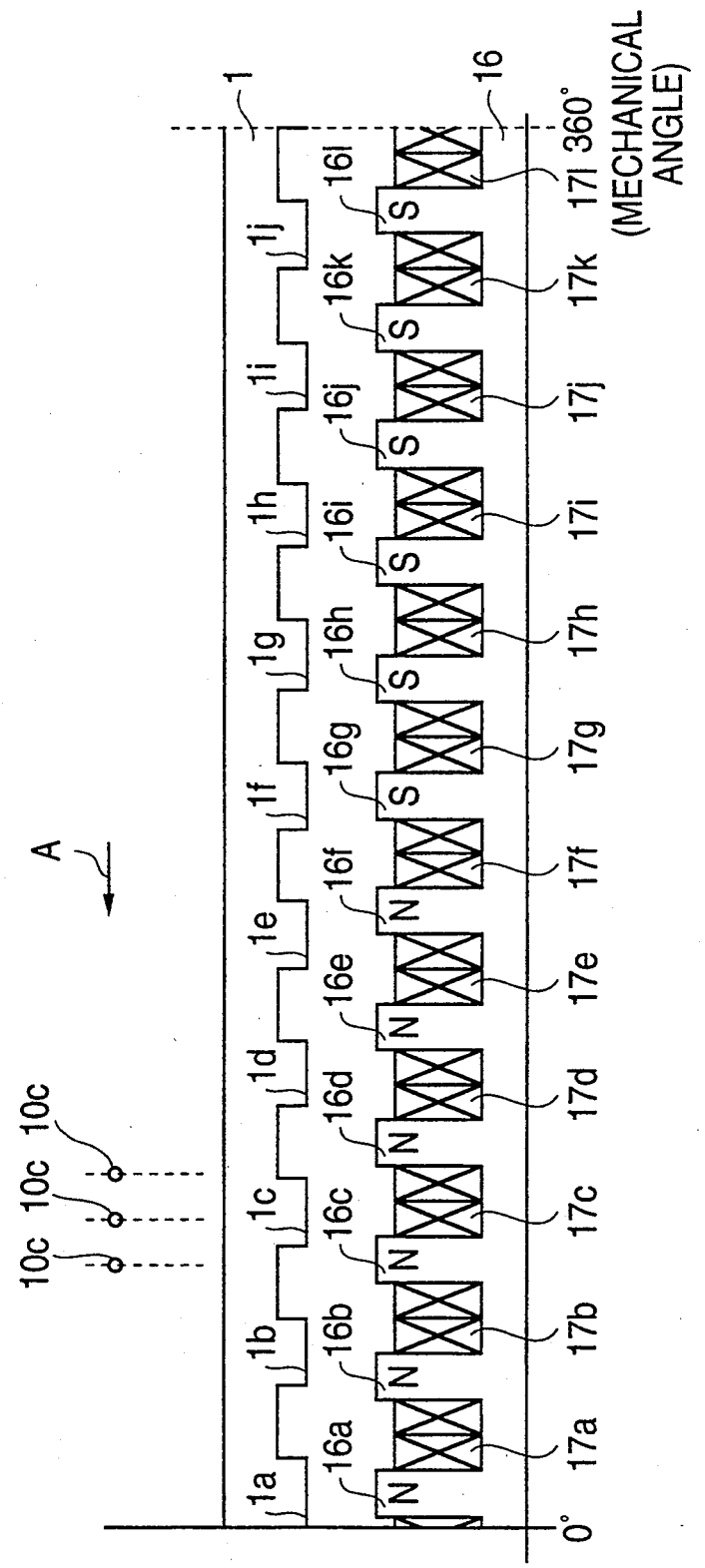
FIG. 4 (prior art) is a development showing an armature and a rotor of the motor of FIG. 2.

As shown in FIGS. 2 and 4, ten salient poles 1a–1h being disposed at regular intervals to each other with a 180-degree width are formed on the magnetic rotor 1 which is fixed on the rotor 5. A fixed armature 16 is equipped with 12 magnetic poles 16a–16f having a 120-degree width to be wound by an associated armature coil. The armature 16 is fixed on an inside surface of the outer casing 9. The rotor 5 is rotatably supported on bearings provided on the side plates on two sides of the outer casing 9. The magnetic poles 16a–16f are associated with armature coils 17a–17f respectively.

Position detecting coils 10a, 10b and 10c are spaced apart from one another by 120 degrees and fixed to the armature 16 side at the positions shown in the drawing so as to confront the side surfaces of the salient poles 1a–1h.

The electric circuit of FIG. 7 can generate position detecting signals from the coils 10a, 10b and 10c. Respective curves in the time chart of FIG. 15 show the generated position detecting signals.

Respective magnetic poles are magnetized by the armature coils to have N- or S-polarity as shown in the drawing. The armature coils 17a and 17g are connected in series or in parallel with each other to constitute an armature coil 32a. The armature coils 17b, 17h, the armature coils 17c, 17i, the armature coils 17d, 17j, the armature coils 17e, 17k, and the armature coils 17f, 17l, which are connected in the same manner as the above, are referred to as armature coils 32b, 32c, 32d, 32e and 32f, respectively.

The armature coils 32a, 32b and 32c are activated by amounts corresponding to the width of the position detecting signal curves 36a and 36b, 37a and 37b, and 38a and 38b of FIG. 15, respectively. The armature coils 32d, 32e and 32f are activated by amounts corresponding to the width of the position detecting signals 43a and 43b, 44a and 44b and 45a and 45b, respectively. Then, the rotor 1 rotates in a direction of an arrow A as a three-phase full-wave type motor.

The above-described current supply mode can be expressed as follows: the armature coils 32a, 32b and 32c are referred to as No.1-, No.2- and No.3-phase armature coils, respectively. And, the armature coils 32d, 32e and 32f are referred to as No.1, No.2 and No.3-phase armature coils, respectively. Both groups are activated by a half-wave current supply mode, respectively.

A first-phase armature coil is constituted by the No.1- and No.1-phase armature coils. Second-phase and third-phase armature coils are constituted by the No.2- and No.2-phase armature coils and the No.3- and No.3-phase armature coils, respectively.

The position detecting signal curves 36a and 36b, 37a and 37b, and 38a and 38b are referred to as No.1-, No.2- and No.3-phase position detecting signals, respectively. And, the position detecting signal curves 43a and 43b, 44a and 44b and 45a and 45b are referred to as No.1-, No.2- and No.3-phase position detecting signals, respectively.

No.1-, No.2- and No.3-phase armature coils are respectively activated by No.1, No.2, and No.3-phase position detecting signals,, while No.1-, No.2-, and No.3-phase armature coils are respectively activated by No.1-, No.2- and No.3-phase position detecting signals.

The current supply control circuit for the armature coils 32a, 32b, 32c shown in FIG. 12 corresponds to a half-wave current supply section of above-described three-phase full-wave current supply mode. A block circuit G is a current supply control circuit for the armature coils 32d, 32e and 32f, similar to that for the armature coils 32a, 32b and 32c. Input signals of curves 43a and 43b, curves 44a and 44b, and curves 45a and 45b of FIG. 15 are supplied from input terminals 42d, 42e and 42f. Armature coils are activated only by width of respective curves. There is provided a chopper circuit similar to the one constituted by the operational amplifier 40a, the monostable circuit 28a, the differential circuit 40b, the inversion circuit 28b, and the reference voltage terminal 40, in order to maintain armature current at a predetermined level.

As can be understood from the foregoing description, according to the present invention, a three-phase full-wave current supply mode motor can be realized, which is capable of making exciting current build up or decrease quickly. Thus, not only motor efficiency can be improved in a high-speed region but ripple torque can be suppressed.

A three-phase full-wave current supply mode motor will be next explained with reference to FIG. 9. In the case shown in FIG. 9, position detecting signals of curves 36a and 36b and 43a and 43b are inputted from terminals 42a, 42d. Accordingly, a 120-degree width current is supplied to the armature coils 32a and 32d with 180-degree phase difference.

The reference voltage terminal 40, the operational amplifier 40a, the differential circuit 40b, the monostable circuit 28a etc., constitute a chopper circuit in the same manner as in FIG. 12, in order to maintain exciting current at a predetermined level. When the exciting current is terminated, magnetic energy stored in the armature coil 32a is discharged through the diode 21a into the capacitor 46a to charge it up to a high voltage.

When the rotor rotates 60 degrees, current supply to the armature coil 32d is initiated. As the transistor 20b is turned on in this instance, the capacitor 46a supplies its charged high voltage to the armature coil 32d to build up the exciting current quickly.

When the current supply to the armature coil 32d is terminated, magnetic energy stored in the armature coil 32d is discharged through the diode 21b into the capacitor 46b to charge it up to a high voltage. When the current supply to the armature coil 32a is next initiated, the high voltage is applied to make the building-up of the exciting current sharp. When the current supply to the armature coils 32a and 32d is terminated, exciting current steeply decreases by the high voltage charged in the capacitors 46a and 46b. Accordingly, the occurrence of torque reduction and counter torque are surely prevented.

Function and effect of the SCRs 47a and 47b are substantially the same as those of SCRs denoted by the same reference numerals shown in FIG. 12; therefore the SCRs 47a, 47b close discharge circuits of the capacitors 46a and 46b, respectively. During chopper operation, the capacitor 46a repeatedly charges electrostatic energy upon decrease of current in the same manner as FIG. 12. Accordingly, although delay of building-up of exciting current is caused due to iron loss and copper loss occurring when the magnetic energy transfers between the armature coil 32a and the armature coil 32d as shown by the curve 27 of first stage shown in FIG. 14, the exciting current can be built up sharply as shown by the curve 27c according to this embodiment.

Transistors 20a and 20b, used for controlling current supply to the armature coils in this embodiment, can be substituted by other semiconductor switching elements like IGBTs.

Block circuits B, C are current supply control circuits for activating or deactivating armature coils 32b, 32e and 32c, 32f in response to input signals of the terminal 42b (i.e. curves 37a and 37b of FIG. 15), input signals of the terminal 42e (i.e. curves 44a and 44b of FIG. 15), input signals of the terminal 42c (i.e. curves 38a and 38b of FIG. 15), and input signals of the terminal 42f (i.e. curves 45a and 45b of FIG. 15), respectively, and these circuits have the same construction as those of armature coils 32a, 32d.

A chopper circuit for the armature coil is the same as a previous one; therefore similar function and effect can be obtained.

In the time chart of FIG. 14, curves 31a, 31b and 31c represent exciting current curves of the armature coils 32a, 32d corresponding to position detecting signal curves 36a and 36b and curves 43a and 43b. Curves 31d and 31e represent exciting current curves of the armature coils 32b and 32e, while curves 31f, 31g and 31h represent exciting current curves of the armature coils 32c and 32f.

As can be understood from the foregoing description, according to the present invention, a three-phase full-wave current supply mode motor can be realized in such a manner that not only motor efficiency can be improved in a high-speed region but ripple torque can be suppressed. Thus, the purpose of the present invention can be accomplished.

Next, a three-phase half-wave current supply mode motor will be explained with reference to FIG. 11.

Position detecting signals represented by curves 36a and 36b, 37a and 37b, 38a and 38b of FIG. 15 are inputted from terminals 42a, 42b and 42c. A 120-degree width exciting current is supplied to the armature coils 32a, 32b and 32c successively.

The operational amplifier 40a, the differential circuit 40b, the monostable circuit 28a, the inversion circuit 28b, AND circuits 24a, 24b, 24c, the resistance 22a, and the reference voltage terminal 40 are the same components as those suffixed by the same reference numerals in the previous embodiments; therefore they constitute a chopper circuit which maintains the armature current at a predetermined level.

When the exciting current is terminated upon a signal input to the terminal 42a, magnetic energy stored in the armature coil 32a is discharged through the diode 21a into the small-capacitance capacitor 46a which is charged up to a high voltage with polarities indicated in the drawing. The transistors 20a and 5a are held in a turned-off condition in this case.

When the rotor rotates 240 degrees, the transistors 20c and 5c are turned on in response to an input signal to the terminal 42c to initiate current supply to the armature coil 32c. In this instance the capacitor 46a supplies its charged high voltage to the armature coil 32c to build up the exciting current quickly.

The building-up of the exciting current becomes sharp inversely to the capacitance of the capacitor 46a. However, the capacitance of the capacitor 46a should be determined not to exceed withstanding voltages of other semiconductor elements.

When the current supply to the armature coil 32c is terminated, magnetic energy stored in the armature coil 32c is discharged through the diode 21c into the capacitor 46c to charge it up to a high voltage. When the rotor rotates 240 degrees, transistors 20b and 5b are turned on upon signal input to the terminal 42b to initiate current supply to the armature coil 32b. In this instance, the capacitor 46c supplies its charged high voltage to the armature coil 32b to make the building-up of the exciting current sharp.

When the current supply to the armature coil 32b is terminated, magnetic energy stored in the armature coil 32b is discharged through the diode 21b into the capacitor 46b to charge it up to a high voltage. When the rotor further rotates 240 degrees, transistors 20a and 5a are turned on upon signal input to the terminal 42a. In this instance, the capacitor 46b supplies its charged high voltage to the armature coil 32a to make the building-up of the exciting current sharp. As magnetic energy is discharged into a corresponding small-capacitance capacitor when current supply to each armature coil is terminated, reduction of the exciting current becomes steep.

As apparent from above explanation, according to the present invention, torque reduction and counter torque are surely prevented, and, therefore, a motor capable of operating in a high-speed region with high efficiency can be obtained. Furthermore the circuit can be manufactured at low cost because only one power switching element, which is normally expensive, is required at a positive voltage side of each armature coil. The purpose of the present invention is thus accomplished.

In the same manner as in the previous embodiments, diodes 49a, 49b, 49c prevent current from flowing back to the DC electric power source side due to high-voltage of the capacitors 46a, 46b and 46c. A block circuit D is added in the case of a three-phase full-wave current supply mode.

Block circuit D is identical in configuration with the previously described circuit for controlling current supply to the armature coils 32d, 32e and 32f. Position detecting signals represented by curves 43a and 43b, curves 44a and 44b, and curves 45a and 45b of FIG. 15 are inputted from the terminals 42d, 42e and 42f, respectively. Thus a 120-degree width exciting current is supplied to each armature coil. A chopper circuit for controlling current supply to the armature coils 32d, 32e and 32f is provided in the same manner.

Gate terminals of SCRs 47a, 47b and 47c are connected with collectors of the transistors 20a, 20b and 20c, respectively. Turning-on of corresponding transistor causes a gate current. Accordingly, discharge if the capacitors 46a, 46b, 46c renders respective discharge circuits closed.

Although a motor is constituted as shown in FIG. 2 in the case of a three-phase full-wave current supply mode, it is also possible to obtain a three-phase full-wave current supply mode motor by use of other means. More particularly, the rotor 1 of FIG. 1,is formed into a thin-and-long shape. The fixed armature 16 is fixed on an outer surface of the rotor 5, and an additional fixed armature having the same constitution is fixed on an outer surface of the rotor 1. In this case, both fixed armatures are disposed to have a mutual phase difference of 180 degrees. The armature coils 32d, 32e and 32f of FIG. 12 are associated with No.1-, No.2- and No.3-phase magnetic poles of the additional fixed armature. With this arrangement, a thin-and-long type three-phase full wave current supply mode motor can be obtained.

Figure 11:
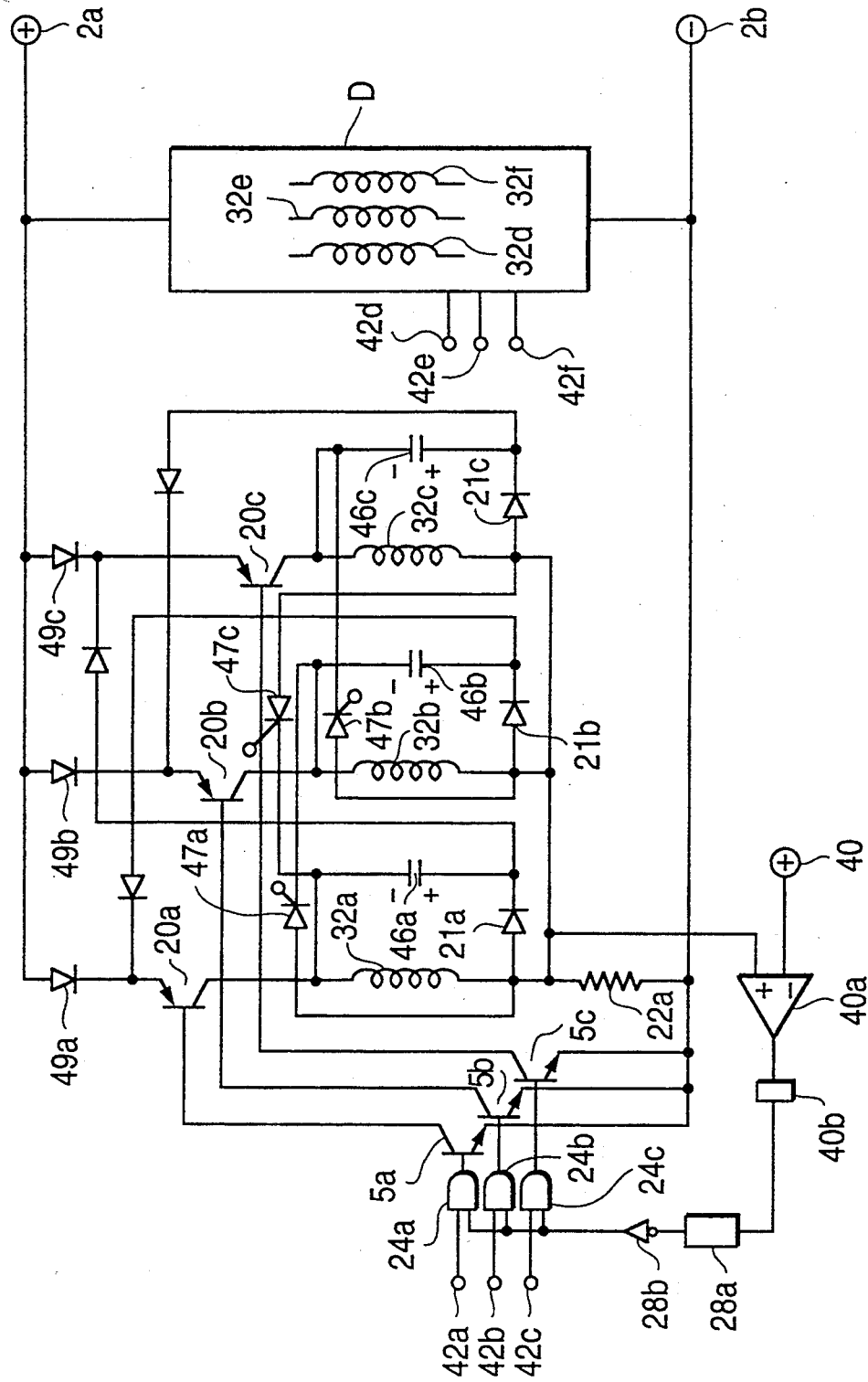
FIG. 11 is a circuit diagram showing another embodiment of current supply control circuit of a three-phase half-wave or full-wave reluctance type motor.

As shown in FIG. 11, electrostatic energy, stored in the capacitors 46a, 46b, 46c due to magnetic energy caused by the chopper operation, compensates the energy loss, i.e. copper loss and iron loss, occurring when activation of armature coil is exchanged. Consequently, building-up of exciting current can be made sharp.

As shown in FIG. 11, if stepping electric signals of three-phase half-wave are inputted from the terminals 42a, 42b and 42c, and another stepping electric signals of three-phase half-wave having 180-degree phase difference from above stepping electric signals, are inputted from the terminals 42d, 42e and 42f, a motor can be driven as a three-phase full-wave stepping motor, which is capable of performing a high-speed stepping operation.

Figure 5:
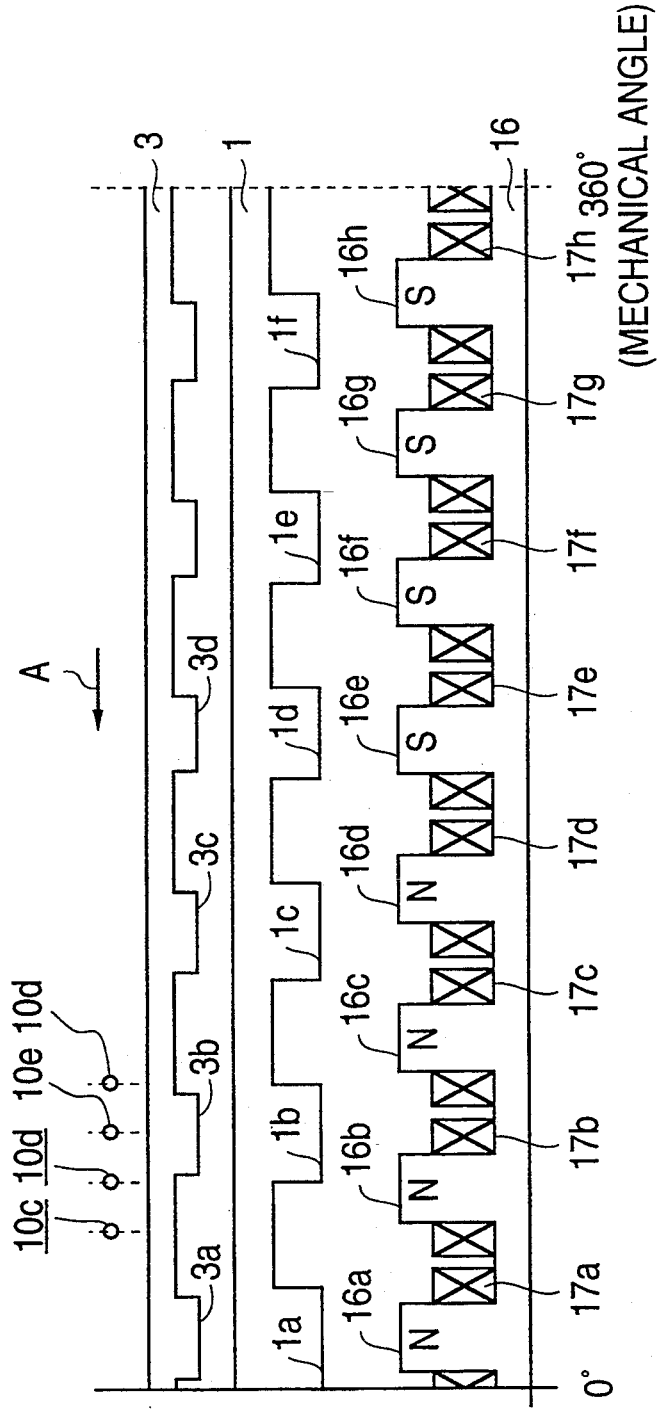
FIG. 5 (prior art) is a development showing an armature and a rotor of a two-phase full-wave current supply mode reluctance type motor.

Technical features of the present invention can be applied to a two-phase full-wave type motor. Its detail will be explained hereinafter. A plane view of this embodiment is omitted, but FIG. 5 shows its development. In FIG. 5, a circular ring portion 16 and magnetic poles 16a–16h are made of conventional laminated silicon steel sheets and fixed on an outer casing (not shown) to form an armature. The circular ring portion 16 serves as a magnetic path and a magnetic core. Magnetic poles 16a–16h are associated with armature coils 17a–17h. The rotor 1 has an outer peripheral portion provided with salient poles 1a, 1b. These salient poles 1a, 1b, confront the magnetic poles 16a–16h over air gap of approximately 0.1 to 0.2 mm.

The rotor 1 is made by the same means as the armature 16. The rotor 1 includes 6 salient poles being uniformly spaced with one another. Tip ends of the magnetic poles 16a–16h have 120-degree width, and 8 magnetic poles are uniformly disposed.

When the armature coils 17b and 17f are activated, the salient poles 1b, 1e are magnetically attracted to rotate the rotor 1 in a direction of an arrow A. When the rotor 1 rotates 90 degrees, the armature coils 17b and 17f are deactivated. On the other hand, the armature coils 17c and 17g are activated to magnetically attract the salient poles 1c, 1f. Thus, the torque is generated. The magnetic poles 16b, 16c are magnetized to respectively take N-polarity, while the magnetic poles 16f and 16g are magnetized to respectively take S-polarity.

Such magnetization for polarity is for preventing the counter torque due to leaking magnetic flux. In a subsequent 90-degree rotation, the magnetic poles 16d and 16h are magnetized to take N-pole and S-pole, respectively, as shown in the drawing. Further, every time the rotor 1 rotates 90 degrees, respective magnetic poles are magnetized to the polarities shown in the drawing.

By the above-described magnetization, the rotor 1 rotates in a direction of the arrow A to operate as a two-phase full-wave type motor. By the way, the rotor 1 can rotates in the same manner even if the width of current supply section exceeds 90 degrees. As the width of the magnetic pole around which the armature coil is wound is made 120 degrees, a relatively large installation spacing is required for coils.

Figure 10:
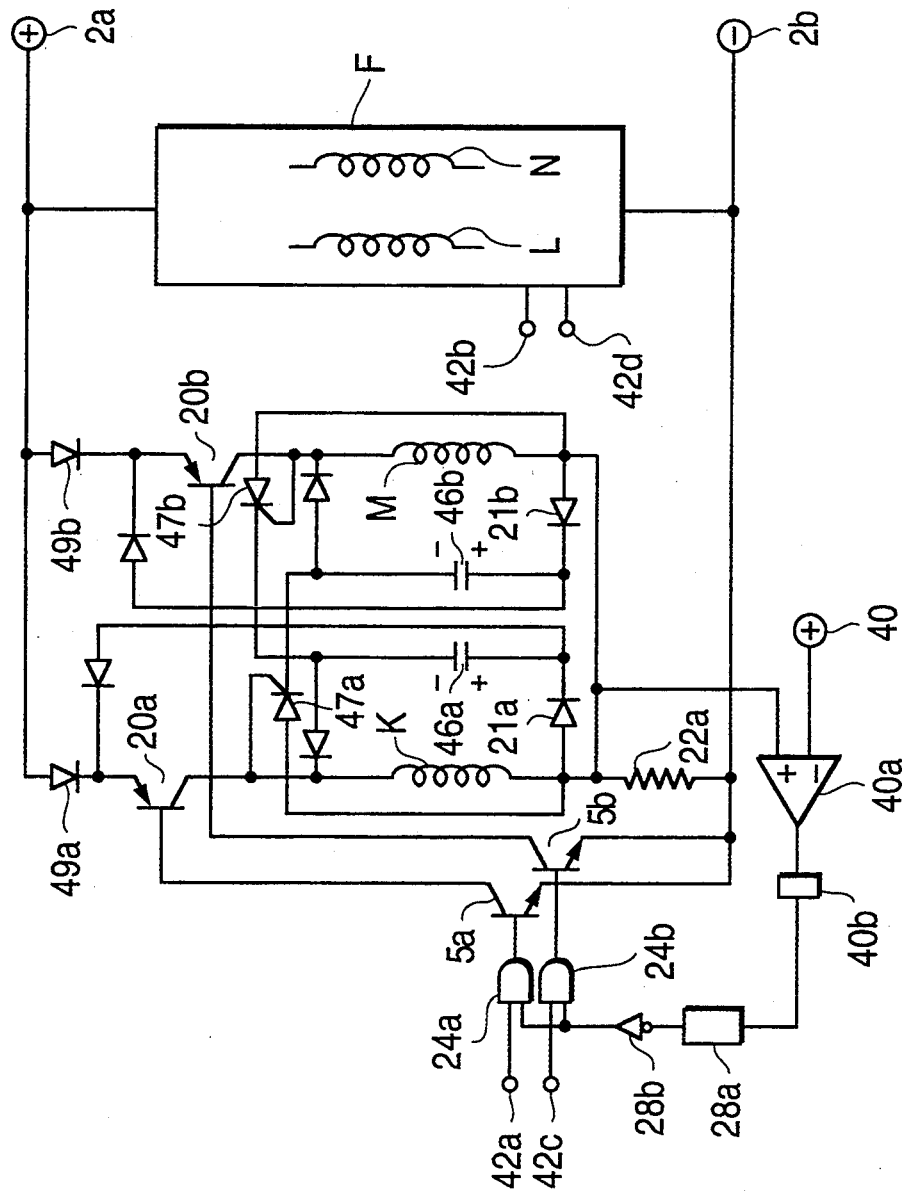
FIG. 10 is a circuit diagram showing a current supply control circuit for armature coils of a two-phase full-wave current supply mode.

Next, with reference to FIG. 10, the current supply operation of the armature coil is explained. In FIG. 10, armature coils K, M represent armature coils 17a, 17e and 17c, 17g of FIG. 5, respectively. Two armature coils are connected in series or in parallel. Upside ends of the armature coils K and M are connected to the transistors 20a and 20b. These transistors 20a and 20b function as semiconductor switching elements and can be replaced by other semiconductor elements having the same effect. Electric power is supplied from the positive and negative terminals 2a, 2b of the DC electric power source.

If the HIGH-level position detecting signal is inputted from the input terminal 42a, the transistors 20a and 5b are turned on to activate the armature coil K. Furthermore, if the HIGH-level position detecting signal is inputted from the input terminal 42c, the transistor 20b and 5a are turned on to activate the armature coil M.

The rotor 3 of FIG. 5 is made of conductive material, and is provided coaxially with the rotor 1 so as to rotate synchronously. The rotor 3 is provided with protruding portions 3a–3d. The width of the protruding portion is 90–150 degrees. The coils 10d, 10e, 10d and 10e are constituted in the same manner as the previously described coils 10a, 10b and 10c, and disposed to confront the protruding portions 3a–3d. The coils 10d, 10e are spaced 90 degrees, while coils 10d, 10e are offset from the coils 10d and 10e by 180 degrees, respectively.

Figure 6:
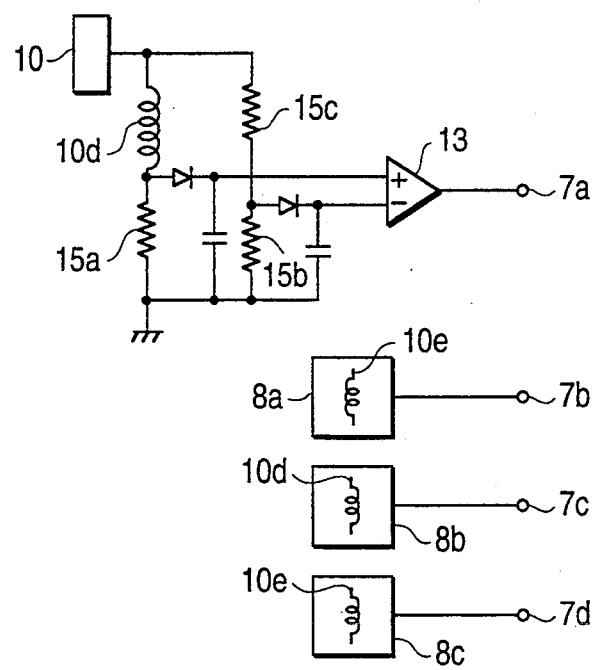
FIG. 6 (prior art) is a circuit diagram showing a two-phase position detecting device.

FIG. 6 shows an electric circuit for obtaining position detecting signals from above-described coils. The oscillator 10, the coil 10d, the resistances 15a–15c, the operational amplifier 13 and others are identical with those shown and suffixed by the same reference numerals in FIG. 7.

Accordingly, rectangular-waveform electric signals having the same width and the same phase difference as the 120-degree protruding portions 3a–3d can be obtained from the terminal 7a.

Figure 16:
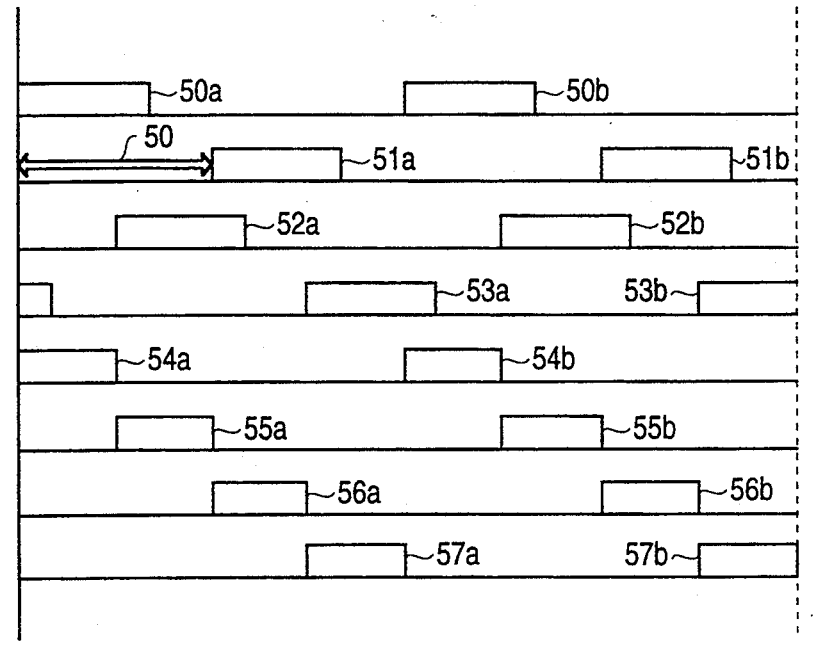
FIG. 16 is a Lime chart showing two-phase position detecting signals.

The position detecting signals obtained from the coil 10d are shown as curves 50a and 50b in the time chart of FIG. 16. Position detecting signals are obtained from the terminals 7b of the block circuit 8a which is constituted in the same way and includes the coil 10e, the terminal 7c of the block circuit 8b which is constituted in the same way and includes the coil 10d, and the terminal 7d of the block circuit 8c which is constituted in the same way and includes the coil 10e.

Output signals from the terminal 7b are shown as curves 52a and 52b in FIG. 16, while output signals from the terminals 7c, 7d are shown as curves 51a and 51b, and curves 53a and 53b, respectively. Respective curves have a 120-degree width, and are successively offset by 90 degrees.

If the width of the protruding portions 3a–3d of FIG. 5 is changed to 90 degrees, the position detecting signals obtained from the coils 10d, 10e, 10d, and 10e are shown as curves 54a and 54b, curves 55a and 55b, curves 56a and 56b and curves 57a and 57b in the time chart of FIG. 16. Respective curves have a 90-degree width, and are successively offset by 90 degrees. An arrow 50 denotes a 180-degree section.

No.1 and No.1 position detecting signals of No.1-phase, inputted from terminals 42a and 42c of FIG. 10, are shown by curves 50a and 50b and curves 51a and 51b. No.2 and No.2 position detecting signals of No.2-phase, inputted from terminals 42b and 42d, are shown by curves 51a and 51b and curves 53a and 53b, respectively.

As the No.1 and No.1 position detecting signals are inputted from the terminals 42a and 42c, the current supply control for respective transistors can be executed. The No.1-phase armature coils K and M are supplied with 120-degree width current in response to respective position detecting signals.

In response to the position detecting signal 50a, the armature coil K is supplied with a current shown by the curve 27a in the first stage of FIG. 14; however, a width between dotted lines is 120 degrees. A torque generating condition and its characteristics are the same as in the previously described embodiment of FIG. 9.

A chopper circuit, including the operational amplifier 40a, the resistance 22a, the reference voltage terminal 40, the monostable circuit 28a, functions in the same manner as in the previous embodiment.

As can be understood from the foregoing explanation, according to the present invention, exciting current of each armature coil can be quickly built up or reduced, thereby attaining the purpose of the present invention.

A block circuit F provided for controlling the activation of the armature coils L and N has the same constitution as the current supply circuit for the armature coils K. M. Exciting current is maintained at a predetermined level by a circuit similar to that consisting of the operational amplifier 40a, the reference voltage terminal 40 and others.

The armature coil L is activated in accordance with widths of the curves 52a and 52b of FIG. 16, and the armature coil N is activated in accordance with widths of the curves 53a and 53b. Their armature currents build up sharply and trail off steeply. As is explained in the foregoing description, according to the present invention, a two-phase full-wave current supply mode reluctance type motor can be realized, and the purpose of the present invention can be accomplished.

It is possible to realize a current supply operation having a 90-degree current width by inputting electric signals of the curves 54a and 54b and the curves 56a and 56b of FIG. 16 to the terminals 42a, 42c, and further inputting electric signals of the curves 55a and 55b and the curves 57a and 57b to the terminals 42b and 42d.

In the case where the current supply width is set to 90 degrees, the motor can be driven at a high speed (100 thousands rpm with 1 kw output), although the motor output torque is decreased. To the contrary, in the case where the current supply width is set to 120 degrees, the motor output torque can be increased, while the motor speed is decreased to a half of that obtained in case of 90-degree width.

In FIG. 5, the present invention can also be applied to form the magnetic poles having width is 180 degrees and 10 salient poles. Furthermore, it is also possible to form the 8n (n: a positive integer) pieces of magnetic pole having a 120-degree width. In this case, the number of the salient poles are increased correspondingly. In the case where the number of magnetic pole is increased, the output torque increases accordingly, although the rotational speed decreases.

Curves 30a and 30b shown in the third stage in FIG. 14 represent armature currents supplied to the armature coils K, M, while curves 30c and 30d represent armature currents supplied to the armature coils L, N. Curves 54a, 55a, 56a and 57a represent position detecting signal curves. Their current supply sections are 90 degrees and continuous with each other in the torque. As there is no overlapped portion between respective current supply sections, the ripple torque can be suppressed within a small value.

Current supply control of each armature coil is carried out in the same manner as previously described embodiments by means of a chopper circuit, in which energy loss, i.e. iron loss and copper loss, occurring when magnetic energy transfers between armature coils can be compensated in the same manner for quick build up the exciting current.

In respective embodiments, the output torque can be increased by providing teeth on both the magnetic poles and salient poles. The motor according to the present invention can be constituted for operation in a high-speed region because of a high output torque, which can be obtained through the application of the present invention and is a useful means available from the invention.

In an embodiment shown in FIG. 1, the invention can also be embodied even if the number of magnetic poles is 2n (n=6) pieces. The salient poles are increased corresponding to increase in the number of the magnetic poles. This embodiment is advantageous in that the output torque can be increased without decreasing rotational speed. Thus, this technical feature will be effective for a large-diameter motor.

Next explained is an embodiment which embodies the present invention in a conventional DC brushless three-phase motor having a magnet rotor.

Figure 13:
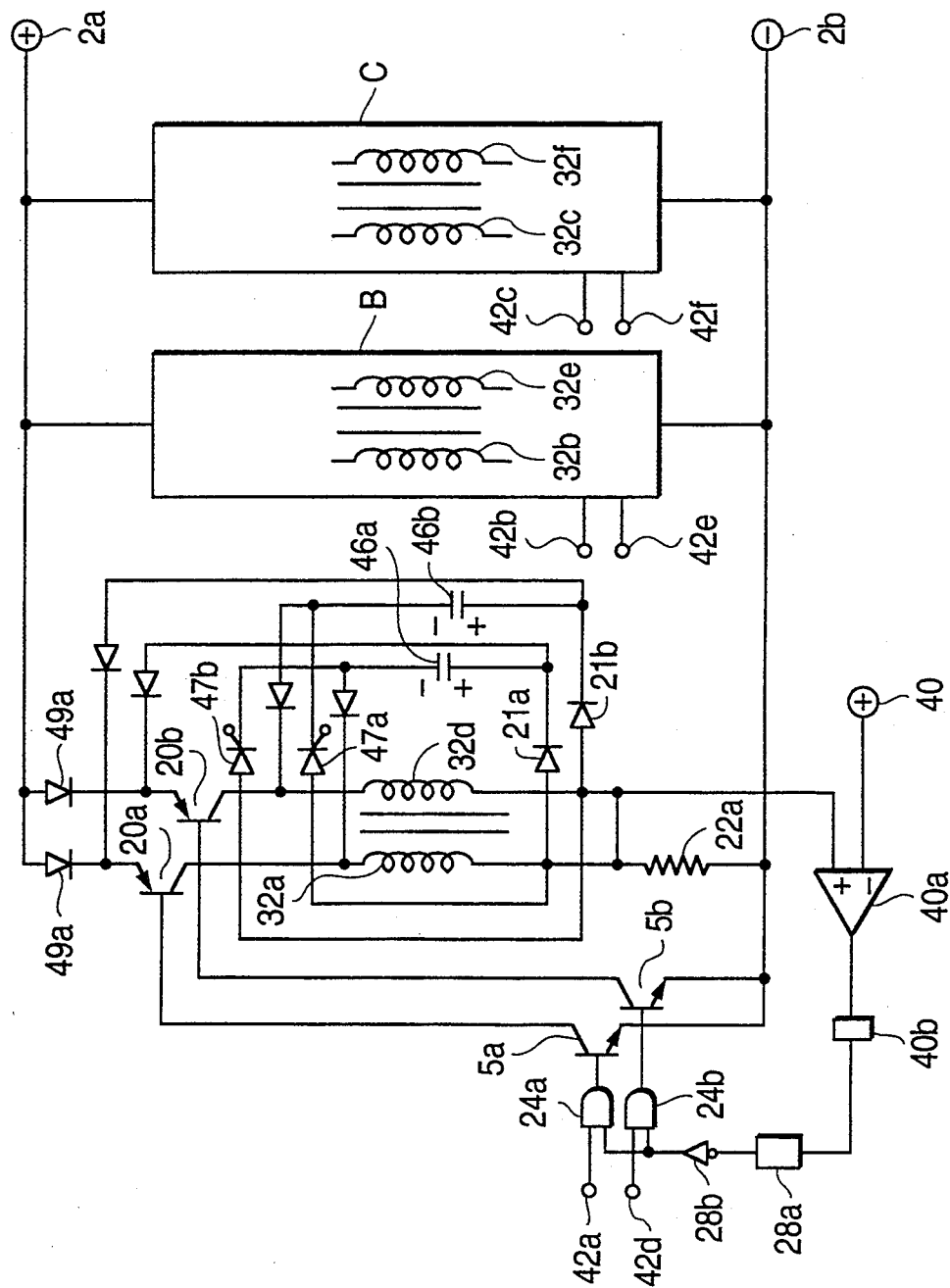
FIG. 13 is a circuit diagram showing a current supply control circuit for a three-phase DC motor having a magnet rotor.

In FIG. 13, armature coils 32a and 32d are armature coils being wound around No.1-phase magnetic poles by the bifilar winding. These coils 32a and 32d constitute one armature coil for permitting the reciprocative current supply operation. That is, the magnetic pole is magnetized to be an N-pole when the armature coil 32a is activated, while it is magnetized to be an S-pole when the armature coil 32d is activated.

The No.2-phase armature coils 32b, 32f and the No.3-phase armature coils 32c and 32d are constituted in the same manner as the No.1-phase armature coils 32a and 32d.

Terminals 42a and 42d are supplied with the position detecting signals represented by curves 36a and 36b and curves 43a and 43b of FIG. 15. As the constitution of circuit is the same as the circuit of FIG. 9, its function and effect are similar.

Block circuits B, C are circuits for controlling the activation/deactivation of armature coils 32b, 32e and armature coils 32c, 32f, respectively, and have the same constitution as above-described circuit.

Terminals 42b and 42e are supplied with electric signals of the curves 37a and 37b, the curves 44a and 44b of FIG. 15, while terminals 42c, 42f are supplied with electric signals of the curves 38a and 38b, the curves 45a and 45b.

Figure 9:
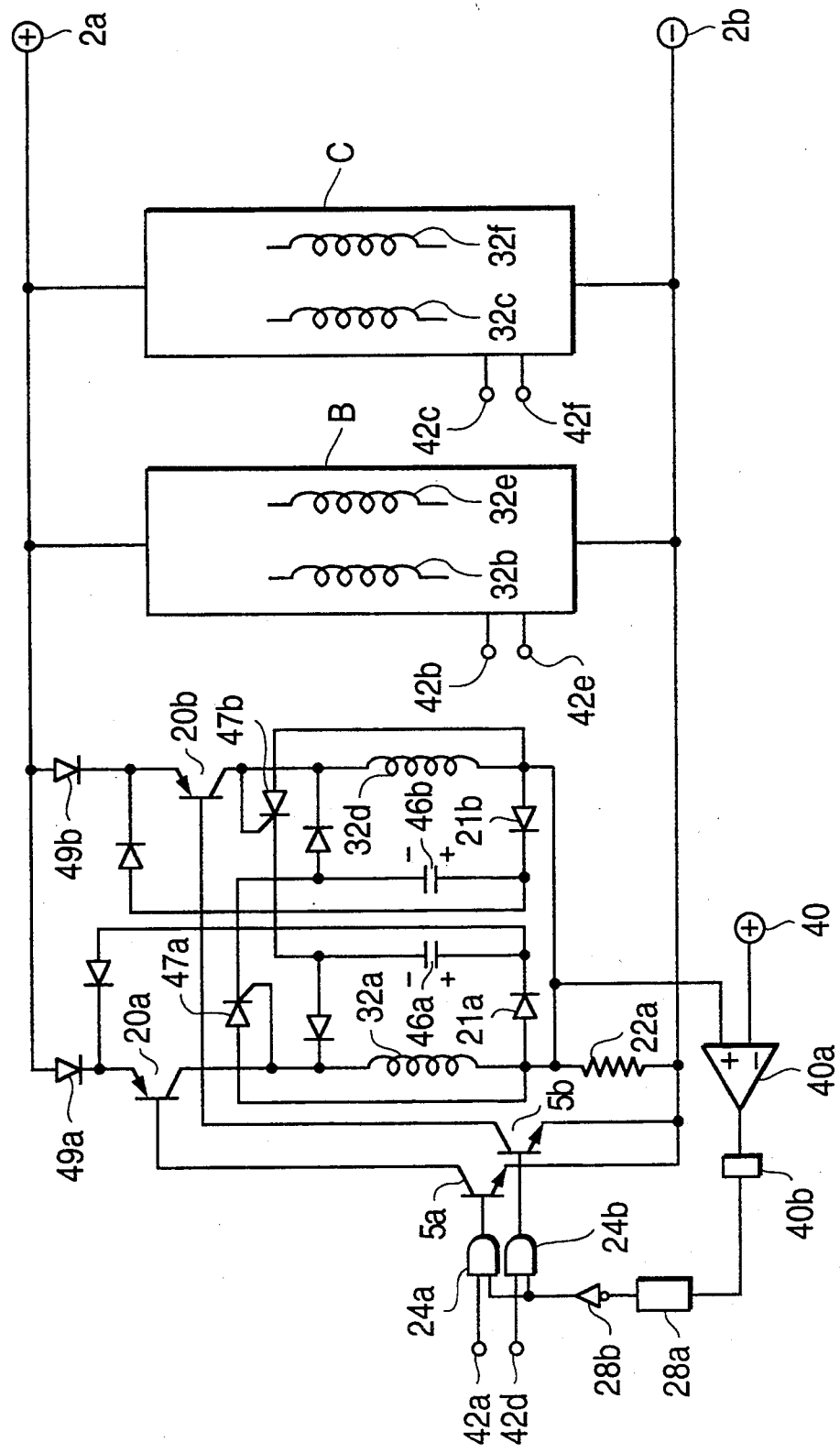
FIG. 9 is a circuit diagram showing a current supply control circuit for armature coils of a three-phase full-wave current supply mode.

With this constitution, like the case of FIG. 9, no torque reduction and no counter torque occur in a high-speed region, and, therefore, a high-speed motor having good efficiency can be obtained. Furthermore, this circuit is characterized by that the number of expensive power elements can be reduced to a half of that required for the conventional circuit; i.e. three sets of transistor bridge circuits.

Gate terminals of SCRs 47a and 47b are connected with collectors of the transistors 20a and 20b respectively. Activation of corresponding transistor causes generation of a gate current. Accordingly, discharge circuit of the capacitors 46a and 46b are closed.

Although this embodiment is substantially identical with the circuit of FIG. 9, it is possible to utilize the current supply circuits of FIGS. 11 and 12.

The chopper circuit has the same function and effect as the previously described one comprising the same components suffixed by the same reference numerals in the previous embodiment. It is also possible to use the chopper circuit for the constant speed control by a conventional means. Unlike the case of reluctance type motor, a DC motor capable of operating at rotational speed of increase up to several thousands rpm is already known. Thus, a high-speed region referred to in this specification, within which a DC motor embodying this invention is supposed to operate, should be understood to include at least several tens of thousand rpm.

Next, another embodiments will be described; however those shown in FIGS. 1 and 3 will be omitted, since they have already been described previously.

A current supply control circuit will be explained below with reference to FIG. 21.

At lower ends of the armature coils 32a, 32b and 32c are inserted with transistors 20a, 20b and 20c. The transistors 20a, 20b and 20c serve as semiconductor switching elements and can be replaced by other semiconductor elements having the same effect. A DC electric power source supplies electric power from its positive and negative terminals 2a and 2b.

This embodiment is characterized by a simplified circuit configuration due to that only one transistor (transistor 20a, 20b, or 20c) is provided at a lower end of each armature coil, i.e. a negative terminal side of the DC electric power source.

FIG. 8 shows a conventional circuit, in which two transistors 19a, 19b or 19c, 19d are provided at both ends of each armature coil 6a and 6b. Accordingly, in the case of conventional circuit, number of transistors per armature coil is twice as that required in the case of the present invention. As the transistors 19a–19d to be used as power elements are expensive, thereby making conventional circuit expensive. Besides, the transistors 19a, 19c, provided at positive terminal side, will require another electric power source to perform current supply control in response to input signals of terminals 19-1, 19-2, thereby also contributing to the increase in the cost of circuit. That is, the conventional circuit has the above-described two disadvantages.

With the circuit embodying the present invention, however, such disadvantages of the conventional circuit can be removed. When an armature coil is activated, its exciting current builds up slowly due to large inductance. Magnetic energy stored in the armature coil is returned through diodes 6c, 6d to the DC electric power when deactivated, and this also causes reduction of current to be delayed. This further causes the fall of both rotational speed and efficiency. Such disadvantages may be resolved by increasing DC electric power source voltage; however, rotating a motor at 10 thousands r.p.m. with 1 Kw output will require voltage, e.g. 1000 volts or more, which is too high for practical use. The present invention can solve such a problem, too.

Details of the circuit shown in FIG. 21 will be explained below. Position detecting signals of curves 36a and 36b, curves 37a and 37b, and curves 38a and 38b in FIG. 15 are inputted from terminals 42a, 42b and 42c.

The above-described signals are inputted through AND circuits 24a, 24b, 24c, to transistors 20a, 20b and 20c through their bases for activation, thereby activating armature coils 32a, 32b and 32c.

A terminal 40 is supplied with a reference voltage for specifying an armature current. By changing a voltage of the terminal 40, an output torque can be changed. When an electric power switch (not shown) is turned on, an output of an operational amplifier 40a becomes a LOW-level since an input of a positive terminal of the operational amplifier 40a is lower than that of its negative terminal. As an input of an inversion circuit 28b is a LOW-level, an output of the inversion circuit 28b becomes a HIGH-level. Accordingly, the transistor 20a is turned on to activate the armature coil 32a. A resistance 22a is provided for detecting armature current flowing in the armature coils 32a, 32b and 32c.

Block circuits G, H represent electric circuits for controlling activation/deactivation of the armature coils 32b, 32c, respectively. These circuits have same constitutions as that of the current supply control circuit of armature coil 32a. Block circuits G and H include transistors 20b, 20c corresponding to the transistor 20a, and diodes 49b and 49c corresponding to the diode 49a.

One of above-described position detecting signal curves is shown as a curve 36a in a time chart of FIG. 14. As shown in FIG. 8, the armature coil 32a is supplied with an exciting current during a time period corresponding to this curve 36a. An arrow 23a shows a current supply angle of 120 degrees.

In an initial stage of the current supply period, building-up of the exciting current is delayed due to inductance of the armature coil. If the current is stopped, magnetic energy stored in the armature coil is discharged though diodes 6c, 6d in case of FIG. 8 to return to the electric power source. Therefore, the current decreases as shown by a second half portion of the curve 25; i.e. a right side of the dotted line J.

A section generating a positive torque is a 180-degree section shown by an arrow 23; therefore, counter torque is generated to decrease both output torque and efficiency. This phenomenon becomes increasingly conspicuous as the speed increases until it becomes impossible for the motor to be practically operated in a high-speed region.

This is because a time width of a positive torque generating section 23 becomes small in proportion to an increase of the rotational speed, while a time width of a counter torque generating section does not vary even if the motor speed becomes a high speed.

The same explanation is applicable to the current supply operation of the armature coils 32b and 32c based on other position detecting signals 36a, 37a and 38a.

Since a building-up of the curve 25 is also delayed, an output torque will decrease. That is, torque reduction occurs. This is because the magnetic pole and the salient pole interact to close the magnetic path, thereby generating a large inductance.

The reluctance type motor has a disadvantage such that it cannot increase its rotational speed despite being able to generate a large output torque. Such a disadvantage derives from above-described counter torque and torque reduction.

Figure 21:
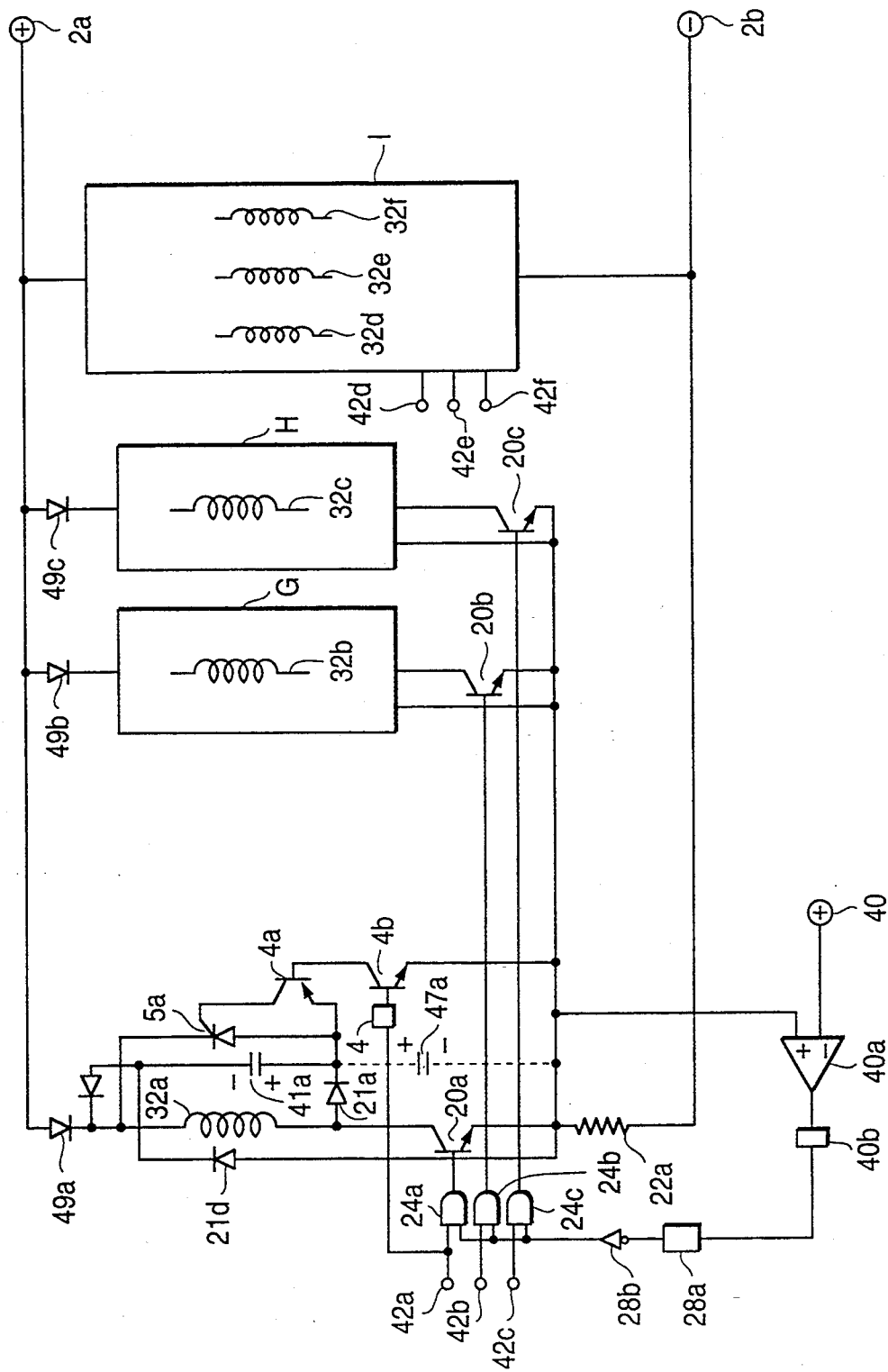
FIG. 21 is a circuit diagram showing another current supply control circuit for armature coils of a three-phase full-wave reluctance type motor.

An apparatus in accordance with the present invention is characterized by that above-mentioned disadvantage is eliminated by additionally providing back-flow preventing diodes 49a, 49b, 49c, a small-capacitance capacitor 41a, diodes 21a, 21b, semiconductor elements 4a, 4b, 5a and others shown in FIG. 21, and that only one semiconductor switching element (20a, 20b, or 20c), for controlling activation/deactivation of each armature coil, is provided at a negative voltage side of the DC electric power source.

When current is terminated at the terminal end of the curve 36a, magnetic energy stored in the armature coil 32a is discharged through the diodes 21a to the capacitor 41a to charge it up to a high voltage with polarities shown in the drawing, since the current is prevented from returning to the DC electric power source side by a function of the back-flow preventing diode 49a. Accordingly, the magnetic energy is sharply extinguished, and the current decreases steeply.

Curves 27, 27a and 27b shown in the first stage of the time chart of FIG. 14 cooperatively represent a current curve flowing in the armature coil 32a. The dotted lines on both sides of the current curve are spaced 120 degrees. The armature current decreases steeply like the curve 27b to prevent the occurrence of counter torque, so that the capacitor 41a is charged up to a high voltage and held at this voltage.

Next, in response to the position detecting signal represented by curve 36b, the transistor 20a is turned on to activate the armature coil 32a again. A voltage equivalent to a summation of the charged voltage of the capacitor 41a and the DC electric power source voltage (a voltage between the terminals 2a, 2b) is applied to the armature coil 32a in this case; therefore, an exciting current of the armature coil 32a builds up sharply.

By virtue of this phenomenon, the exciting current builds up rapidly as shown by the curve 27. The building-up of the current 27 becomes slow or moderate at its intermediate portion, because the magnetic energy will be lost by being transformed into thermal energy due to copper loss of coils and iron loss of magnetic cores when the magnetic energy is transferred between armature coils. A countermeasure for eliminating such a disadvantage will be discussed later.

As is explained above, the torque reduction and the counter torque are removed, and, as the exciting current takes substantially the rectangular waveform, an output torque is increased.

Functions of SCR (Silicon Controlled Rectifier) 5a and transistors 4a, 4b will be explained next. When a position detecting signal is inputted from the terminal 42a, the transistor 20a is turned on. In this case, block circuit 4 is also supplied with a position detecting signal. This block circuit 4 includes a differential circuit and a monostable circuit. A differential pulse generated by a building-up portion of position detecting signal activates the monostable circuit. Transistors 4a and 4b, turned on by an electric signal having a predetermined width, supplies a gate current to the SCR 5a to turn it on. Hence, discharge current flows in the order of positive electrode of the capacitor 41a→SCR 5a→armature coil 32a→transistor 20a→diode 21d→negative electrode of the capacitor 41a. Upon termination of discharge, the SCR 5a and the transistors 4a and 4b are turned off.

Next, a chopper circuit will be explained. When the armature current of the armature coil 32a increases, and therefore the voltage drop in the resistance 22a, which detects armature current value, increases will exceeding the reference voltage of the reference voltage terminal 40 (i.e. an input voltage of the negative terminal of the operational amplifier 40a), an output of the operational amplifier 40a rises to a HIGH-level. Accordingly, the differential circuit 40b generates a differential pulse to activate the monostable circuit 28a, whose output becomes an electric pulse having a predetermined width. As the output of the inversion circuit 28b is converted into a LOW-level electric pulse by its width, an output of the AND circuit 24a becomes a LOW-level signal having the same width, during which the transistor 20a is deactivated.

Accordingly, a current flowing in the armature coil reduces, and then this current flows through the diode 21a into the capacitor 41a to charge it up. When the output of the monostable circuit 28a extinguishes, outputs of the inversion circuit 28b and the AND circuit 24a again return to a HIGH-level; therefore, the transistor 20a is turned on to increase the exciting current of the armature coil 32a. When the armature current exceeds a predetermined value, an output of the operational amplifier 40a turns again to a HIGH-level, and the transistor 20a turns off during a predetermined period of time corresponding to the output pulse width of the monostable circuit 28a. Thus, the armature current reduces. Repetition of such a cycle constitutes a chopper circuit wherein the exciting current is maintained at a predetermined level regulated by the reference voltage of the reference voltage terminal 40.

A section indicated by the curve 27a of FIG. 14 is a section being chopper controlled. It is also possible to realize a constant speed control by means of a conventional means which controls the reference voltage of the reference voltage terminal 40 by a voltage varying in proportion to the rotational speed.

During above-described chopper operation, the capacitor 41a is repeatedly charged in response to output pulses from the monostable circuit 28a to increase its charge voltage and store electrostatic energy. When the transistor 20a is turned off at the terminal end of a position detecting signal, all the magnetic energy stored in the armature coil 32a is charged in the capacitor 41a. Another electrostatic energy, corresponding to chopper frequency and current attenuation time, is further added to the capacitor 41a. This large amount of electrostatic energy can compensate energy loss, i.e. previously described copper loss of armature coils and iron loss of magnetic poles in building up armature current when the armature coil 32a is next activated.

Accordingly, the exciting current builds up rapidly as shown by a dotted line 27c of FIG. 14; the current building up so steep that its waveform becomes substantially rectangular, thereby providing an output torque increasing effect. Capacitance of the capacitor 41a, frequency of chopper current, and output pulse width of the monostable circuit 28a need to be adjusted so that above-described function and effect can be obtained.

AND circuits 24b, 24c and transistors 20b, 20c also perform chopper control of armature current to be supplied to the armature coils 32b and 32c. Furthermore, block circuits G and H perform current supply control for making rapid building-up and trailing-off of exciting current of each armature coil.

Current supply to each armature coil can be initiated at any point within an approximately 30-degree section after the salient poles come to confront the magnetic poles. An adjustment is made by taking account of rotational speed, efficiency, and output torque in changing the fixing positions of the detecting coils 10a, 10b and 10c to be fixed on the armature side for serving as position detecting elements.

As is apparent from the foregoing description, according to the present invention, it becomes possible to drive a motor at a high speed with good efficiency and large output as a three-phase half-wave current supply type motor. Thus, the purpose of the present invention can be accomplished. In the case of a three-phase full-wave current supply mode, the same purpose can be accomplished by combining two sets of above-described half-wave current supply circuits.

The detail of this embodiment will be described later.

Curves 26a, 26b and 26c shown in FIG. 14 cooperatively represent a current supply curve of the armature coil. A gap between a dotted line 26-1 and a dotted line 26-2 represents a 120-degree width of the position detecting signal. A gap between the dotted line 26-1 and a dotted line 26-3 represents a 180-degree width of the output torque generating section.

Curves 9a, 9b and 9c show output torque curves. At the point of the dotted line 26-1, the current supply operation is initiated, and simultaneously the salient poles begin confronting the magnetic poles. The curve 9a represents a case where a current supplied to the armature coil is small; its torque becomes relatively flat; however, as shown by the curves 9b, 9c, a peak value of the torque tends to shift toward a left side as the current value increases; and also a width of the peak value becomes narrow.

In view of above-described torque characteristics and supplied current value, it is preferable to set an initiation timing of the current supply operation at an intermediate point of a 30-degree section after the salient poles begin to confront the magnetic poles by adjusting the fixing points of the position detecting coils 10a, 10b and 10c.

Charging voltage of the capacitor 41a increases inversely to its capacitance. Therefore, with small-capacitance capacitor 41a, the exciting current of the armature coil can be built up sharply, as well as reduced steeply. The motor can thus operate at a high-speed region and the disadvantage of the conventional reluctance type motor, that is, not being capable of operation in high-speed region, can be eliminated. It is preferable, however, to select the capacitor with appropriately small capacitance so that transistors in the circuit will not be damaged. The present invention can be embodied even when the capacitor 41a is replaced with a small-capacitance capacitor 47a as indicated by a dotted line in the drawing. This modified circuit will bring similar function and effect.

In the case of a two-phase motor, the present invention can be embodied by adopting the same current supply circuit as above-described embodiment using armature coils K, L, M and N, which will be explained later with reference to FIG. 18.

A case next explained will be a three-phase full-wave current supply mode motor embodying the present invention. As FIG. 2 showing a plane view and FIG. 4 showing a development have already been explained, and so only the matters differing from those shown previously will be described.

The current supply circuit for the armature coils 32a, 32b, 32c of FIG. 21 serves as a half-wave current supply section in the case of above-described three-phase full-wave current supply mode. A block circuit I is a current supply control circuit for armature coils 32d, 32e and 32f, which is similar to the circuit for the armature coils 32a, 32b and 32c. Input signals of curves 43a and 43b, curves 44a and 44b, curves 45a and 45b of FIG. 15 are inputted from the terminals 42d, 42e and 42f. Armature coils are activated by an amount of corresponding curve width. A chopper circuit including an operational amplifier 40a and a reference voltage terminal 40 is provided to regulate an armature current to a predetermined level.

As can be understood from the foregoing description, according to this embodiment, a three-phase full-wave current supply mode motor can be realized, featuring rapid building up and reduction of armature current. Accordingly, a motor capable of operating in a high-speed region with good efficiency and less ripple torque can be obtained.

Figure 17:
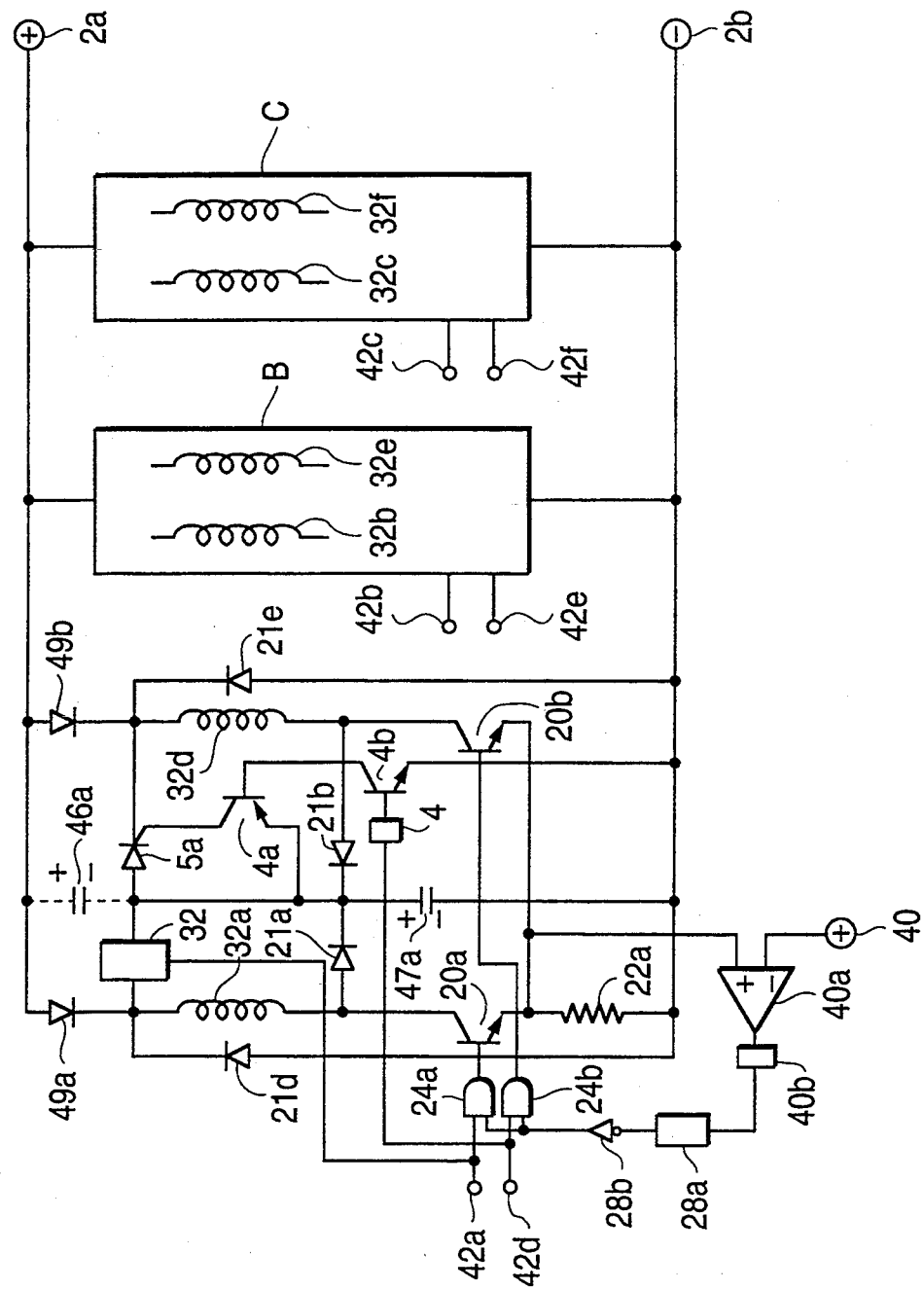
FIG. 17 is a circuit diagram showing a current supply control circuit for armature coils of a three-phase full-wave reluctance type motor.

A three-phase full-wave current supply mode motor will be next explained with reference to FIG. 17. In FIG. 17, position detecting signals represented by curves 36a and 36b and 43a and 43b are inputted from the terminals 42a, 42d. Accordingly, a 120-degree width current is supplied to the armature coils 32a and 32d with 180-degree phase difference.

The reference voltage terminal 40, the operational amplifier 40a, the differential circuit 40b, the monostable circuit 28a, the inversion circuit 28b, AND circuits 24a, 24b constitute a chopper circuit in the same manner as in FIG. 21, thereby maintaining exciting current at a predetermined level. When the exciting current is terminated, magnetic energy stored in the armature coil 32a is discharged through the diodes 21a and 21d into the small-capacitance capacitor 47a to charged it up to a high voltage.

When the rotor rotates 60 degrees, current supply to the armature coil 32d is initiated. As SCR 5a and transistors 4a and 4b are also turned on in this instance, the capacitor 47a supplies its charged high voltage to the armature coil 32d to build up the exciting current quickly. When the current supply to the armature coil 32d is terminated, magnetic energy stored in the armature coil 32d is discharged through the diodes 21b and 21e into the capacitor 47b to charge it up to a high voltage. When the current supply to the armature coil 32a is next initiated, the high voltage of the capacitor 47a is applied through a block circuit 32 to the armature coil 32a to make the building-up of the exciting current sharp.

Since the block circuit 4 is identical with other block circuit whose components are denoted by the common reference numerals, when the armature coil 32d is activated following the activation of transistor 20b, transistors 4a and 4b and SCR 5a are activated for the predetermined width, whereby capacitor 47a is caused to discharge to make rapid the building up of the exciting current.

The block circuit 32, which is identical with the circuit including the SCR 5a, the transistors 4a and 4b, is activated in response to an input signal from the terminal 42a. When the transistor 20a is turned on, this block circuit 32 allows the capacitor 47a to discharge through the armature coil 32a during a predetermined short period of time so as to make exciting current build up sharply. Accordingly, torque reduction and counter torque can be prevented.

During the armature current control by the chopper circuit, transistors 20a, 20b repeat turning on-and-off in the same manner as previous embodiment. Thus, magnetic energy of the armature coils 32a, 32d gradually charges the small-capacitance capacitor 47a to store electrostatic energy. As this electrostatic energy compensates the energy loss, i.e. copper loss and iron loss, occurring when the magnetic energy transfers between armature coils, the armature current can be to build up sharply, because its waveform can be made almost rectangular, thereby realizing a high-speed motor capable of preventing torque reduction within high-speed region.

Block circuits B and C are current supply control circuits for activating or deactivating armature coils 32b, 32e and 32c, 32f in response to input signals of the terminal 42b (Refer to curves 37a and 37b of FIG. 15), input signals of the terminal 42e (Refer to curves 44a and 44b of FIG. 15), input signals of the terminal 42c (Refer to curves 38a and 38b of FIG. 15), and input signals of the terminal 42f (Refer to curves 45a and 45b of FIG. 15), respectively. These block circuits, however, are identical with the cases of armature coils 32a and 32d in terms of the composition.

A chopper circuit for the armature coil is the same as a previous one; therefore, similar function and effect can be stained.

In the time chart of FIG. 14, curves 31a, 31b and 31c represent exciting current curves of the armature coils 32a and 32d corresponding to position detecting signal curves 36a and 36b and curves 43a. Curves 31d and 31e represent exciting current curves of the armature coils 32b and 32e, and curves 31f, 31g and 31h represent exciting current curves of the armature coils 32c and 32f.

In the case of a motor having large output, it will be preferable to substitute other semiconductor switching elements like IGBTs for the transistors 20a and 20b of FIG. 17.

The chopper circuit may be replaced with some other means as far as such means is capable of attaining the same purpose as that of the chopper circuit.

An embodiment of a current supply control circuit for the three-phase half-wave current supply mode motor will be next explained with reference to FIG. 23. Position detecting signals of curves 36a and 36b, 37a and 37b, 38a and 38b of FIG. 15 are inputted from terminals 42a, 42b and 42c. A 120-degree width exciting current is supplied to the armature coils 32a, 32b and 32c successively.

The operational amplifier 40a, the differential circuit 40b, the monostable circuit 28a, the resistance 22a, and the reference voltage terminal 40 are the same components as those suffixed by the same reference numerals in the previous embodiment; therefore they constitute a chopper circuit which maintains the armature current at a predetermined level.

When the exciting current supplied from the terminal 42a to armature coil 32a is terminated, magnetic energy stored in the armature coil 32a is discharged through the diodes 21a and 21d into the small-capacitance capacitor 47a, which will be charged up to a high voltage with polarities indicated in the drawing. During this operation, the -transistor 20a is held in a turned-off condition.

When the rotor rotates 240 degrees, the transistor 20c is turned on in response to an input signal to the terminal 42c to initiate current supply to the armature coil 32c. In this instance the capacitor 47a supplies its charged high voltage to the armature coil 32c to build up the exciting current quickly.

The building-up of the exciting current becomes sharp as the capacitance of the capacitor 47a decreases. However, the capacitance of the capacitor 47a should be determined taking into account withstanding voltages of other semiconductor elements.

Electrostatic energy stored in the capacitor 47a is discharged through the armature coil 32c, the transistor 20c, the resistance 22a, and the diode 21g. When the transistor 20a is turned off, magnetic energy stored in the armature coil 32a is transferred through the diodes 21a, 21d and the SCR 23a to charge the capacitor 47a up to a high voltage.

As the position detecting signal of the terminal 42a is supplied to the gate of the SCR 23a, magnetic energy of the armature coil 32a is gradually stored into the capacitor 47a during the chopper operation with turning on-and-off of the transistor 20a.

As will be later explained, the capacitor 47b, when charged up to a high voltage, discharges its electrostatic energy through the armature coil 32a and the diode 21a to the capacitor 47a to charge it up; however, as the SCR 23a is turned off in this instance, this discharge can be prevented.

When the transistor 20c is turned on, an input signal of the terminal 42c is supplied to the gate of the SCR 23c to turn on SCR 23c. Accordingly, magnetic energy in the armature coil 32c is gradually stored into the capacitor 47c during the chopper operation.

When the current supply to the armature coil 32c is terminated, magnetic energy stored in the armature coil 32c is discharged through the diodes 21c and 21f into the capacitor 47c to charge it up to a high voltage. When the rotor rotates 240 degrees, the transistors 20b is turned on upon signal input to the terminal 42b to activate the armature coil 32b. In this instance, the capacitor 47c supplies its charged high voltage to the armature coil 32b to make the building-up of the exciting current sharp. In this case, the discharge current passes through a diode 21i.

When the current supply to the armature coil 32b is terminated, magnetic energy stored in the armature coil 32b is discharged through the diodes 21b and 21e into the capacitor 47b to charge it up to a high voltage. When the rotor further rotates 240 degrees, the transistor 20a is turned on upon signal input to the terminal 42a. In this instance, the capacitor 47b supplies its charged high voltage through the diode 21h to the armature coil 32a to make the building-up of the exciting current sharp. As magnetic energy is discharged into a corresponding small-capacitance capacitor when current supply to each armature coil is terminated, reduction of the exciting current becomes steep.

As apparent from above explanation, according to the present embodiment torque reduction and counter torque can be prevented and therefore a motor capable of operating in a high-speed region with high efficiency can be obtained. Furthermore the circuit can be manufactured at low cost, because the number of expensive power switching element can be reduced to only one at a negative voltage side of each armature coil, thereby accomplishing the purpose of the present invention.

With high voltages of the capacitors 47a, 47b and 47c, exciting current supplied to the armature coils 32c, 32a and 32b build up quickly. Input signals (i.e. position detecting signals) of the terminals 42a, 42b and 42c are fed to the bases of the SCRs 23a, 23b, 23c respectively. Accordingly, during the chopper operation with turning on-and-off of the transistors 20a, 20b and 20c, capacitors 47a, 47b and 47c gradually store magnetic energy of corresponding armature coils in accordance with chopper frequency. This storage in the capacitors 47a, 47b and 47c compensates the energy loss, i.e. copper loss and iron loss, occurring when magnetic energy transfers between armature coils, thereby making the armature current to build up sharply.

The same purpose will be accomplished even if the capacitors 47a, 47b and 47c are replaced with capacitors 46a, 46b and 46c indicated by a dotted line in the drawing. In this case, the capacitors 46a, 46b and 46c will accompany, at their negative electrode side, circuits comprising components equivalent to the SCRs 23a, 23b, 23c and the diodes 21g, 21h, 21i, though they are not shown in the drawings.

In the same manner as in the previous embodiments, diodes 49a, 49b and 49c prevent current from flowing back to the DC electric power source side due to high-voltage of the capacitors 47a, 47b and 47c. A block circuit D is added in the case of a three-phase full-wave current supply mode.

Block circuit D is identical in configuration with the previously described circuit for controlling current supply to the armature coils 32d, 32e and 32f. Position detecting signals of curves 43a and 43b, curves 44a and 44b, and curves 45a and 45b of FIG. 15 are inputted from the terminals 42d, 42e and 42f, respectively so that a 120-degree width exciting current is supplied to each armature coil. A chopper circuit for controlling current supply to the armature coils 32d, 32e and 32f is provided independently.

With above arrangement, a three-phase full-wave current supply mode reluctance type motor can be realized to accomplish the purpose of the present invention.

Figure 23:
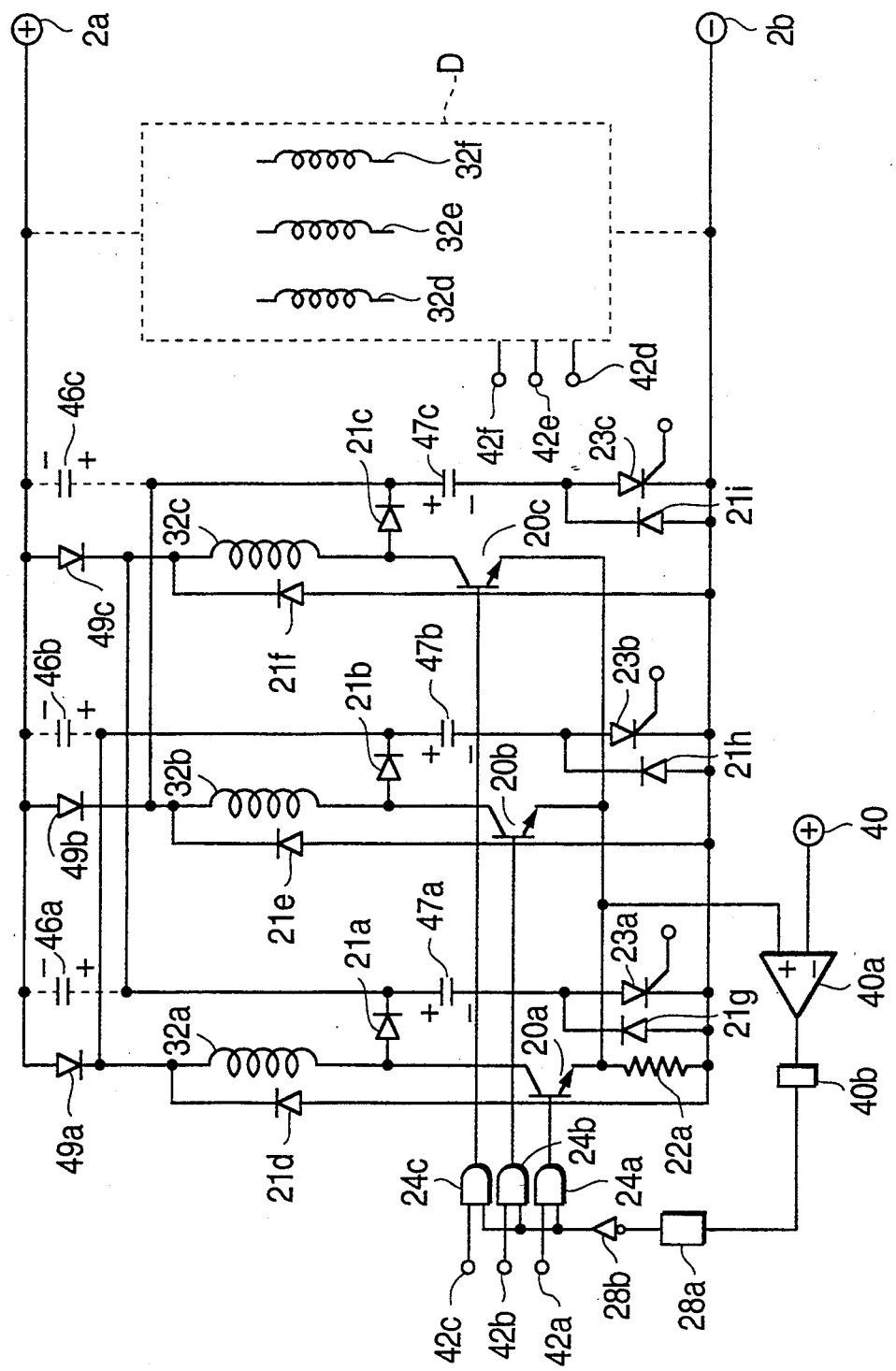
FIG. 23 is a circuit diagram showing a current supply control circuit of armature coils of a three-phase half-wave or full-wave reluctance type motor; full-wave reluctance type motor.
Figure 24:
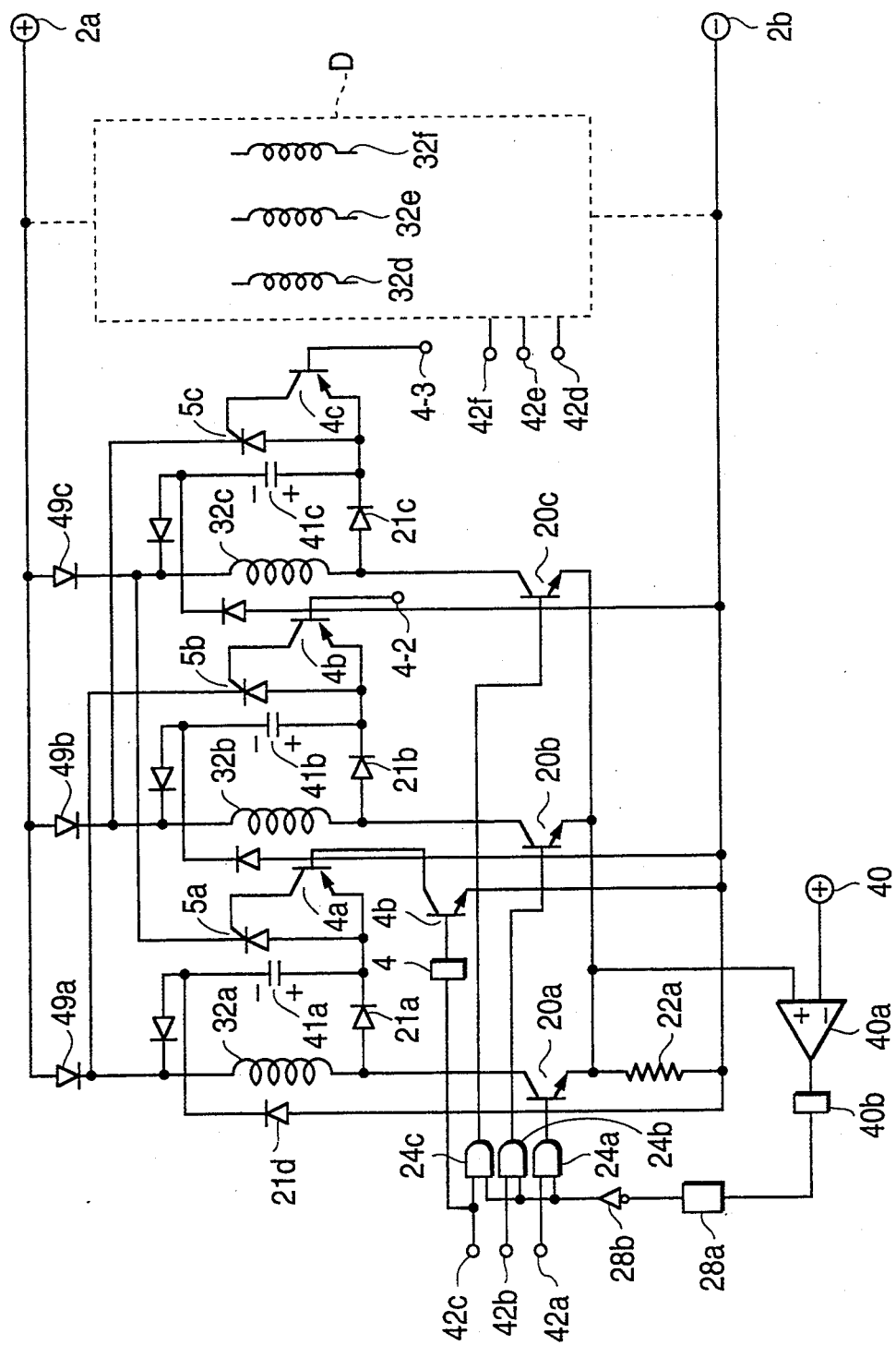
FIG. 24 is a circuit diagram showing a modification of the current supply control circuit of FIG. 23.

FIG. 24 shows a modified embodiment of the circuit of FIG. 23.

When the transistors 20a, 20b and 20c are turned off at the terminal end of the position detecting signal, the capacitors 41a, 41b and 41c are charged up to a high voltage through diodes 21a, 21b and 21c and held thereto. In this case, if transistors 4a, 4b, SCR 5a are turned on in response to an electric pulse of predetermined width obtained at a beginning end of the position detecting signal inputted from the terminal 42c, charged high voltage of the capacitor 41a is applied to the armature coil 32c to build up the exciting current sharply. (Above electric pulse can be obtained by the block circuit 4 whose configuration is identical with the block circuit 4 of FIG. 17) The transistor 20c is turned on in this condition.

The transistors 4b and 4c receive, at their base terminals 4-2 and 4-3, electric pulses obtained at beginning ends of position detecting signals inputted from the terminals 42a and 42b through the similar means; therefore, the SCRs 5b and 5c are turned on during a period of time corresponding to the width of these electric pulses. Charged high voltage of the capacitors 41b, 41c therefore make exciting current of armature coils 32a, 32b to build up sharply.

Function of the chopper circuit is similar to that of FIG. 23. Accordingly, current supply control can be carried out in the same manner as in the embodiment of FIG. 23. Thus, the purpose of the present invention can be accomplished.

A block circuit D, controlling exciting current of armature coils 32d, 32e and 32f, is identical with that of armature coils 32a, 32b and 32c. Hence, a three-phase full-wave current supply mode is realized to accomplish the purpose of the present invention.

Capacitors 47a, 47b, 47c or their substitutes 46a, 46b and 46c, serving as charging means for storing magnetic energy when armature coils are deactivated, are similar to those of FIG. 23. Means for discharging electrostatic energy, stored in the capacitors 47a, 47b and 47c at a high voltage, to armature coils is also similar to that of FIG. 24. The transistor 4b receives, at its base terminal 4-1, an electric pulse obtained at a beginning end of position detecting signal inputted from the terminal 42c. Therefore, the transistors 4b, 4a, SCR 5a are turned on during a period of time corresponding to the electric pulse. Accordingly, an exciting current of armature coil builds up sharply when the transistor 20c is turned on.

Block circuits 58a and 58b are identical with the driving circuit of above-described SCR 5a. The block circuit 58a is turned on in response to an electric pulse obtained at a beginning end of the input signal to the terminal 42a during a period of time corresponding to this electric pulse. The block circuit 58b is turned on in response to an electric pulse obtained at a beginning end of the input signal to the terminal 42b during a period of time corresponding to this electric pulse. Hence, exciting current of corresponding armature coil can build up sharply. The chopper circuit functions in the same manner as in the previous embodiment. Block circuit D has similar function, too. Thus, the purpose of the present invention can be accomplished.

Technical features of the present invention can be applied to a two-phase full-wave type motor. Its detail will be explained hereinafter. Although there is not shown a plane view of this embodiment, FIG. 5 shows its development which has already been explained, and the same explanation will not be repeated except the explanation concerning the differences.

Figure 18:
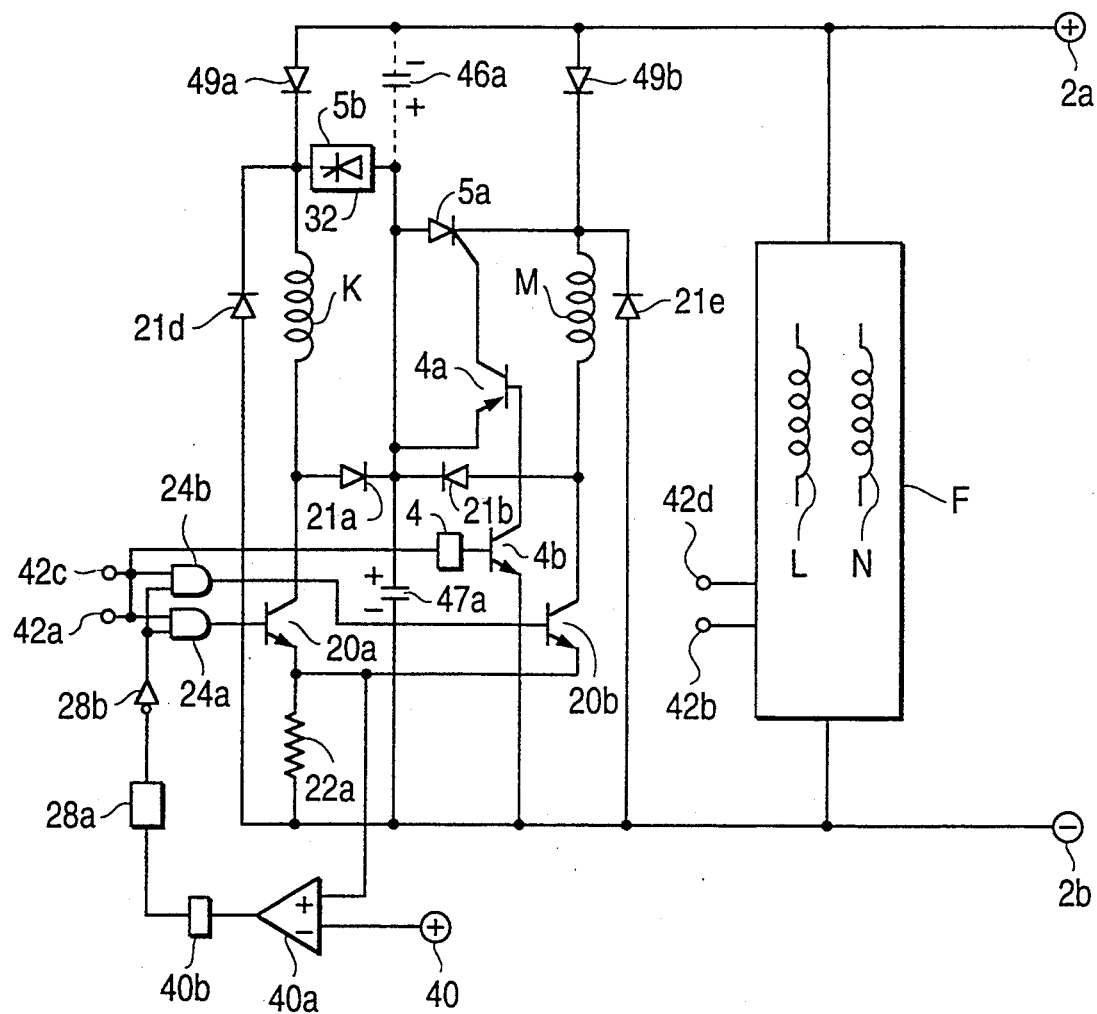
FIG. 18 is a circuit diagram showing a current supply control circuit for armature coils of a two-phase full-wave reluctance type motor.

Next, with reference to FIG. 18, the current supply operation of the armature coil is explained. In FIG. 18, armature coils K and M represent armature coils 17a, 17e and 17c, 17g of FIG. 5, respectively. Two armature coils are connected in series or in parallel. Downside ends of the armature coils K and M are connected to the transistors 20a and 20b. These transistors 20a and 20b function as semiconductor switching elements and can be replaced by other semiconductor elements having the same effect. Electric power is supplied from the positive and negative terminals 2a and 2b of the DC electric power source.

If the HIGH-level electric signal is inputted from the input terminal 42a, the transistors 20a is turned on to activate the armature coil K. Furthermore, if the HIGH-level position detecting signal is inputted from the input terminal 42c, the transistor 20b is turned on to activate the armature coil M.

The rotor 3 of FIG. 5 is made of conductive material, and is provided coaxially with the rotor 1 so as to rotate synchronously. The rotor 3 is provided with protruding portions 3a–3d. The width of the protruding portion is 90 to 150 degrees. The coils 10d, 10e, 10d and 10e are constituted in the same manner as the previously described coils 10a, 10b and 10c. The coils 10d, 10e, 10d and 10e are disposed to confront the protruding portions 3a–3d. The coils 10d and 10e are spaced 90 degrees, and coils 10d, 10e are offset from the coils 10d, 10e by 180 degrees, respectively.

FIG. 6 is an electric circuit for obtaining position detecting signals from above-described coils, which has already been explained, and thus no further explanation will e made.

No.1 and No.1 position detecting signals of No.1-phase, inputted from terminals 42a and 42c of FIG. 18, are shown by curves 50a and 50b and curves 51a and 51b. No.2 and No.2 position detecting signals of No.2-phase, inputted from terminals 42b and 42d, are shown by curves 51a and 51b and curves 53a and 53b, respectively.

As the No.1 and No.1 position detecting signals are inputted from the terminals 42a and 42c, the current supply control to respective transistors can be executed. The No.1-phase armature coils K and M are supplied with 120-degree width current in response to respective position detecting signals.

In response to the position detecting signal 50a, the armature coil K is supplied with a current shown by the curve 27a of FIG. 14. A width between dotted lines is 120 degrees. A torque generating condition and its characteristics are the same as in the previously described embodiment of FIG. 17.

A chopper circuit, including the operational amplifier 40a, the reference voltage terminal 40, the resistance 22a, the differential circuit 40b, the monostable circuit 28a, the inversion circuit 28b, AND circuits 24a and 24b, functions in the same manner as in the previous embodiment. Function and effect of capacitor 47a, transistors 4a, 4b, SCR 5a, block circuit 4 are similar, too. Therefore, a building-up of the curve 27 and trailing-off of the curve 27b can be made sharp.

A block circuit 32, which turns on or off the SCR 5b, corresponds to the circuit of the aforementioned transistors 4a, 4b, SCR 5a, and the block circuit 4 as described above. That is, the block circuit 32 turns on the SCR 5b in response to a predetermined width electric pulse obtained at a beginning end of the position detecting signal inputted from the terminal 42a. Thus, charged high voltage in the capacitor 47a is applied to the armature coil K.

Electrostatic energy in the capacitor 47a is increased by the chopper circuit, so as to compensate the energy loss such as copper loss and iron loss occurring when magnetic energy transfers between armature coils.

A block circuit F provided for controlling activation of the armature coils L and N has the same constitution as the current supply circuit for the armature coils K and M. A chopper circuit is included in the block circuit F, although it is not disclosed in the drawing. Similar function and effect will be obtained by substituting the capacitor 46a for the capacitor 47a.

The armature coil L is activated in accordance with widths of the curves 52a and 52b of FIG. 16, and the armature coil N is activated in accordance with widths of the curves 53a and 53b. Their armature currents build up sharply and trail off steeply. As is explained in the foregoing description, a two-phase full-wave current supply mode reluctance type motor is realized, and the purpose of the present invention can be accomplished.

It is possible to realize a current supply operation having a 90-degree current width by inputting electric signals of the curves 54a and 54b and the curves 56a and 56b of FIG. 16 to the terminals 42a, 42c and further inputting electric signals of the curves 55a and 55b and the curves 57a and 57b to the terminals 42b and 42d.

In the case where the current supply width is set to 90 degrees, the motor can be driven at a high speed (100 thousands rpm with 1 kw output), although the motor output torque is decreased. To the contrary, in the case where the current supply width is set to 120 degrees, the motor output torque can be increased, while the motor speed is decreased to a half of that obtained in case of 90-degree width.

In the case shown in FIG. 5, the present invention can be embodied even where the magnetic poles have width of 180 degrees, and 10 salient poles are provided. Furthermore, it is also possible to form the 8n (n: a positive integer) pieces of magnetic pole having a 120-degree width. In this case, the number of the salient poles are increased correspondingly. In the case where the magnetic pole number is increased, the output torque is also increased, while the rotational speed is decreased.

Curves 30a and 30b shown in FIG. 14 represent armature currents supplied to the armature coils K, M while curves 30c and 30d represent armature currents supplied to the armature coils L and N. Curves 54a, 55a, 56a and 57a represent position detecting signal curves. Their current supply sections are 90 degrees and continuous with each other in the torque. As there is no overlapped portion between respective current supply sections, the ripple torque can be suppressed within a small value.

In respective embodiments, by providing teeth on both the magnetic poles and salient poles, the output torque can be increased. As the present invention is primarily constituted to drive the motor in a high-speed region, the ability to generate high output torque will provide a useful technique which is free of the disadvantage of the conventional art.

In an embodiment shown in FIG. 1, the invention can also be embodied even if the number of provided magnetic poles is 2n (n: a positive integer not less than 3) pieces. The number of salient poles are increased in accordance with increased number of the magnetic poles. The present invention is advantageous in that an output torque can be increased without decreasing rotational speed. Thus, this technical feature will be effective for a large-diameter motor.

Figure 19:
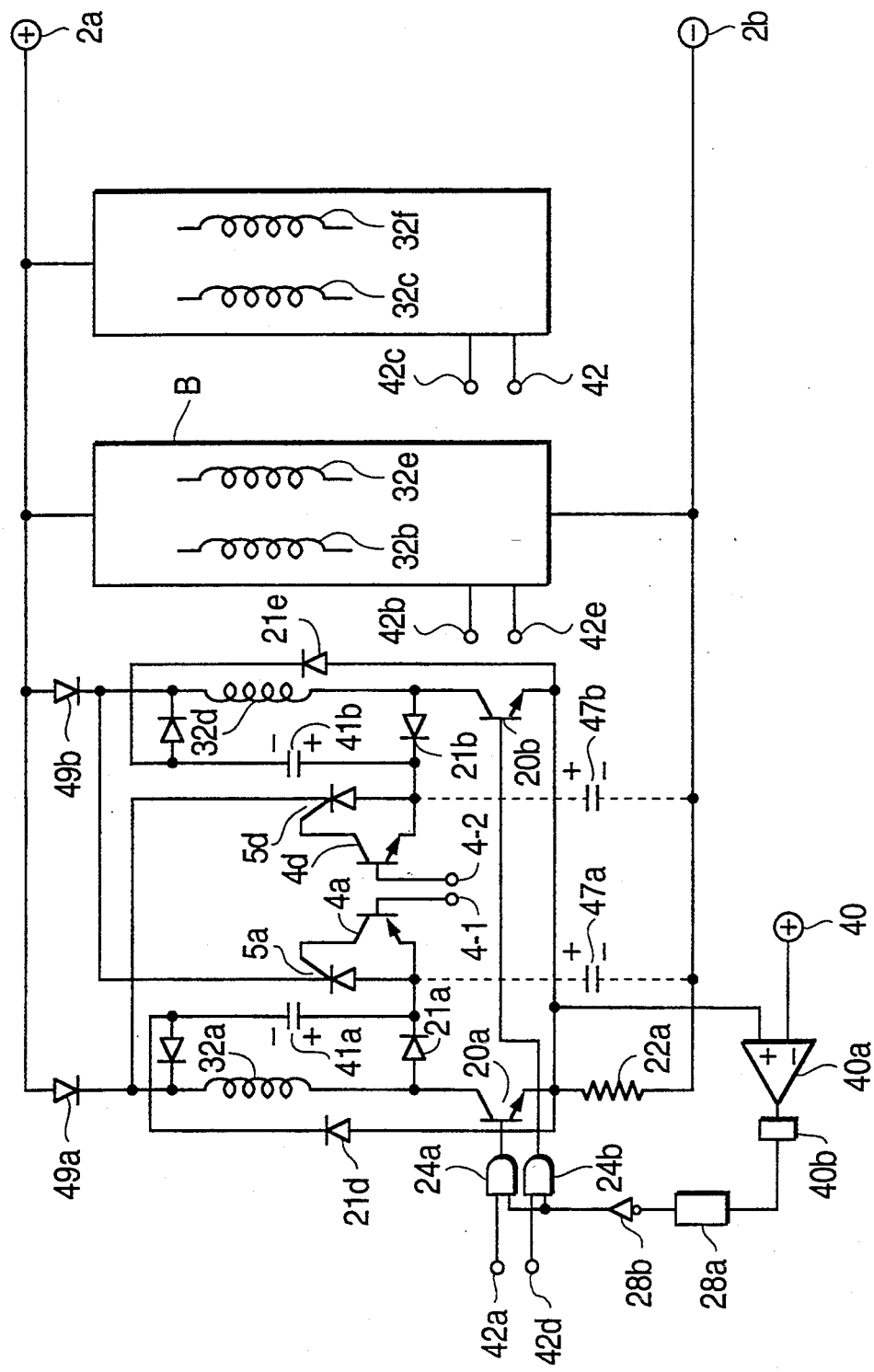
FIG. 19 is a circuit diagram showing another current supply control circuit for armature coils of a three-phase full-wave reluctance type motor.

Next, an embodiment of FIG. 19 will be explained. FIG. 19 shows a current supply circuit for armature coils of a three-phase full-wave mode motor.

Armature coils 32a, 32b and 32c serve as No.1-, No.2-, No.3-phase armature coils, and armature coils 32d, 32e, 32f serve as No.1-, No.2-, No.3-phase armature coils. Position detecting signals of curves 36a and 36b, and curves 43a and 43b of FIG. 15 are inputted from the terminals 42a and 42d. Upon turning-on of transistors 20a and 20b, the armature coils 32a and 32d are supplied with 120-degree current with 180-degree phase difference. Magnetic energy of the armature coil 32a is transferred into the capacitor 41a to charge it up to a high voltage when the transistor 20a is turned off.

When the rotor rotates 60 degrees, the transistor 20b is turned on in response to input signals (curves 43a and 43b of FIG. 15) fed from the terminal 42d.

The transistor 20b receives, at its base, signals of curves 43a and 43b of FIG. 15. A monostable circuit is activated by differential pulses obtained at the beginning ends of curves 43a and 43b. A predetermined width output pulse of the monostable circuit is fed to a terminal 4-1, after having been inverted through the inversion circuit. As the transistor 4a and SCR 5a are turned on, charged high voltage of the capacitor 41a is applied to the armature coil 32d to make armature current to build up sharply. Thereafter, a chopper circuit having the same configuration as previous embodiment regulates the armature current in accordance with a reference voltage of the reference voltage terminal 40. With chopper function, the capacitor 41b stores electrostatic energy. When the transistor 20b is turned off, magnetic energy of the armature coil 32d is discharged through the diode 21b into the capacitor 41b to further charge it up to a high voltage.

When the rotor rotates 60 degrees, the transistor 20a turns on in response to input position detecting signals of curves 36a and 36b. A predetermined width output pulse of the monostable circuit, which is activated by differential pulses obtained at the beginning ends of curves 36a and 36b, is supplied to a terminal 4-2, after having been inverted through the inversion circuit. As the transistor 4b and SCR 5d turn on in accordance with widths of these electric pulses, charged high voltage of the capacitor 41b is applied to the armature coil 32a to make armature current build up sharply.

Thereafter, the chopper circuit maintains the armature current at a predetermined level during 120-degree section. The capacitor 41a stores electrostatic energy corresponding to the chopper frequency (i.e. chopper repetition number).

Block circuits B and C represent current supply circuits for armature coils 32b, 32e and 32c, 32f respectively, and are identical with that of armature coils 32a and 43d. Electric signals of curves 37a and 37b and curves 38a, and 38b of FIG. 15 are inputted to the terminals 42b and 42c. Electric signals of curves 44a and 44b and curves 45a and 45b are inputted to the terminals 42e and 42f. Thus, the purpose of the present invention can be accomplished as explained in the foregoing. Diodes 21d and 21e constitute a part of discharge circuits for the capacitors 41a and 41b. The present invention can be embodied even if the capacitors 41a and 41b are replaced with capacitors 47a and 47b as indicated by a dotted line.

Removing a block circuit C, and replacing the armature coils 32a, 32d with armature coils K and M, and further replacing the armature coils 32b and 32e with armature coils L and N of FIG. 18, will realize a two-phase motor by being controlled in accordance with position detecting signals of FIG. 16. Thus, the purpose of the present invention can be accomplished.

Figure 20:
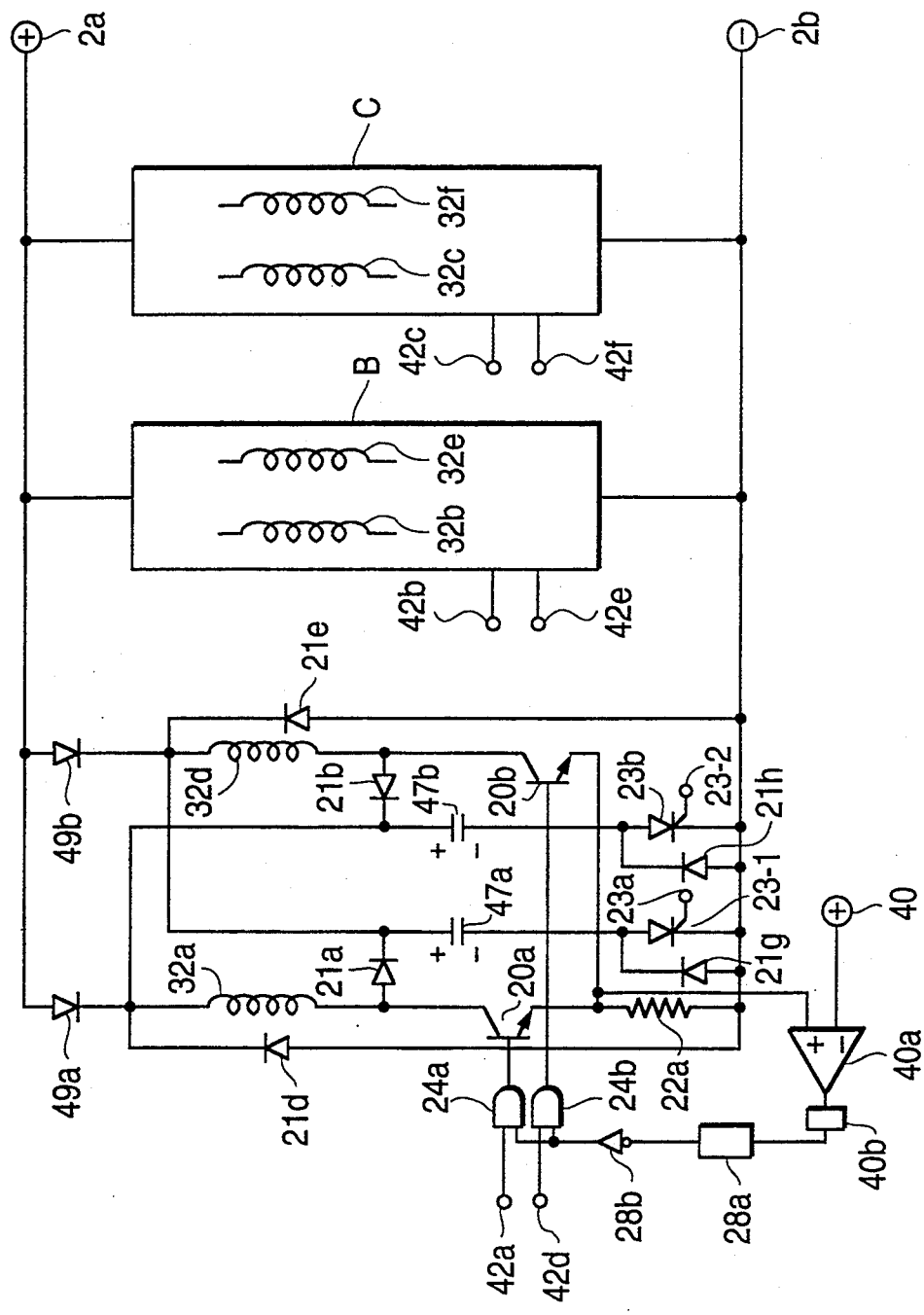
FIG. 20 is a circuit diagram showing a modification of the current supply control circuit of FIG. 19.

FIG. 20 shows a modified embodiment of FIG. 19, wherein the discharge circuits of the capacitors 47a and 47b are modified. In FIG. 20, the transistor 20a turns on in response to position detecting signals of curves 36a and 36b inputted from the terminal 42a, whereby the armature coil 32a is supplied with 120-degree width current. As the SCR 23a receives, at its gate terminal 23-1, an input electric signal from the terminal 42a, the capacitor 47a stores electrostatic energy in accordance with the chopper frequency during the chopper operation in above-described current supply section of armature current in the same manner as in FIG. 19.

When the transistor 20a turns off at the terminal end of the position detecting signal, all the magnetic energy stored in the armature coil 32a is transferred to the capacitor 47a to charge it up to a high voltage. When the rotor rotates 60 degrees, position detecting signals 43a and 43b are inputted to the terminal 42d to turn on the transistor 20b. Electrostatic energy in the capacitor 47a is discharged through the armature coil 32d, the transistor 20b, the resistance 22a, and the diode 21g in this order, thereby compensating energy loss such as copper loss and iron loss; therefore, armature current builds up sharply.

Thereafter, current is supplied from the DC electric power source during a 120-degree section, and the armature current is maintained at a predetermined level through the chopper circuit. With this chopper function, the capacitor 47b stores electrostatic energy.

When the transistor 20b turns off, magnetic energy of the armature coil 32d is transferred through the diodes 21b and 21e to the capacitor 47b to further charge it up to a high voltage. When the transistor 20a turns on in response to the next position detecting signal, electrostatic energy stored in the capacitor 47b is discharged through the armature coil 32a, the transistor 20a, the resistance 22a, and the diode 21h in this order. Thus, the armature current builds up sharply.

The block circuit B (comprising armature coils 32b and 32e) and block circuit C (comprising armature coils 32c and 32f), which perform current supply operation in accordance with position detecting signals inputted from the terminals 42b, 42e and 42c, 42f, is identical with the current supply control circuit of the armature coils 32a and 32d.

As apparent from the foregoing description, a three-phase full-wave current supply is realized, and the purpose of the present invention is accomplished.

As explained in FIG. 19, a two-phase full-wave current supply mode motor will be realized by removing the block circuit C. In the embodiments of FIGS. 19 and 20, a constant speed control can be realized by a conventional means which varies the reference voltage of the terminal 40 in accordance with the rotational speed signal.

Figure 22:
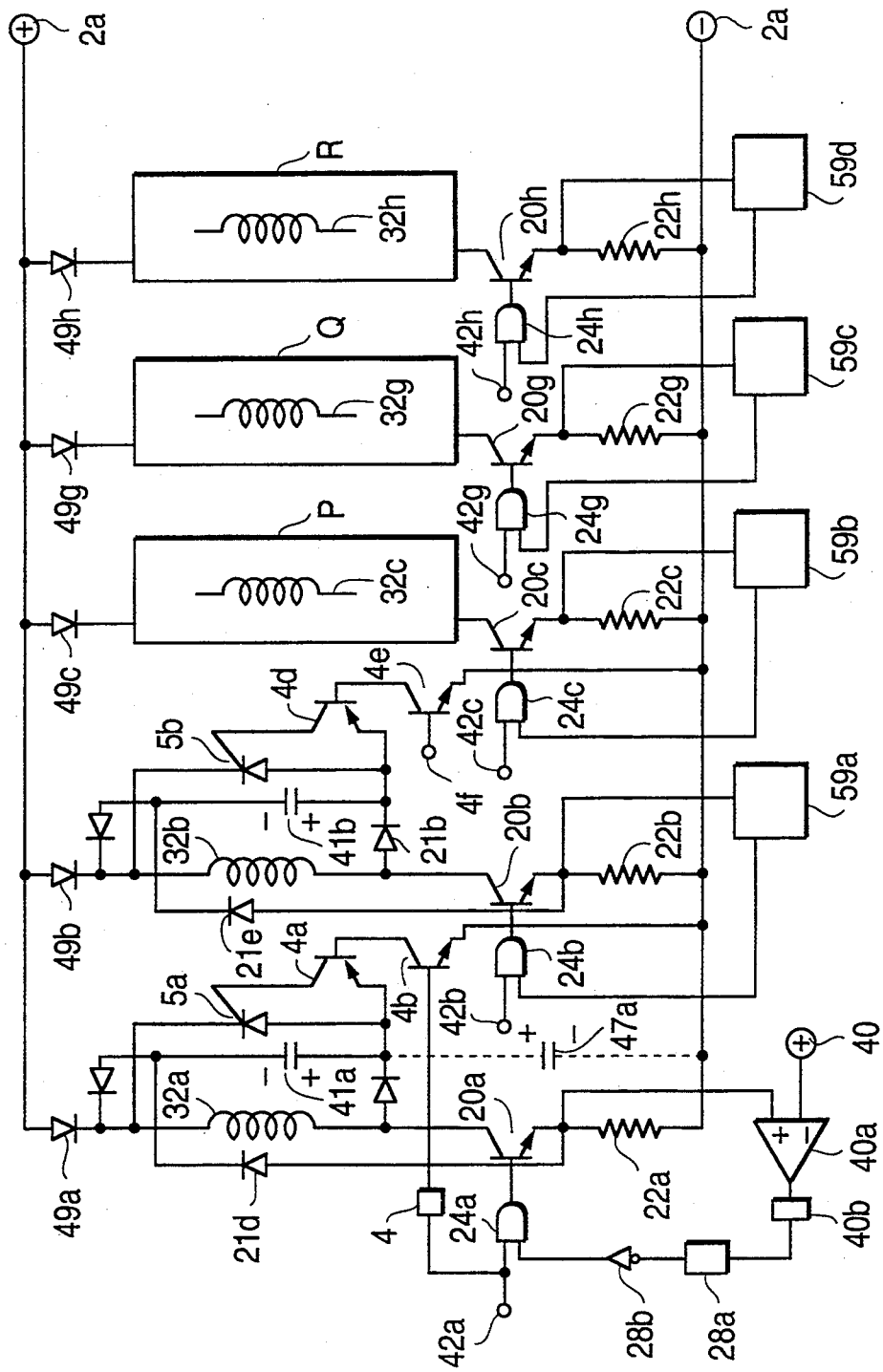
FIG. 22 is a circuit diagram showing a current supply control circuit for armature coils of a five-phase stepping motor.

FIG. 22 shows a current supply circuit in which technology of the present invention is embodied for a stepping motor. Although this embodiment shows a five-phase reluctance type motor, any plural-phase stepping motor can be realized with the same means. Five-phase stepping electric signals are inputted from the terminals 42a, 42b, 42c, 42g and 42h. Stepping electric signal can be obtained by inputting an output pulse of a pulse oscillator into a pulse distributer.

Input signals from the terminal 42a are rectangular stepping electric signals having a predetermined time width and being spaced one another with a predetermined equal width. Input signals from the terminals 42b and 42c are stepping electric signals successively delayed from the input signals of the terminal 42a by an amount of 1/5 pulse width. AND circuit 24a, reference voltage terminal 40, operational amplifier 40a, differential circuit 40b, monostable circuit 28a, and inversion circuit 28b constitute a chopper circuit, in order to maintain the exciting current of the armature coil 32a st set value.

The current supply control circuit for the armature coil 32a is identical with that of the armature coil 32a in FIG. 21. Accordingly, same function and effect will be obtained, and thus the current becomes similar in waveform to the input signal from the terminal 42a. Block circuits 59a and 59b, 59d respectively constitute chopper circuits, each comprising the operational amplifier 40a, the differential circuit 40b and others including the common reference voltage terminal 40, and AND circuits 24b, 24c, 24g, 24h and resistances 22b–22h which also constitute the chopper circuits, are used to maintain the exciting current of corresponding armature coils at a predetermined level. An input signal of the terminal 42b is inputted to the terminal 4f through a circuit having the same constitution as the block circuit 4.

As the functions of SCR 5b and transistors 4d and 4e corresponds to those of the SCR 5a and transistors 4a and 4b, the armature coil 32b is activated in response to a stepping signal inputted from the terminal 42b. Thus, the armature current has substantially the same waveform as that of the stepping signal even in a high-speed region.

Block circuits P, Q and R are identical with the circuit for the armature coils 32a and 32b. Diodes 49c, 49g and 49h corresponding to the diodes 49a and 49b, and transistors 20c, 20g and 20h corresponding to the transistors 20a and 20b are separately disclosed.

With above arrangement, a stepping motor can be realized by inputting five-phase stepping electric signals from the terminals 42a–42h. This stepping motor will be able to respond to a very large, e.g. several tens of thousands Hz, stepping electric signal, so that only advantages of reluctance type stepping motors are reserved while eliminating its disadvantages.

A three-phase stepping motor can be realized by modifying the circuit of the above embodiment to include only the armature coils 32a, 32b and 32c and using the reluctance type motor of FIG. 1. Providing a plurality of teeth on magnetic poles of FIG. 1 will not only provide a smaller stepping angle but increase the rotational speed.

Next explained is an embodiment which embodies the present invention in a conventional DC brushless three-phase motor having a magnet rotor.

Figure 26:
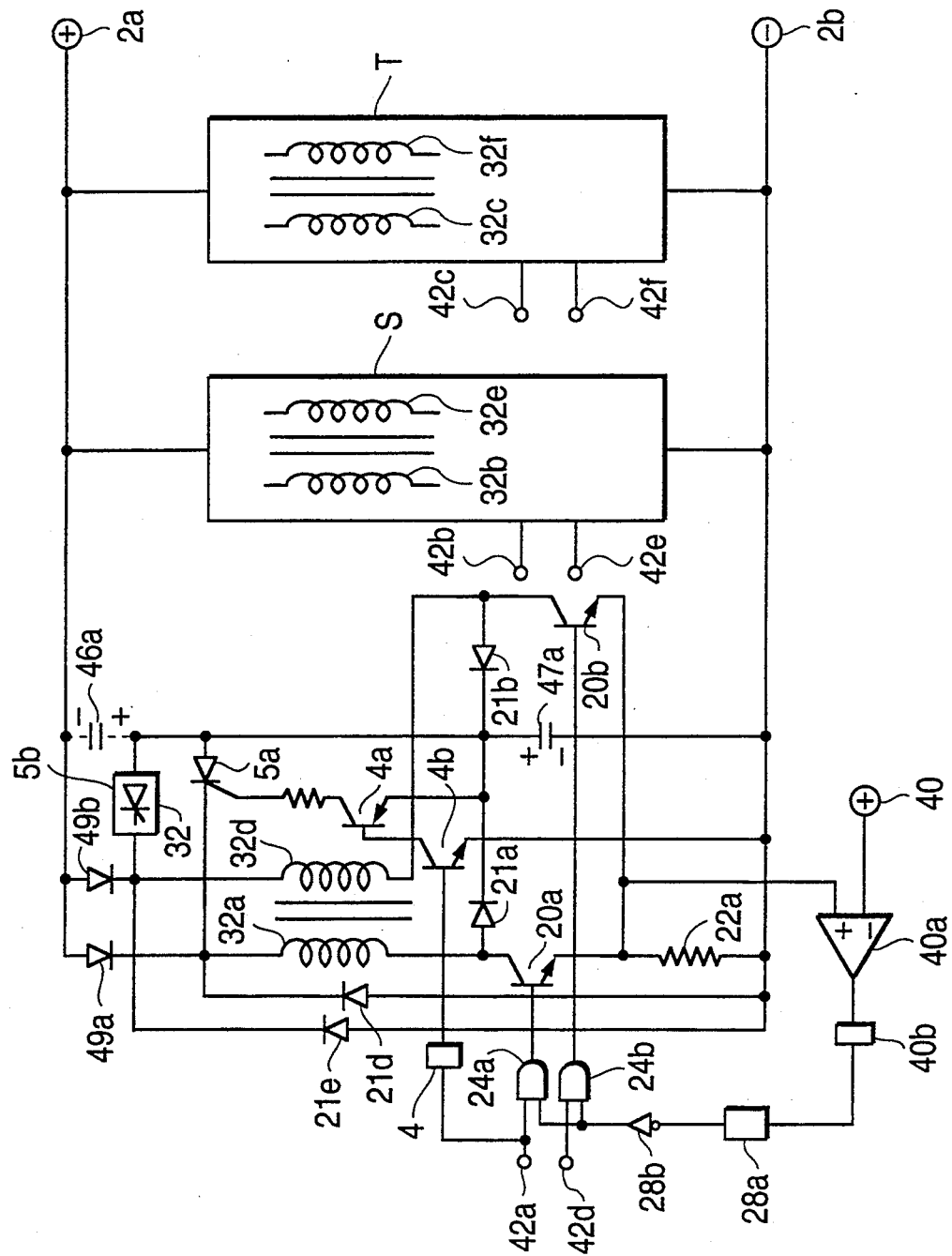
FIG. 26 is a circuit diagram showing a current supply control circuit for a three-phase DC motor having a magnet rotor.

In FIG. 26, armature coils 32a and 32d are armature coils wound around No.1-phase magnetic poles by the bifilar winding. These coils 32a and 32d normally constitute one armature coil to realize the reciprocative current supply operation. That is, the magnetic pole is magnetized to be an N-pole when the armature coil 32a is activated, while it is magnetized to be an S-pole when the armature coil 32d is activated.

The No.2-phase armature coils 32b and 32e and the No.3-phase armature coils 32c and 32f are constituted in the same manner as the No.1-phase armature coils 32a and 32d.

Terminals 42a and 42d are supplied with the position detecting signals of curves 36a and 36b and curves 43a and 43b of FIG. 15. As the constitution is the same as the circuit of FIG. 17, its function and effect are similar.

Block circuits B and C are circuits for controlling the activation/deactivation of armature coils 32b and 32e and armature coils 32c and 32f, respectively, and have the same constitution as above-described circuit.

Charged high voltage in the capacitor 47a is applied to the armature coil 32a through the SCR 5a, which turns on at the beginning end of a position detecting signal inputted from the terminal 42a, to make armature current to build up sharply. Charged high voltage in the capacitor 47a is applied to the armature coil 32d through the SCR 5b, which turns on at the beginning end of a position detecting signal inputted from the terminal 42d, to make armature current to build up sharply.

The block circuit 32 has a composition identical with those of the SCR 5a, the transistors 4a, 4b, and the block circuit 4, and is activated in response to an electric pulse produced at the beginning end of an input signal supplied from the terminal 42d to turn on the SCR 5b by an amount of the input signal. The chopper circuit charges the capacitor 47a in accordance with its frequency. This charged electrostatic energy is utilized to compensate copper loss and iron loss occurring when magnetic energy transfers between armature coils. Hence, the armature current can be made to change quickly in the same manner as in the case of FIG. 17.

Terminals 42b and 42e are supplied with electric signals of the curves 37a and 37b, the curves 44a and 44b of FIG. 15. Terminals 42c and 42f are supplied with electric signals of the curves 38a and 38b, the curves 45a and 45b.

With this constitution, like the case of FIG. 17, no torque reduction and no counter torque are generated in a high-speed region and, therefore, a high-speed motor having good efficiency is obtained. Furthermore, this circuit is characterized in that the number of expensive power elements can be reduced to a half of the conventional circuit; i.e. to a half of three sets of transistor bridge circuits.

Figure 27:
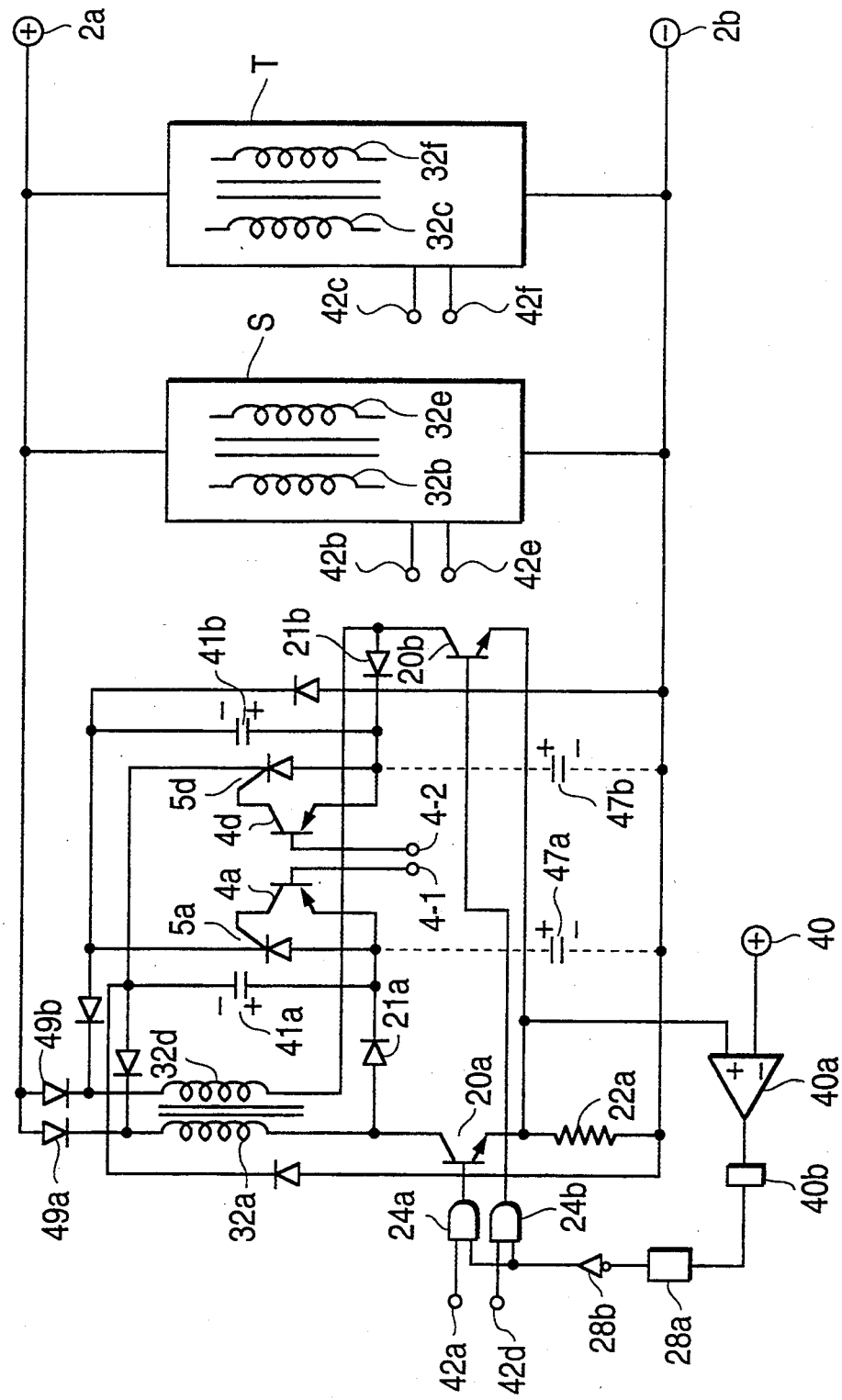
FIG. 27 is a circuit diagram showing a modification of the current supply control circuit of FIG. 26.

FIG. 27 shows an embodiment of a three-phase DC motor having a magnet rotor, which embodies the current supply control means of the three-phase full-wave reluctance type motor of FIG. 19. Its function and effect are the same as the embodiment of FIG. 11, and so no further explanation will be made.

Figure 28:
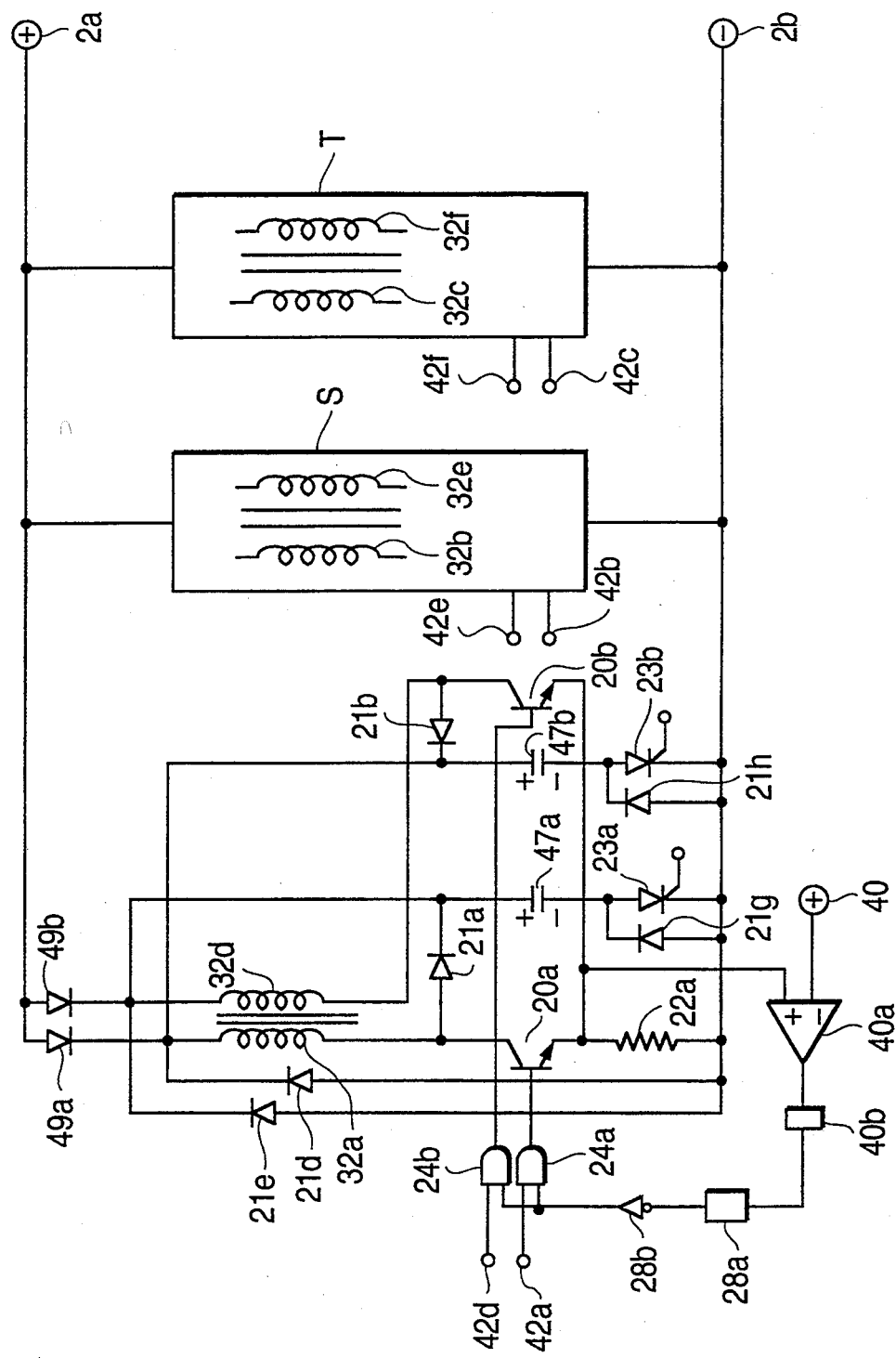
FIG. 28 is a circuit diagram showing another modification of the current supply control circuit of FIG. 26.

FIG. 28 shows an embodiment of a three-phase DC motor having a magnet rotor, which embodies the current supply control means of the three-phase full-wave reluctance type motor of FIG. 20. Its function and effect are the same as the embodiment of FIG. 20, and so no further explanation will be made.

Figure 25:
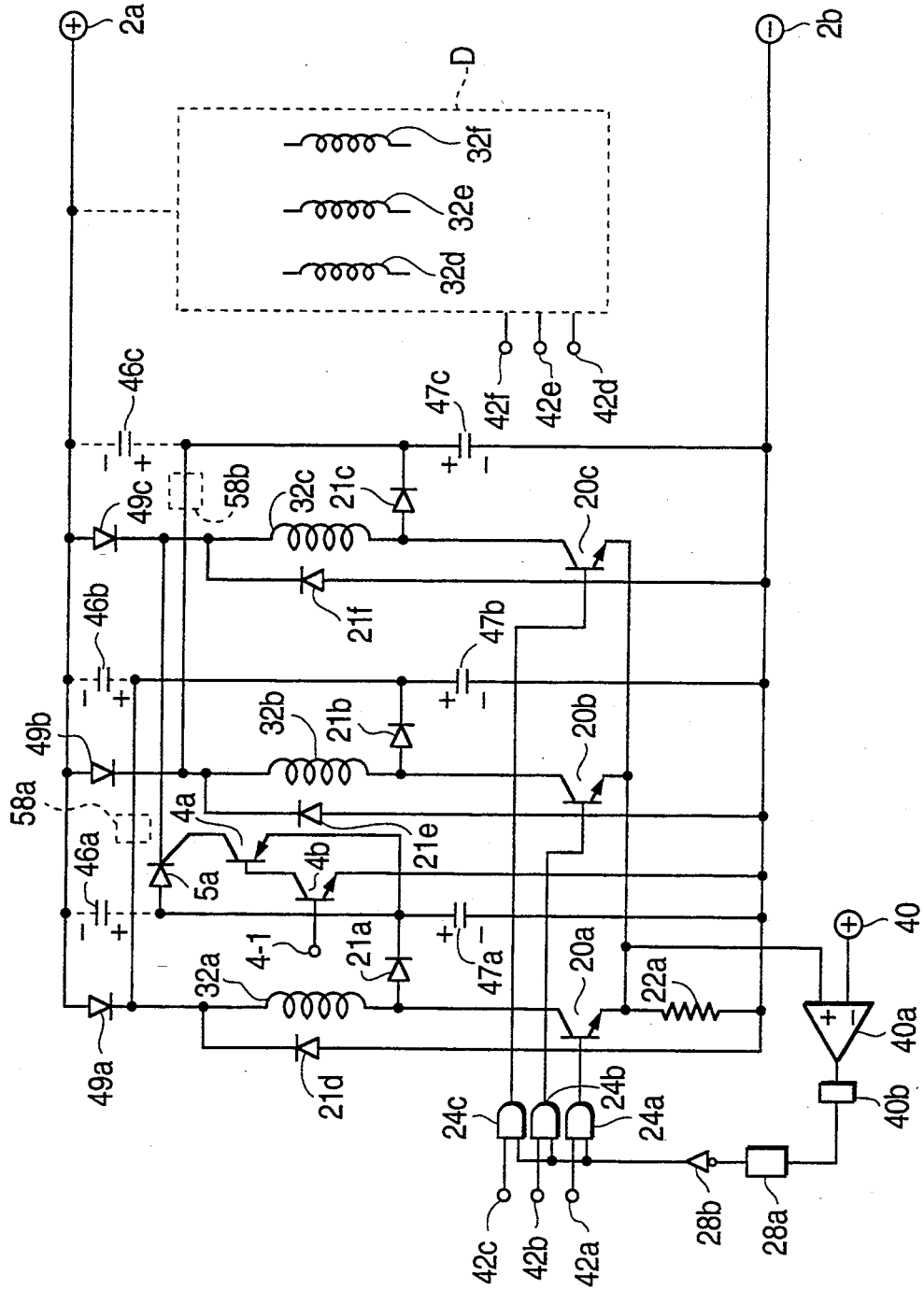
FIG. 25 is a circuit diagram showing another modification of the current supply control circuit of FIG. 23.

It will be apparent that the purpose of the present invention can be accomplished by the current supply control circuits of FIGS. 27 and 28. Even if the current supply control means shown in FIGS. 23, 24 and 25 are incorporated into the DC motor having a magnet rotor, the present invention can be embodied.

Next, another embodiments will be described. FIGS. 1 and 3, having been already explained, will be explained no further.

A current supply control circuit will be explained below with reference to FIG. 30.

At lower ends of the armature coils 32a, 32b and 32c are inserted with transistors 20a, 20b and 20c. The transistors 20a–20c, serve as semiconductor switching elements and can be replaced by other semiconductor elements having the same effect. A DC electric power source supplies electric power from its positive and negative terminals 2a and 2b.

This embodiment is characterized by a simplified circuit configuration, in which only one transistor (transistor 20a, 20b, or 20c) is provided at a lower end of each armature coil, i.e. a negative terminal side of the DC electric power source.

FIG. 8 shows a conventional circuit, in which two transistors 19a and 19b or 19c and 19d are provided at both ends of each armature coil 6a or 6b. Accordingly, a number of transistors per armature coil becomes twice. As the transistors 19a–19b must serve as power elements, this conventional circuit becomes expensive. The transistors 19a and 19b, provided on positive terminal side, will require another electric power source to perform current supply control in response to input signals of terminals 19-1 and 19-2. This becomes another cause to increase cost of circuit. That is, there are two disadvantages. The circuit embodying the present invention is, on the contrary, able to eliminate these disadvantages.

When an armature coil is activated, its exciting current builds up slowly due to large inductance. Although magnetic energy stored in the armature coil is returned through diodes 6c and 6d to the side of the DC electric power source when deactivated, reduction of current is also slow in this case. Accordingly, both rotational speed and efficiency are lowered. Although such disadvantages may be removed by increasing DC electric power source voltage, rotating a motor at 10 thousands r.p.m. with 1 Kw output will require too high voltage, e.g. 1000 volts or more, to be used practically. The present invention can solve such a problem, too.

Details of FIG. 30 will be explained below. Position detecting signals of curves 36a and 36b, curves 37a and 37b, and curves 38a and 38b in FIG. 15 are inputted from terminals 42a, 42b and 42c.

In response to these input signals fed through AND circuits 24a, 24b, 24c, transistors 20a, 20b, 20c are activated through their bases to activate armature coils 32a, 32b and 32c.

A terminal 40 is supplied with a reference voltage specifying an armature current. By changing a voltage of the terminal 40, an output torque can be changed. When an electric power switch (not shown) is turned on, an output of an operational amplifier 40a becomes a LOW-level, since an input of a positive terminal of the operational amplifier 40a is lower than that of its negative terminal. Thus, differential circuit 40b will generate no output, and the output of monostable circuit will also become LOW-level. As an input of an inversion circuit 28b is a LOW-level, an output of the inversion circuit 28b becomes a HIGH-level. Accordingly, the transistor 20a is turned on to activate the armature coil 32a. A resistance 22a is provided for detecting armature current flowing in the armature coils 32a, 32b and 32c.

One of above-described position detecting signal curves is shown as a curve 36a in a time chart of FIG. 14. In FIG. 8, the armature coil 32a is supplied with an exciting current during a time period corresponding to this curve 36a. An arrow 23a shows a current supply angle of 120 degrees.

In an initial stage of the current supply period, building-up of the exciting current is delayed due to inductance of the armature coil. If the current is stopped, magnetic energy stored in the armature coil is discharged though diodes 6c and 6d, in the case of FIG. 8, to return to the electric power source. Therefore, the current decreases as shown by a second half portion of the curve 25; i.e. a right side of the dotted line H.

A section generating a positive torque is a 180-degree section shown by an arrow 23; therefore, counter torque is generated to decrease both output torque and efficiency. This phenomenon becomes so conspicuous as the rotational speed increases that the motor cannot be practically used in a high-speed region.

This is because a time width of a positive torque generating section 23 becomes small in proportion to an increase of the rotational speed, while a time width of a counter torque generating section will not vary even if the motor speed becomes a high speed.

The same explanation is applicable to the current supply operation of the armature coils based on other position detecting signals 36a, 37a and 38a.

Since a building-up portion of the curve 25 is also delayed, an output torque is decreased to cause torque reduction. This is because the magnetic pole and the salient pole interact to close the magnetic path, which entails a large inductance.

The reluctance type motor has a disadvantage such that it cannot increase its rotational speed notwithstanding an advantage of large output torque. Such disadvantage derives from above-described counter torque and torque reduction.

Figure 30:
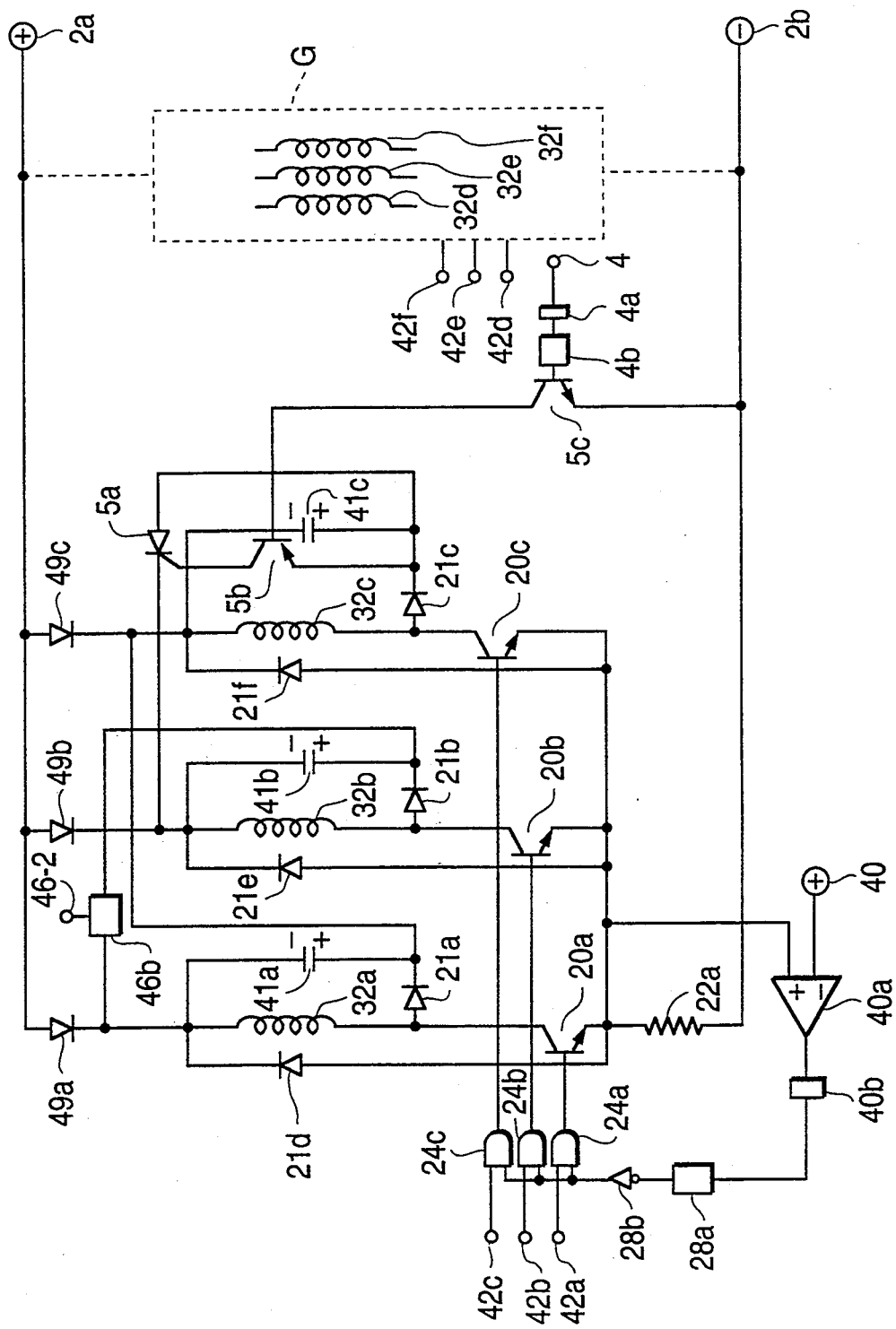
FIG. 30 is a circuit diagram showing a current supply control circuit for armature coils of a three-phase full-wave or half-wave current supply mode reluctance type motor.

An apparatus in accordance with the present invention is characterized by that above-mentioned disadvantage is eliminated by additionally providing back-flow preventing diodes 49a, 49b, 49c, small-capacitance capacitors 41a, 41b, 42c, diodes 21a, 21b, 21c, semiconductor elements 5a, 5b, 5c and others shown in FIG. 30, and that only one semiconductor switching element (20a, 20b, or 20c), controlling activation/deactivation of each armature coil, is provided on a negative voltage side of the DC electric power source.

When current is terminated at the terminal end of the curve 36a, magnetic energy stored in the armature coil 32a is discharged through the diodes 21a to the capacitor 41a so as to charge it up to a high voltage with polarities shown in the drawing, being prevented from returning to the DC electric power source side by a function of the back-flow preventing diode 49c. Accordingly, the magnetic energy is sharply extinguished, and the current decreases steeply.

Curves 27, 27a and 27b shown in the time chart of FIG. 14 cooperatively represent a current flowing in the armature coil 32a. Both dotted lines are spaced 120 degrees. The armature current decreases steeply like the curve 27b, and therefore no counter torque is generated. The capacitor 41a is charged up to a high voltage and held to this voltage.

When the transistors 20b and 20c are turned off at the terminal ends of position detecting signals inputted from the terminals 42b and 42c, the capacitors 41b and 41c are charged up to a high voltage in the same manner so as to make armature current trail off steeply. When the transistor 20c is turned on, charged high voltage of the capacitor 41a is applied to the armature coil 32a together with the DC electric power source voltage so that the exciting current builds up quickly.

Although the diodes 21d, 21e and 21f are not always necessary, these diodes serve to prevent charged current of the capacitors 41a, 41b and 41c from flowing back to the DC electric power source terminals 2a and 2b. Substituting IGBTs for transistors 20a, 20b and 20c will be advantageous in using large current.

Exciting current of other armature coils can be built up or reduced sharply in the same manner. By virtue of this function, the exciting current builds up steeply as shown by the curve 27 in FIG. 14. The building-up portion of the current 27 becomes slow at its intermediate portion, because the magnetic energy is transformed into thermal energy due to copper loss of coils and iron loss of magnetic cores when the magnetic energy is transferred between armature coils. A countermeasure for eliminating such a disadvantage will be discussed later.

As is explained above, the torque reduction and the counter torque are removed. And, as the exciting current becomes substantially the rectangular waveform, an output torque is increased. Functions of SCR (Silicon Controlled Rectifier) 5a and transistors 5a and 5b will be explained next.

When a position detecting signal is inputted from the terminal 42a, the transistor 20b turns on. In this case, as the input signal of the terminal 42b is supplied to the terminal 4, the differential circuit 4a generates a differential pulse on the basis of its beginning end. And, the monostable circuit 4b outputs a predetermined width electric pulse. The transistors 5a and 5b turn on by an amount corresponding to this electric pulse width, so as to supply a gate current to the SCR 5a to turn on it. Hence, discharge current flows in the order of positive electrode of the capacitor 41c→SCR 5a→armature coil 32b→transistor 20b→diode 21f→negative electrode of the capacitor 41c. Upon termination of discharge, the SCR 5a and the transistors 5b and 5c are turned off.

Block circuit 46b is equivalent to the SCR 5a and the transistors 5b and 5c. A position detecting signal of the terminal 42a is inputted from the terminal 46-2. Upon turning-on of the transistor 20a, charged high voltage of the capacitor 41b is applied to the armature coil 32a to build up armature current sharply.

If the block circuit 46b is not provided, the transistor 20c turns on as soon as the transistor 20b turns off. Magnetic energy stored in the armature coil 32b is discharged in the order of the diode 21b→armature coil 32a→diode 21a→armature coil 32c→transistor 20c→diode 21e→armature coil 32b. Accordingly, high voltage of the capacitor 41b is completely discharged and the purpose of the present invention will not be accomplished.

A circuit including the SCR 5a functions in the same manner. When magnetic energy stored in the armature coil 32a is discharged, the SCR 5a is in a turned-off condition. Therefore, there is no need to provide a circuit similar to above-described block circuit 46b.

As can be understood from the foregoing description, three capacitors 41a, 41b and 41c can be charged up to a high voltage by opening a closed circuit of armature coil 32a→diode 21a→armature coil 32c→diode 21c→armature coil 32b→diode 21b→armature coil 32a at only two places of the SCR 5a and the block circuit 46b. Circuit configuration is therefore simplified.

Next, a chopper circuit will be explained. When armature current of the armature coil 32a increases, and therefore the voltage drop in the resistance 22a, which detects armature current value, increases to exceed the reference voltage of the reference voltage terminal 40 (i.e. an input voltage of the negative terminal of the operational amplifier 40a), an output of the operational amplifier 40a turns to a HIGH-level. Accordingly, the differential circuit 40b generates a differential pulse to activate the monostable circuit 28a, whose output becomes an electric pulse having a predetermined width. As this output electric pulse is converted into a LOW-level electric pulse by the width of the pulse through the inversion circuit 28b, an output of the AND circuit 24a also becomes a LOW-level signal having the same width, during which the transistor 20a is deactivated.

Accordingly, a current flowing in the armature coil reduces, and then this current flows through the diode 21a into the capacitor 41a to charge it up. When the output of the monostable circuit 28a extinguishes, outputs of the inversion circuit 28b and the AND circuit 24a return to a HIGH-level. This causes the transistor 20a to be turned on to increase the exciting current of the armature coil 32a. When the armature current exceeds a predetermined value, an output of the operational amplifier 40a turns again to a HIGH-level. The transistor 20a turns off during a predetermined period of time corresponding to the output pulse width of the monostable circuit 28a. Thus, the armature coil current reduces. Repetition of such a cycle constitutes a chopper circuit wherein the exciting current is maintained at a predetermined level regulated by the reference voltage of the reference voltage terminal 40.

A section indicated by the curve 27a of FIG. 14 is a section being chopper controlled. It is also possible to realize a constant speed control by a conventional means, which controls the reference voltage of the reference voltage terminal 40 by a voltage varying in proportion to the rotational speed.

During above-described chopper operation, the capacitor 41a is repeatedly charged in response to output pulses from the monostable circuit 28a so as to increase its charge voltage and store electrostatic energy. When the transistor 20a turns off at the terminal end of a position detecting signal, all the magnetic energy stored in the armature coil 32a is charged in the capacitor 41a. Another electrostatic energy, corresponding to chopper frequency and current attenuation amount, is further added to the capacitor 41a. This large amount electrostatic energy can compensate energy loss, i.e. previously described copper loss of armature coils and iron loss of magnetic poles in a building-up of armature current when the armature coil 32c is next activated.

Accordingly, the exciting current builds up as shown by a dotted line 27c of FIG. 14, whose building-up is so steep that its waveform becomes substantially rectangular. Therefore, an output torque can be increased. Capacitance of the capacitor 41a, frequency of chopper current, and output pulse width of the monostable circuit 28a need to be adjusted so as to bring above-described function and effect.

AND circuits 24b and 24c and transistors 20b and 20c also perform chopper control of armature current to be supplied to the armature coils 32b and 32c. Accordingly, it becomes possible to make building-up and trailing-off of exciting current of each armature coil sharp.

Current supply to each armature coil can be initiated at any point within an approximately 30-degree section after the salient poles come to confront the magnetic poles. When changing the fixed positions of the detecting coils 10a, 10b and 10c, which function as position detecting elements, their positions are adjusted to be fixed on the armature side in consideration of rotational speed, efficiency and output torque.

As is apparent from the foregoing description, it becomes possible to drive a motor at a high speed with good efficiency and large output as a three-phase half-wave current supply type motor. Thus, the purpose of the present invention can be accomplished.

Curves 26a, 26b and 26c of the first stage shown in FIG. 14 cooperatively represent a current supply curve for the armature coil. A gap between a dotted line 26-1 and a dotted line 26-2 represents a 120-degree width of the position detecting signal. A gap between the dotted line 26-1 and a dotted line 26-3 represents a 180-degree width of the output torque generating section.

Curves 9a, 9b and 9c show output torque curves. At the point of the dotted line 26-1, the current supply operation is initiated, and the salient poles begin confronting the magnetic poles at the same time. The curve 9a represents a case where a current supplied to the armature coil is small. Its torque becomes relatively flat. However, as shown by the curves 9b and 9c, a peak value of the torque tends to shift toward a left side as the current value increases, and also a width of the peak value becomes narrow.

In consideration of above-described torque characteristics and supplied current value, it is preferable to set an initiation point of the current supply operation to an intermediate point of a 30-degree section after the salient poles begin confronting the magnetic poles by adjusting the fixing points of the position detecting coils 10a, 10b and 10c.

Charging voltage of the capacitor 41a increases with reduction of its capacitance. Therefore, with small-capacitance capacitor 41a, the exciting current of the armature coil can be built up sharply and reduced steeply. The motor can thus operate in a high-speed region, and the disadvantage of the conventional reluctance type motor can be eliminated. It is preferable, however, to select the capacitor with capacitance that will not cause any damage to transistors in the circuit.

If the block circuit G of FIG. 30 is added, a three-phase full-wave current supply operation can be realized. Current supply control circuit and a chopper circuit for armature coils 32d, 32e and 32f are identical with those of the armature coils 32a, 32b and 32c. Accordingly, armature current control is performed on the basis of position detecting signals inputted from the terminals 42d, 42e and 42f. Input signals from the terminals 42d, 42e and 42f are position detecting signals of curves 43a and 43b, curves 44a and 44b, curves 45a and 45b of FIG. 15.

Above-described three-phase full-wave current supply mode motor will be explained below. FIG. 2 showing a plane view and FIG. 4 showing a development have already been explained, so that only differences will be described.

The current supply circuit for the armature coils 32a, 32b and 32c of FIG. 30 serves as a half-wave current supply section in the case of above-described three-phase full-wave current supply mode. A block circuit G is a current supply control circuit for armature coils 32d, 32e and 32f, which is similar to the circuit for the armature coils 32a, 32b and 32c. Electric signals of curves 43a and 43b, curves 44a and 44b, curves 45a and 45b of FIG. 15 are inputted from the terminals 42d, 42e and 42f. Armature coils are activated by an amount of corresponding curve width. A chopper circuit including an operational amplifier 40a and a reference voltage terminal 40 is provided to regulate an armature current to a predetermined level.

As can be understood from the foregoing description, according to the present embodiment, a three-phase full-wave current supply mode motor can be realized to make armature current build up or trail off sharply. Accordingly, a motor capable of operating in a high-speed region with good efficiency and less ripple torque can be realized.

Figure 31:
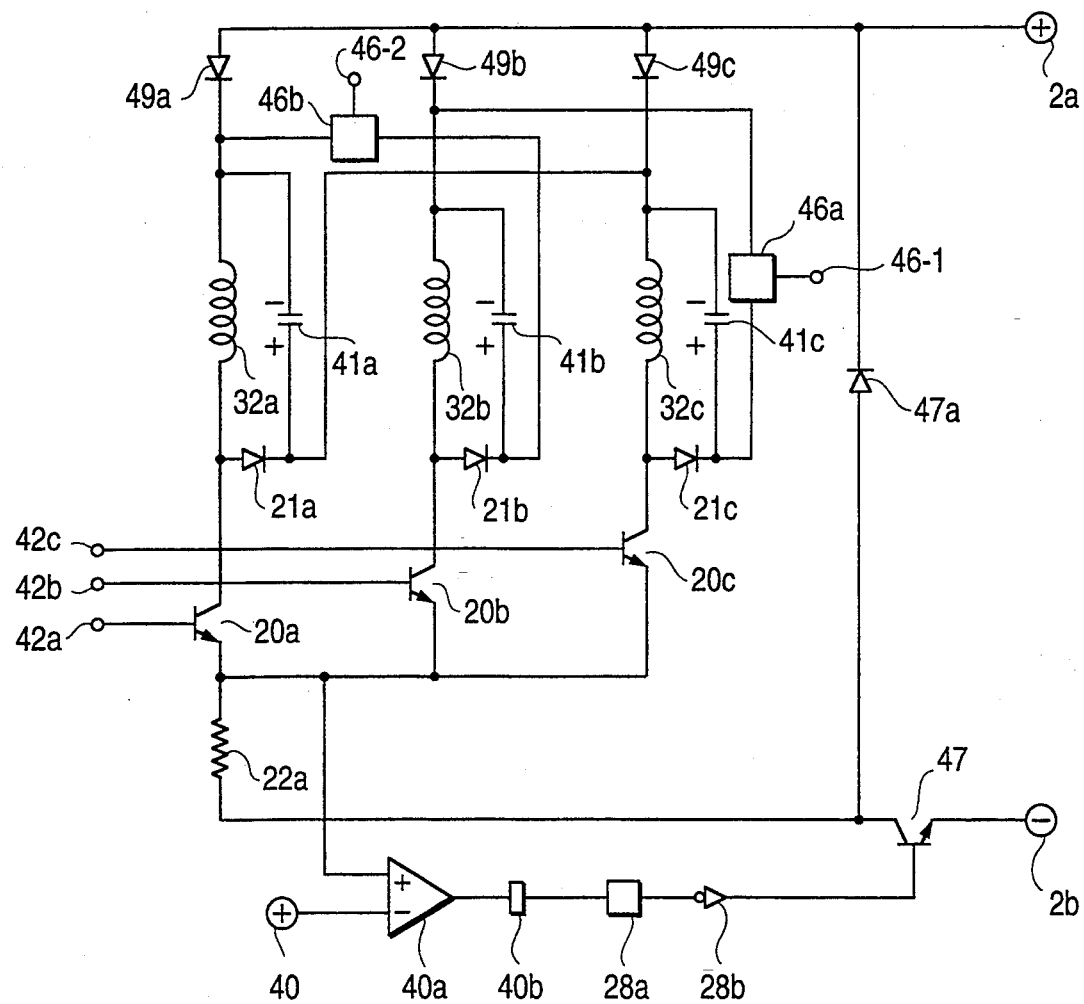
FIG. 31 is a circuit diagram showing a current supply control circuit for armature coils of a three-phase half-wave current supply mode reluctance type motor.

FIG. 31 shows an embodiment modified from that of FIG. 30, in which only the chopper circuit is modified. In FIG. 31, a block circuit 46a is a circuit comprising the SCR 5a and transistors 5a and 5b of FIG. 30. An input signal of a terminal 46-1 is identical with the input signal of the terminal 4 of FIG. 30. Accordingly, current supply control for the armature coils 32a, 32b and 32c is carried out on the basis of the position detecting signals in the same manner as in the case explained with reference to FIG. 30. Chopper control is performed in the same manner with respect to each armature coil. An example of armature coil 32a is explained below.

When armature current exceeds, and an input voltage of the positive terminal of the operational amplifier 40a exceeds the reference voltage of the terminal 40, an output of the inversion circuit 28b is turned to a LOW-level during a predetermined period of time so as to turn off the transistor 47. Accordingly, exciting current of the armature coil 32a decreases first, and subsequently increases and then decreases again, thereby constituting a chopper circuit. Value of exciting current is regulated by the voltage of terminal 40.

Magnetic energy of the armature coil 32a is discharged through the diode 47a during chopper control; therefore, no electrostatic energy is stored in the capacitor 41a in the case of the circuit of FIG. 30.

Curves 31a, 31b and 31c in the time chart of FIG. 14 represent exciting currents of the armature coils 32a and 32d based on the position detecting signal curves 36a and 36b and 43a and 43b. In the same manner, curves 31d and 31e represent exciting currents of the armature coils 32b and 32e. And, curves 31f, 31g and 31h represent exciting currents of the armature coils 32c and 32f.

Technical features of the present invention can be applied to a two-phase full-wave type motor. The detail of the application will be explained hereinafter. Although there is not shown a plane view of this embodiment, FIG. 5 shows its development which has been already explained, and so no further explanation will be made except the differences.

Figure 32:
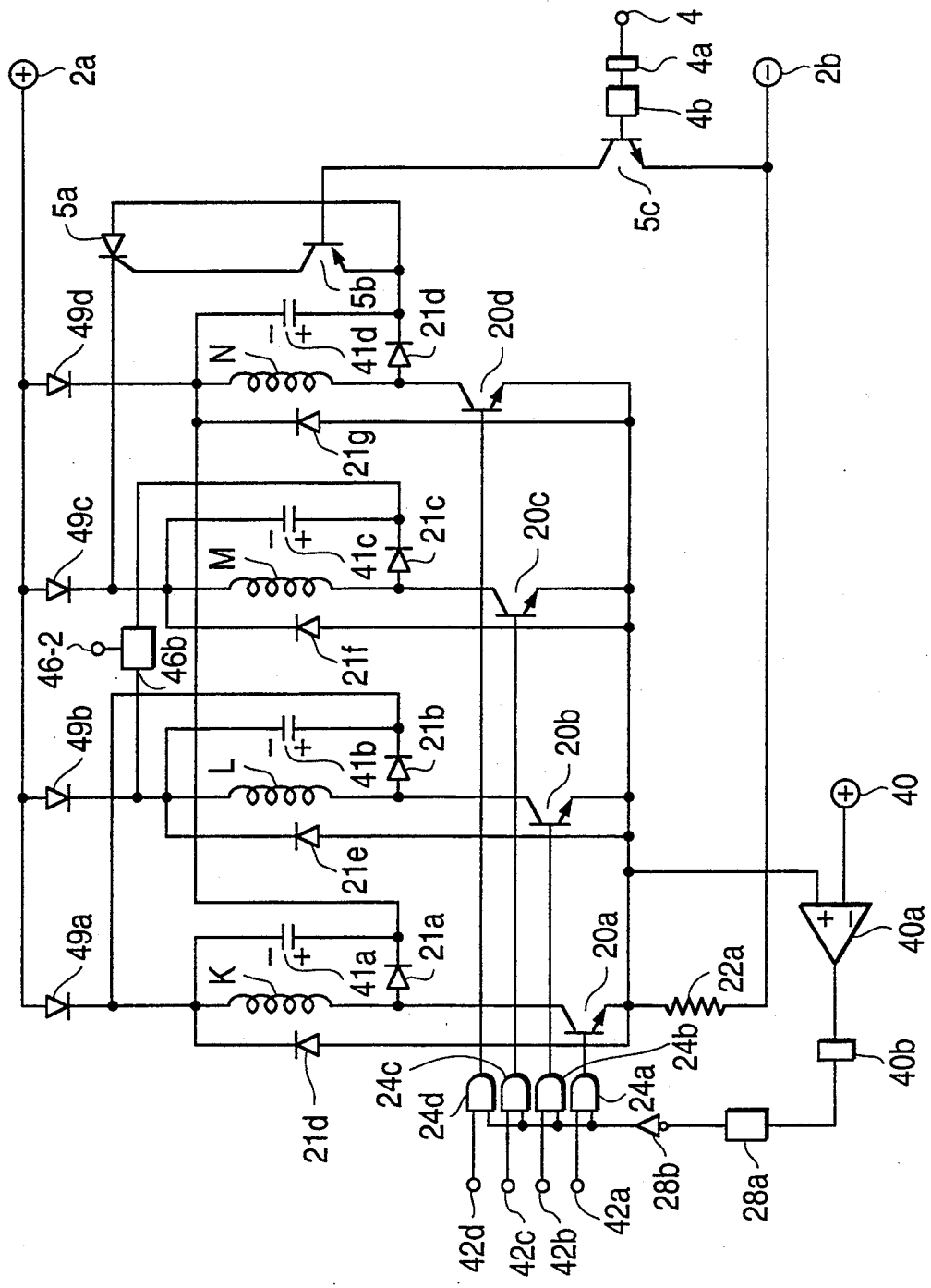
FIG. 32 is a circuit diagram showing a current supply control circuit for armature coils of a two-phase full-wave current supply mode reluctance type motor.

Next, with reference to FIG. 32, the current supply control of the armature coil is explained. In FIG. 32, armature coils K and M correspond to armature coils 17a, 17e and 17c, 17g of FIG. 5, respectively. Two armature coils are connected in series or in parallel. Downside ends of the armature coils K and M are connected to the transistors 20a and 20c. These transistors 20a and 20c function as semiconductor switching elements and can be replaced by other semiconductor elements having the same effect. Electric power is supplied from the positive and negative terminals 2a and 2b of the DC electric power source.

If the HIGH-level electric signal is inputted from the input terminal 42a, the transistors 20a is turned on to activate the armature coil K. Furthermore, if the HIGH-level electric signal is inputted from the input terminal 42c, the transistor 20c is turned on to activate the armature coil M.

The rotor 3 of FIG. 5 is made of conductive material, and is provided coaxially with the rotor 1 so as to rotate synchronously. The rotor 3 is provided with protruding portions 3a–3d. The width of the protruding portion is 90–150 degrees. The coils 10d, 10e, 10d and 10e are constituted in the same manner as the previously described coils 10a, 10b and 10c. The coils 10d, 10e, 10d and 10e are disposed to confront the protruding portions 3a–3d. The coils 10d and 10e are spaced 90 degrees, and coils 10d and 10e are offset from the coils 10d and 10e by 180 degrees, respectively.

FIG. 6 is an electric circuit for obtaining position detecting signals from above-described coils, which has already been explained, and so no further explanation will be made except the differences.

No.1 and No.1 position detecting signals of No.1-phase, inputted from terminals 42a and 42c of FIG. 32, are shown by curves 50a and 50b and curves 51a and 51b. No.2 and No.2 position detecting signals of No.2-phase, inputted from terminals 42b and 42d, are shown by curves 52a and 52b and curves 53a and 53b, respectively.

As the No.1 and No.1 position detecting signals are inputted from the terminals 42a and 42c, the current supply control to respective transistors can be executed. The No.1-phase armature coils K and M are supplied with 120-degree width current in response to respective position detecting signals.

As the No.2 and No.2 position detecting signals are inputted from the terminals 42b and 42d, the current supply control to the transistors 20b and 20d can be executed. The No.2-phase armature coils L and N are supplied with 120-degree width current in response to respective position detecting signals.

Exciting current of the armature coil N is, for example, shown as curves 27a, 27b and 27c in FIG. 14. A torque generating condition and its characteristics are entirely the same as in the previously described embodiment of FIG. 30.

A chopper circuit, including the operational amplifier 40a, the reference voltage terminal 40, the resistance 22a, the differential circuit 40b, the monostable circuit 28a, the inversion circuit 28b, AND circuits 24a and 24b, functions in the same manner as in the previous embodiment. Functions and effects of the transistors 5b, 5c, SCR 5a, block circuits 4a, 4b are also similar to those of the equivalents of the previous embodiment. Therefore, a building-up of the curve 27 and trailing-off of the curve 27b can be made sharp.

As the input signal of the terminal 4 is identical with the position detecting signal supplied to the terminal 42c, charged high voltage of the capacitor 41d is applied to the armature coil M to build up exciting current quickly.

The block circuit 46b is equivalent to the circuit including the transistors 5b, 5c and the SCR 5a. The terminal 46-2 is supplied with a position detecting signal identical with the input signal of the terminal 42b. Accordingly, the block circuit 46b turns on in response to an electric pulse having predetermined width obtained at a beginning end of the position detecting signal inputted from the terminal 42b. Thus, charged high voltage in the capacitor 41c is applied to the armature coil L.

Electrostatic energy in each of the capacitor 41a, 41b, 41c and 41d is increased by the chopper circuit to compensate the energy loss such as copper loss and iron loss occurring when magnetic energy transfers between armature coils.

Next explained is a case where the block circuits 46b and the SCR 5a are removed.

In this case, if an armature coil is deactivated, its magnetic energy is discharged through a closed circuit of armature coil K→diode 21a→armature coil N →diode 21d→armature coil M→diode 21c→armature coil L→diode 21b→armature coil K. Therefore, it become impossible to charge the capacitors 41a, 41b, 41c and 41d, and the purpose of the present invention cannot be realized. Although four armature coils are provided, above-described problem can be solved by providing only two circuits including the block circuit 46b and SCR 5a. Hence, resolving this problem by simplified circuit configuration is characteristics of the present invention.

It is possible to realize a current supply operation having a 90-degree current width by inputting electric signals of the curves 54a and 54b and the curves 56a and 56b of FIG. 16 to the terminals 42a and 42c, and by further inputting electric signals of the curves 55a and 55b and the curves 57a and 57b to the terminals 42b and 42d.

In the case where the current supply width is set to 90 degrees, the motor can be driven at a high speed (100 thousands rpm with 1 kw output), although the motor output torque is decreased. To the contrary, in the case where the current supply width is set to 120 degrees, the motor output torque can be increased, while the motor speed is decreased to a half of that obtained in case of 90-degree width.

In the case shown in FIG. 5, the present invention can be embodied even when the magnetic poles are arranged to have width of 180 degrees and 10 salient poles are provided. Furthermore, the present invention can also be embodied even when there are provided 8n (n: a positive integer) pieces of magnetic pole having a 120-degree width. In this case, the number of the salient poles have to be increased correspondingly. In the case where the number of magnetic pole is increased, the output torque increases accordingly, while the rotational speed decreases.

Curves 30a and 30b shown in FIG. 14 represent armature currents supplied to the armature coils K and M, while curves 30c and 30d represent armature currents supplied to the armature coils L and N. Curves 54a, 55a, 56a and 57a represent position detecting signal curves. In this case, the current supply sections are 90 degrees and continuous with each other in the torque without including any overlapped portion between respective current supply sections, so that the ripple torque can be suppressed within a small value.

In respective embodiments, the output torque can be increased by providing teeth on both the magnetic poles and salient poles. As the present invention is primarily constituted to drive the motor in a high-speed region, this availability of increased output torque will provide a useful technique without accompanying the disadvantage inherent in the conventional art.

In an embodiment shown in FIG. 1, the invention can also be embodied even if the magnetic poles are provided in 2n (n: a positive integer not less than 3) pieces, although the number of salient poles has to be increased in accordance with increase in the number of the magnetic poles. Thus, the present invention is advantageous in that an output torque can be increased without decreasing rotational speed. This technical feature will be effective for application to a large-diameter motor.

Next, an embodiment of FIG. 33 will be explained. This embodiment can be applied to two- or three-phase full-wave current supply mode motor. A circuit of FIG. 33 exemplarily shows No.1- and No.1-armature coils 32a and 32d of No.1-phase in a three-phase full-wave current supply mode. Other armature coils of No.2- and No.3-phase armature coils can also be constituted in the same manner so as to accomplish the purpose of the present invention.

Figure 33:
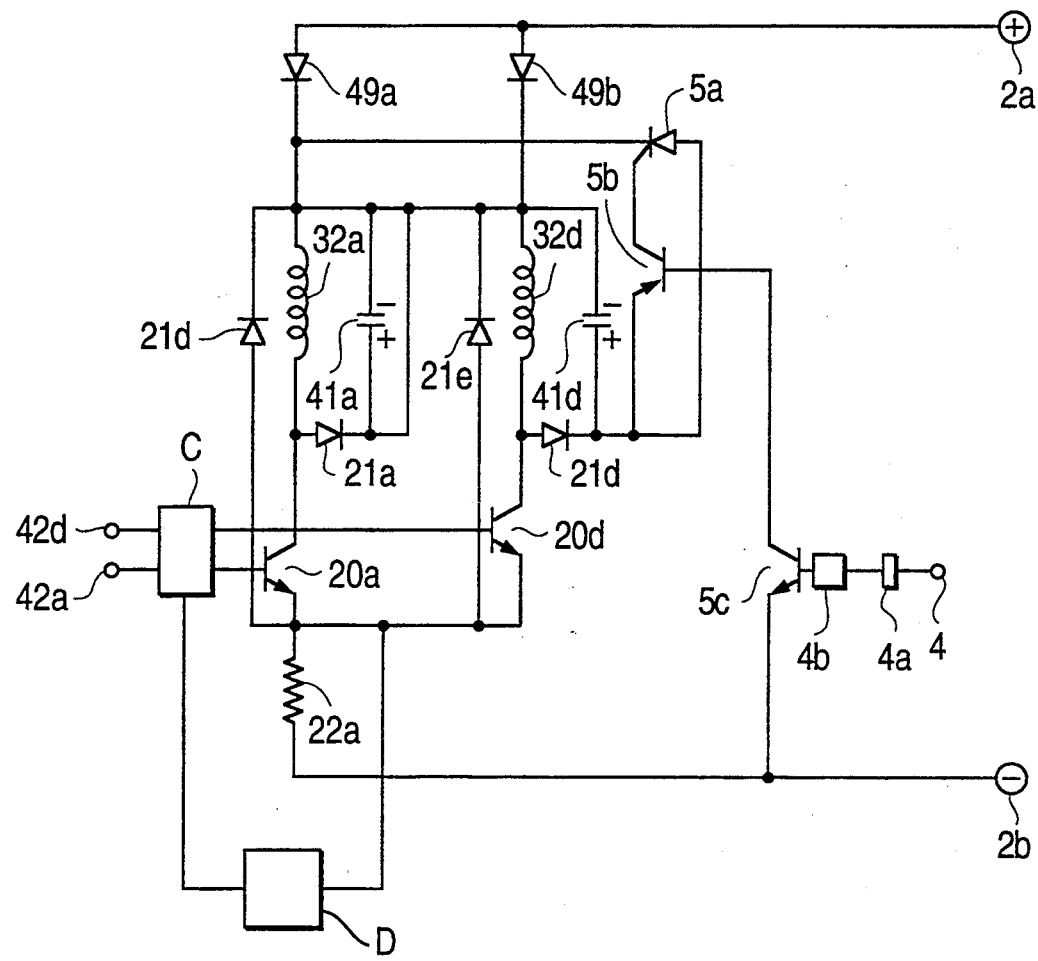
FIG. 33 is a circuit diagram showing a current supply control circuit for No. 1-phase armature coil of a three-phase full-wave current supply mode reluctance type motor.

In FIG. 33, a block circuit C includes AND circuits 24a–24d of FIG. 32. A block circuit D also includes the operational amplifier 40a, the differential circuit 40b, the monostable circuit 28a. Accordingly, they cooperate to constitute a chopper circuit to maintain exciting current of the armature coils 32a and 32d at a predetermined level.

A closed circuit of armature coil 32a→diode 21a→armature coil 32d→diode 21d→armature coil 32a is opened by the SCR 5a.

Hence, in the same manner as in the previous embodiment, the same purpose can be accomplished by inputting a position detecting signal of the terminal 42a to the terminal 4. When the transistors 20a and 20b turn off, magnetic energy stored in the armature coils 32a and 32d charges the capacitors 41a and 41d up to a high voltage. The exciting current can be made to build up sharply due to this high voltage.

Other two, No.2- and No.3-phase, sets of armature coils can be constituted by the same means; therefore, similar function and effect can be obtained.

As can be understood from the foregoing explanation, a number of means (SCR 5a) for opening the closed circuit is ½ of the number of armature coils. The circuit configuration is thus simplified.

Next, an embodiment of a three-phase DC motor with a magnet rotor embodying the present invention will be explained with reference to a development of FIG. 29.

Figure 29:
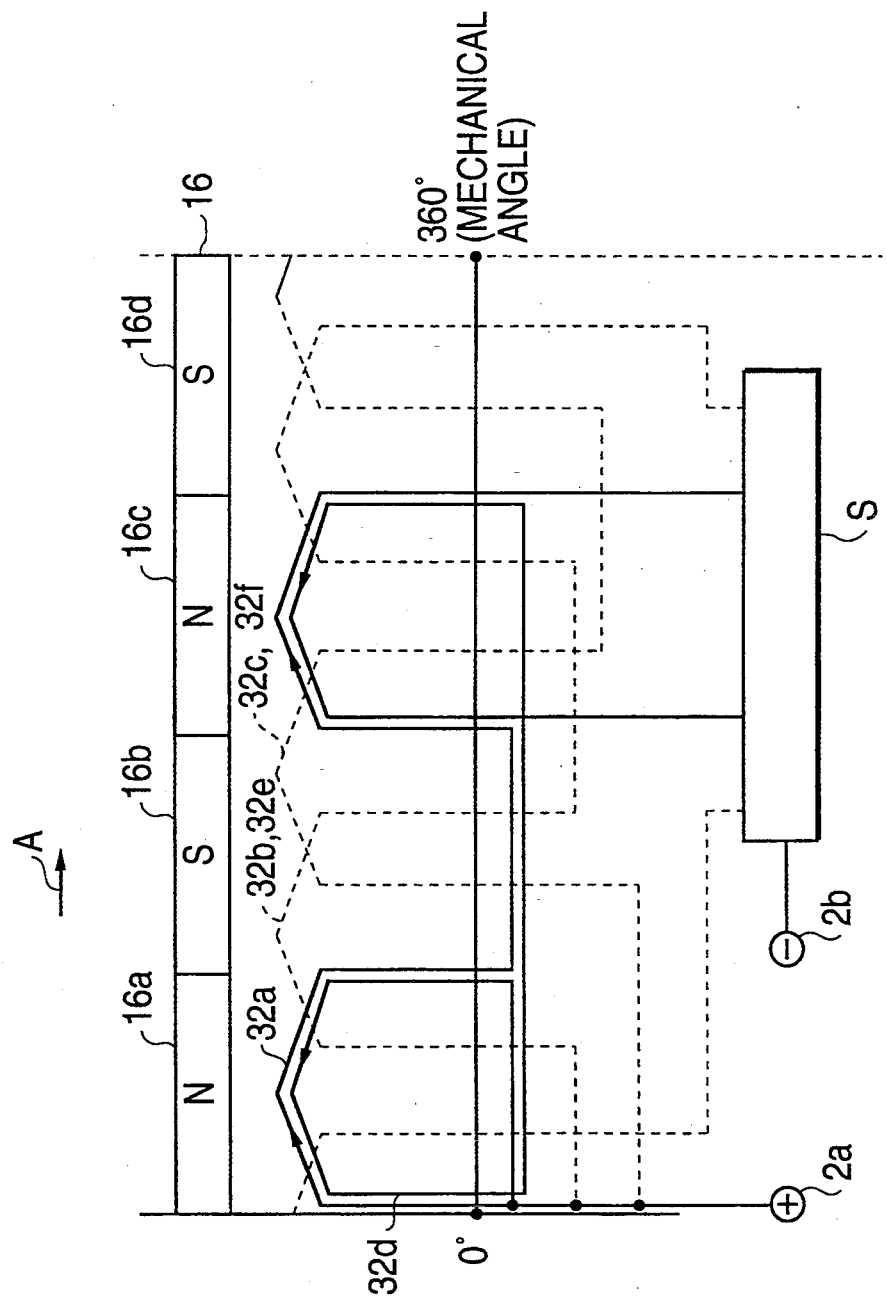
FIG. 29 (prior art) is development showing a fixed armature and magnet rotor of a three-phase DC motor having a magnet rotor.

In FIG. 29, a reference numeral 16 represents a magnet rotor which rotates in a direction of an arrow A. Reference numerals 16a and 16b represent N- and S-magnetic poles. The magnetic rotor 16 may be an electromagnet magnetized by an exciting coil. No.1-phase armature coils 32a and 32d, wound by bifilar winding, are supplied with current from the positive terminal 2a of the DC electric power source through a diode (not shown). This diode corresponds to the diodes 49a and 49b in the previous embodiment.

As the armature coils 32a and 32d are supplied with current in a direction of an arrow, the same effect as that of the reciprocative current supply operation can be obtained.

A pair of armature coils 32b and 32e, and a pair of armature coils 32c and 32f are also wound by bifilar winding to constitute No.2- and No.3 phases, although they are indicated by a dotted line. Position detecting signals can be obtained by a conventional method, which uses three hall elements confronting respective magnetic poles of the magnet rotor 16. Position detecting signals are identical with curves shown in FIG. 15. Current supply to the armature coils 32a and 32d is controlled in accordance with position detecting signals of curves 36a and 36b and curves 43a and 43b.

Current supply to the armature coils 32b and 32e is controlled in accordance with position detecting signals of curves 35a and 35b and curves 44a and 44b, while current supply to the armature coils 32c and 32f is controlled in accordance with position detecting signals of curves 36a and 36b and curves 45a and 45b.

A current supply control circuit is identical with that of armature coils suffixed by the same reference numerals in the three-phase full-wave reluctance type circuit. Therefore, the purpose of the present invention can be accomplished by using the circuit shown in FIG. 30 or FIG. 33.

A block circuit S in FIG. 29 represents a circuit including various current control means such as the transistors 20a and 20b, the diodes 21a and 21b, the capacitors 41a and 41b shown in FIG. 30 or FIG. 33. The number of circuits including the SCR 5a, which are required to make exciting current of the armature coil build up sharply or trail off steeply, is ⅔ of the number of armature coils in the case of the circuit of FIG. 30, and ½ in the case of the circuit of FIG. 33. Thus, the circuit configuration can be simplified. The purpose of the present invention can be accomplished even if the SCR 5a is replaced by other semiconductor element.

What is claimed is:

1. A high-speed plural-phase reluctance type motor with a fixed armature and a magnetic rotor comprising:

a plurality of salient poles having the same width, disposed on an outer surface of the magnetic rotor and being equally spaced from each other at regular intervals of the same angle;

2n pieces, where n is a positive integer not less than 3, of magnetic poles protruding from an inner peripheral surface of the fixed armature so as to confront said salient poles with a slight gap therebetween, said magnetic poles being symmetrically disposed at regular intervals and having between a 120- and 180-degree circumferential width in terms of electric angle, two of said pieces of magnetic poles being in-phase;

2n plural-phase armature coils each wound around each of said magnetic poles;

a position detecting device for detecting rotational positions of said salient poles and generating corresponding plural-phase position detecting signals each having a signal width;

a plurality of semiconductor switching elements, each respectively connected to one of said armature coils such that only one said semiconductor switching element is connected to one said armature coil, to control an activation and a deactivation of each of said respective armature coils;

a first diode connected in a forward direction between a positive voltage side of one of said armature coils and one of said respective semiconductor switching elements;

a DC electric power source supplying electric power to a serial joint unit including said first diode, said one semiconductor switching element, and said respective one armature coil, said one semiconductor switching element being interposed between a positive terminal of said DC electric power source and said respective one armature coil;

a current supply control circuit, including said plurality of semiconductor switching elements, for supplying current to said plural-phase armature coils by turning on a corresponding one of said switching elements connected to a respective one of said armature coils, in response to said plural-phase position detecting signals by an amount of said signal width of a corresponding said position detecting signal, so as to obtain output torque;

a first electric circuitry including a second diode and a third diode for transferring magnetic energy stored in said one armature coil through said second diode into a small-capacitance capacitor from a connecting point of said respective semiconductor switching element and said one armature coil, and said capacitor holding said transferred magnetic energy therein to quickly reduce exciting current of said one armature coil when said respective semiconductor switching element is turned off at a terminal end of one of said position detecting signals; and a second electric circuitry for discharging electrostatic energy stored in said small-capacitance capacitor through said one semiconductor switching element into said one armature coil from a connecting point of said first diode and said one semiconductor switching element to quickly build up exciting current at the time when said one armature coil is again activated in response to said one position detecting signal by the signal width of the position detecting signal after said magnetic rotor rotates a predetermined angle.

2. A high-speed motor in accordance with claim 1, further comprising:
- a detecting circuit for detecting excitation current of respective said armature coils to obtain a current detection electric signal; and
- a chopper circuit for turning off said one semiconductor switching element when said detection electric signal exceeds a reference voltage so as to transfer a part of magnetic energy stored in the respective one armature coil through said second diode to the small-capacitance capacitor, for turning on said one semiconductor switching element after a predetermined time has elapsed, and for compensating energy loss where a part of magnetic energy of said armature coil is discharged into said small-capacitance capacitor for charging and storage in accordance with a chopper frequency used to compensate energy loss such as iron loss and copper loss occurring when magnetic energy transfers between armature coils.

3. A high-speed three-phase DC motor including a fixed armature and a magnet rotor, comprising:
- a plurality of N- and S-magnetic poles, each having the same width and being alternately disposed to be N- or S-pole on an outer surface of the magnet rotor;
- 3n pieces, where n is a positive integer, of field magnetic poles disposed to confront said N- and S-magnetic poles with a slight gap therebetween, said field magnetic poles being disposed at regular intervals and having the same circumferential width of 120 to 180 degrees by electric angel;
- 3n three-phase armature coils of bifilar winding each being wound around one of said magnetic poles;
- a position detecting device for detecting rotational positions of said N- and S-magnetic poles and generating corresponding three-phase position detecting signals of 120 degrees in terms of electric angle and each having a signal width;
- a plurality of semiconductor switching elements, each respectively connected to one of said armature coils, to control an activation and a deactivation of each of said respective armature coils;
- a first diode connected in a forward direction between a positive voltage side of one of said armature coils and one of said respective semiconductor switching elements;
- a DC electric power source supplying electric power to a serial joint unit including said first diode, said one semiconductor switching element, and said respective one armature coil, said semiconductor switching element being interposed between a positive terminal of said DC electric power source and said respective one armature coil;
- a current supply control circuit, including said plurality of semiconductor switching elements, for obtaining output torque by supplying current to said three-phase armature coils of bifilar winding by turning on a corresponding said switching elements connected to a respective one of said armature coils in response to said three-phase position detecting signals by an amount of signal width of each said position detecting signal;
- a first electric circuitry including a second diode and a third diode for transferring magnetic energy stored in said one of armature coil through said second diode into a small-capacitance capacitor for charging and storage from a connecting point of said respective semiconductor switching element and said one armature coil in order to quickly reduce exciting current of said one armature coil when said respective semiconductor switching element is turned off at a terminal end of one of said position detecting signal; and
- a second electric circuitry for discharging electrostatic energy stored in said small-capacitance capacitor through said one semiconductor switching element into said one armature coil from a connecting point of said first diode and said one semiconductor switching element in order to quickly build up exciting current at the time when said one armature coil is again activated in response to said one position detecting signal after said magnet rotor rotates for a predetermined angle.

4. A high-speed plural-phase reluctance type stepping motor with a fixed armature and a magnetic rotor comprising:
- a plurality of salient poles having the same width, disposed on an outer surface of the magnetic rotor and being equally spaced with each other at regular intervals of the same angle;
- 2n pieces, where n is a positive integer not less than three, or magnetic poles protruding from an inner peripheral surface of the fixed armature so as to confront said salient poles with a slight gap therebetween, said magnetic poles being symmetrically disposed at regular intervals and having between a 120- and 180-degree circumferential width in terms of electric angle, two of said pieces of magnetic poles being in-phase;
- 2n plural-phase armature coils each wound around one of said magnetic poles;
- a pulse oscillator and distributor for generating plural-phase stepping electric signals having an electric angle width of 180 degrees and having signal widths and being spaced apart from one another by 180 degrees, and being offset from said electric signals by a predetermined phase difference;
- a plurality of semiconductor switching elements, each respectively connected to one of said armature coils, to control an activation and a deactivation of each of said respective armature coils;
- a first diode connected in a forward direction between a positive voltage side of one of said armature coils and one of said semiconductor switching elements;
- a DC electric power source supplying electric power to a serial joint unit including said first diode, said one semiconductor switching element, and said respective armature coil, said semiconductor switching element being interposed between a positive terminal of said DC electric power source and said respective one armature coil;
- a current supply control circuit, including said plurality of semiconductor switching elements, for obtaining stepping output torque by supplying current to said plural-phase armature coils by turning on a corresponding one of said switching elements connected to a respective one of said armature coils in response to said plural-phase stepping electric signals by an amount of said signal width of each stepping electric signal;

a first electric circuitry including a second diode and a third diode for transferring magnetic energy stored in the one armature coil through said second diode into a small-capacitance capacitor for charging and storage from a connecting point of said respective semiconductor switching element and said one armature coil in order to quickly reduce exciting current of said one armature coil when said respective semiconductor switching element is turned off at a terminal end of said stepping electric signal; and a second electric circuitry for discharging electrostatic energy stored in said small-capacitance capacitor through said one semiconductor switching element into said one armature coil from a connecting point of said first diode and said one semiconductor switching element in order to quickly build up exciting current at the time when said armature coil is again activated in response to said stepping electric signal by the width of the signal.

5. A high-speed motor in accordance with claim 4, further comprising:

a detecting circuit for detecting excitation current value of respective armature coils to obtain a current detection electric signal; and a chopper circuit for turning off said one semiconductor switching element when said current detection electric signal exceeds a reference voltage in order to transfer a part of magnetic energy stored in the respective one armature coil through said second diode to the small-capacitance capacitor, for turning on said one semiconductor switching element after a predetermined time has elapsed, and for storing a part of magnetic energy of said armature coil as electrostatic energy into said small-capacitance capacitor in accordance with a chopper frequency and for utilizing said electrostatic energy to compensate energy loss such as iron loss and copper loss occurring when magnetic energy transfers between armature coils.

6. A high-speed plural-phase reluctance type motor with a fixed armature and a magnetic rotor comprising:

a plurality of salient poles having the same width, disposed on an outer surface of the magnetic rotor and being equally spaced with each other at regular intervals of the same angle;

2n pieces, where n is a positive integer not less than three, of magnetic poles protruding from an inner peripheral surface of the fixed armature so as to confront said salient poles with a slight gap therebetween, said magnetic poles being symmetrically disposed at regular intervals and having between a 120- and 180-degree circumferential width in terms of electric angle, two of said pieces of magnetic poles being in-phase;

2n plural-phase armature coils each wound around one of said magnetic poles;

a position detecting device for detecting rotational positions of said salient poles and generating corresponding plural-phase position detecting signals each having a signal width;

a plurality of switching elements, each respectively connected to one of said armature coils, to control an activation and a deactivation of each of said respective armature coils;

a first diode connected in a forward direction on a positive voltage side of one of said armature coils;

a DC electric power source supplying electric power to a serial joint unit including said first diode, said one armature coil, and said respective one switching element, said one switching element interposed between a negative terminal of said DC electric power source and said respective one armature coil;

a current supply control circuit, including said plurality of semiconductor switching elements, for obtaining output torque by turning on said switching elements connected to said plural-phase armature coils in response to said plural-phase position detecting signals by an amount of said signal width of each said position detecting signal;

a first electric circuitry including a second diode and a third diode for transferring magnetic energy stored in the armature coil through said second diode into a small-capacitance capacitor for charging and storage from a connecting point of said one switching element and said respective one armature coil in order to quickly reduce exciting current of said armature coil when said switching element is turned off at a terminal end of said position detecting signal;

a second electric circuitry for discharging electrostatic energy stored in said small-capacitance capacitor through said one switching element, which is activated synchronously with the activation of said one switching element, into said one armature coil from a connecting point of said first diode and said armature coil in order to quickly build up exciting current at the time when said armature coil is activated through said one switching element in response to said position detecting signal after said magnetic rotor has rotated for a predetermined angle;

a detecting circuit for detecting excitation current of respective said armature coils exceeding a predetermined value and obtaining a current detection electric signal;

a chopper circuit for turning off said one switching element connected with said one respective armature coil in response to said detection signal and for turning on said one switching element after a predetermined time has elapsed in order to maintain armature coil current at a predetermined level; and a third electric circuitry for successively charging and storing magnetic energy of said armature coil as electrostatic energy into said small-capacitance capacitor through said second diode in accordance with a chopper frequency when said one switching element is turned off during an operation period of time of said chopper circuit.

7. A high-speed plural-phase DC motor including a fixed armature and a magnet rotor, comprising:

a plurality of N- and S-magnetic poles, each having the same width and being alternately disposed to be N- or S-pole on an outer surface of the magnet rotor;

3n pieces, where n is a positive integer not less than three, of field magnetic poles disposed to confront said N- and S-magnetic poles with a slight gap therebetween, said field magnetic poles being symmetrically disposed at regular intervals and having the same circumferential width of 120 degrees through 180 degrees, in terms of electric angle;

3n plural-phase armature coils of bifilar winding each being wound around each of said magnetic poles;

a position detecting device including a plurality of position detecting elements for detecting rotational positions of said N- and S-magnetic poles and for generating rectangular waveform No. 1-phase position detecting signals having the same width of an electric angle of 120 degrees and a phase difference of an electric angle of 360 degrees therebetween, and rectangular waveform No.2- and No.3-phase position detecting signals having the same width and phase difference as the No. 1-phase position detecting signals but being successively delayed from one another from the No. 1-phase position detecting signals by an amount of an electric angle of 120 degrees;

a plurality of switching elements, each respectively connected to one of said armature coils, to control an activation and a deactivation of each of said respective armature coils;

a first diode connected with the one armature coil in a forward direction;

a DC electric power source supplying electric power to a serial joint unit including said first diode, said one armature coil, and said respective one switching element, said one switching element being connected at a negative terminal side of said DC electric power source and with said one armature coil, said first diode connected with said one armature coil at a positive terminal side of said DC electric power source in a forward direction;

a current supply control circuit, including said plurality of switching elements, for generating output torque by turning on said switching elements connected to No.1-, No.2- and No.3-phase armature coils of bifilar winding in response to No.1-, No.2- and No.3-phase position detecting signals;

a first electric circuitry including a second diode and a third diode for transferring magnetic energy stored in said one armature coil through said second diode into a small-capacitance capacitor for charging and storage from a connecting point of said respective switching element in order to quickly reduce exciting current of said one armature coil when said switching element is turned off at a terminal end of said position detecting signal;

a second electric circuitry including a third diode for discharging electrostatic energy stored in said small-capacitance capacitor through said one switching element into said one armature coil from a connecting point of said first diode and said armature coil in order to quickly build up exciting current at the time when said armature coil is again activated in response to said position detecting signal after said magnet rotor rotates a predetermined angle;

a detecting circuit for detecting excitation current of respective armature coils exceeding a predetermined value and obtaining a current detection electric signal;

a chopper circuit for turning off said switching element associated with said one armature coil in response to said current detection electric signal and for turning on said switching element after a predetermined time has elapsed, so as to maintain armature coil current value at a predetermined level; and a third electric circuit for successively storing magnetic energy of said armature coil as electrostatic energy into said small-capacitance capacitor through said second diode in accordance with a chopper frequency when said switching element is turned off during an operation period of time of said chopper circuit.

8. A high-speed plural-phase reluctance type stepping motor with a fixed armature and a magnetic rotor comprising:

a plurality of salient poles, having the same width, disposed on an outer surface of the magnetic rotor and mutually spaced at regular intervals of the same angle;

2n pieces, where n is a positive integer not less than three, of magnetic poles protruding from an inner peripheral surface of the fixed armature so as to confront said salient poles with a slight gap therebetween, said magnetic poles being symmetrically disposed at regular intervals and having a 180-degree circumferential width in terms of electric angle, two of said pieces of magnetic poles being in-phase;

2n plural-phase armature coils each wound around each of said magnetic poles;

a pulse oscillator and distributer for generating plural-phase stepping electric signals having a predetermined time width and being spaced apart from one another by a predetermined time width, and being offset from said electric signals with a predetermined phase difference;

a plurality of switching elements, each respectively connected to one of said armature coils, to control an activation and a deactivation of each of said respective armature coils;

a first diode disposed in a forward direction on a positive voltage side of said one armature coil;

a DC electric power source supplying electric power to a serial joint unit including said first diode, said one armature coil, and said respective one switching element, said one switching element being interposed between a negative terminal of said DC electric power source and said respective one armature coil;

a current supply control circuit, including said plurality of switching elements, for obtaining stepping output torque by turning on corresponding said switching elements connected to said armature coils in response to said plural-phase stepping electric signals by an amount of signal width of each stepping electric signal;

a first electric circuitry including a second diode and a third diode for transferring magnetic energy stored in the armature coil through said second diode into a small-capacitance capacitor for charging and storage from a connecting point of said respective switching element and said armature coil in order to quickly reduce exciting current of said one armature coil when said switching element is turned off at a terminal end of said stepping electric signal;

a second electric circuitry for discharging electrostatic energy stored in said small-capacitance capacitor through said one switching element into said armature coil from a connecting point of said first diode and said armature coil in order to quickly build up exciting current at the time when said armature coil is again activated in response to next arriving stepping electric signal;

a detecting circuit for detecting excitation current of respective armature coils exceeding a predetermined value and obtaining a current detection electric signal;

a chopper circuit for turning off said switching element associated with said armature coil in response to said current detection electric signal and for turning on said switching element after a predetermined time has elapsed, so as to maintain armature coil current at a predetermined level; and a third electric circuit for successively storing magnetic energy of said armature coil as electrostatic energy into said small-capacitance capacitor through said second diode in accordance with a chopper frequency when said switching element is turned off during an operation period of time of said chopper circuit.

9. A high-speed plural-phase reluctance type motor with a fixed armature and a magnetic rotor comprising:

a plurality of salient poles, having the same width, disposed on an outer surface of the magnetic rotor and being mutually spaced at regular intervals of the same angle;

2n pieces, where n is a positive integer not less than three, of magnetic poles protruding from an inner peripheral surface of the fixed armature so as to confront said salient poles with a slight gap therebetween, said magnetic poles being symmetrically disposed at regular intervals and having a 120- through 180-degree circumferential width in terms of electric angle, two of said pieces of magnetic poles being in-phase;

2n plural-phase armature coils each wound around one of said magnetic poles;

a position detecting device for detecting rotational positions of said salient poles and generating corresponding plural-phase position detecting signals each having a signal width;

a plurality of switching elements, each respectively connected to one of said armature coils, to control an activation and a deactivation of each of said respective armature coils;

a first diode connected in a forward direction on a positive voltage side of said one armature coil;

a DC electric power source supplying electric power to a serial joint unit including said first diode, said one armature coil, and said respective one switching element, said one switching element being interposed between a negative terminal of said DC electric power source and said respective one armature coil;

a current supply control circuit, including said plurality of switching elements, for obtaining output torque by supplying current to said plural-phase armature coils by turning on corresponding said switching elements connected to said armature coils in response to said plural-phase position detecting signals by an amount of said signal width of each position detecting signal;

a serial joint unit including a small-capacitance capacitor and a second diode, being connected in parallel with said one armature coil, so that magnetic energy stored in the armature coil is transferred through the second diode into the small-capacitance capacitor for charging and storage from a connecting point of said switching element and said armature coil in order to quickly reduce exciting current of said armature coil when said switching element is turned off at a terminal end of said position detecting signal;

a closed circuit obtained by connecting a connecting point interposed between said small-capacitance capacitor and said second diode and another connecting point interposed between a predetermined one of said armature coils and said first diode;

a semiconductor element for controlling current, interposed in a forward direction between a connecting point between at least two said armature coils and said first diode and a positive voltage terminal of said small-capacitance capacitor;

an electric circuitry for transferring magnetic energy stored in the armature coil through said second diode into said small-capacitance capacitor for storage in order to quickly reduce exciting current of said one armature coil when said one switching element is turned off at a terminal end of said position detecting signal, and for discharging electrostatic energy stored in said small-capacitance capacitor through said semiconductor element into said armature coil from a connecting point of said first diode and said armature coil in order to quickly build up exciting current only in an initial time section synchronously with the activation of said one switching element when said armature coil is again activated in response to the position detecting electric signal after said magnetic rotor rotates by a predetermined angle;

a detecting circuit for detecting excitation current of respective said armature coils exceeding a predetermined value and obtaining a current detection electric signal; and a chopper circuit for turning off said switching element associated with said respective armature coil in response to said current detection electric signal and for turning on said switching element after a predetermined time has elapsed so as to maintain armature coil current at a predetermined level.

10. A high-speed plural-phase DC motor including a fixed armature and a magnet rotor, comprising:

a plurality of N- and S-magnetic poles, each having the same width and being alternately disposed to be N- or S-pole on an outer surface of the magnet rotor;

3n pieces, where n is a positive integer, of field magnetic poles disposed to confront said N- and S-magnetic poles with a slight gap therebetween, said field magnetic poles being symmetrically disposed at regular intervals and having the same circumferential width of an electric angle of 120 degrees through 180 degrees;

3n plural-phase armature coils of bifilar winding each being wound around each of said magnetic poles;

a position detecting device including a plurality of position for detecting elements for detecting rotational positions of said N- and S- magnetic poles and generating rectangular waveform No. 1-phase position detecting signals having the same width by an electric angle of 120 degrees and a phase difference by an electric angle of 360 degrees therebetween, and for generating rectangular waveform No.2- and No.3-phase position detecting signals having he same width and phase difference as the No.1-phase position detecting signals but being successively delayed from one another from the No. 1-phase position detecting signals by an amount of an electric angle of 120 degrees;

a plurality of switching elements, each respectively connected to one of said armature coils, to control an activation and a deactivation of each of said respective armature coils;

a first diode;

a DC electric power source supplying electric power to a serial joint unit including said first diode, said one armature coil, and said respective one switching element, said one switching element being connected at a negative terminal side of said DC electric power source and with said one armature coil, said first diode being connected with one of said armature coils at a positive terminal side of said DC electric power source in a forward direction;

a current supply control circuit including said plurality of switching elements, for activating No.1-, No.2- and No.3-phase armature coils of bifilar winding to generate an output torque by turning on said switching elements connected to respective armature coils in response to No.1-, No.2-, and No.3-phase position detecting signals only by the width of said position detecting signal;

a serial joint unit including a small-capacitance capacitor and a second diode, being connected in parallel with said one armature coil, so that magnetic energy stored in the armature coil can be transferred through the second diode into the small-capacitance capacitor for charging and storage from a connecting point of said switching element and said armature coil in order to quickly reduce exciting current of said armature coil when said switching element is turned off at a terminal end of said position detecting signal;

a closed circuit obtained by connecting a connecting point interposed between said small-capacitance capacitor and said second diode and another connecting point interposing between a predetermined one of said armature coils and said first diode;

a semiconductor element for controlling current, interposed in a forward direction between a connecting point between at least said two armature coils included in said closed circuit and said first diode and a positive voltage terminal of said small-capacitance capacitor;

an electric circuit for transferring magnetic energy stored in one of the armature coils through said second diode into said small-capacitance capacitor for charging in order to quickly reduce exciting current of said armature coil when said switching element is turned off at a terminal end of said position detecting signal, and for discharging electrostatic energy stored in said small-capacitance capacitor through said semiconductor element into said armature coil from a connecting point of said first diode and said armature coil in order to quickly build up exciting current only in an initial time section synchronously with the activation of said switching element when said armature coil is again activated in response to the position detecting electric signal after said magnet rotor rotates by a predetermined angle;

a detecting circuit for detecting excitation current of respective armature coils exceeding a predetermined value and obtaining a current detection electric signal; and a chopper circuit for turning off said first switching element associated with said one armature coil in response to said current detection electric signal and for turning on said switching element after a predetermined time has elapsed so as to maintain armature coil current at a predetermined level.

11. A high-speed motor in accordance with claim 9, further comprising:

an electric circuitry for successively storing magnetic energy of said armature coil as electrostatic energy into said small-capacitance through said second diode in accordance with chopper frequency when said switching element is turned off during an operation of said chopper circuit.

12. A high-speed motor in accordance with claim 10, further comprising:

an electric circuitry for successively storing magnetic energy of said armature coil as electrostatic energy into said small-capacitance capacitor through said second diode in accordance with chopper frequency when said switching element is turned off during an operation of said chopper circuit.

* * * * *

UNITED STATES PATENT AND TRADEMARK OFFICE
CERTIFICATE OF CORRECTION

PATENT NO. : 5,406,184
DATED : April 11, 1995
INVENTOR(S) : I. Bahn

It is certified that error appears in the above-indentified patent and that said Letters Patent is hereby corrected as shown below:

Col. 1, line 64, delete "building" and insert therefor --build--.

Col. 2, line 13, after "to", second occurrence, insert --than--.

Col. 6, line 32, after "rotor", insert a comma (",").

Col. 7, line 37, delete "lay";   line 62, after "33b", delete the comma (",").

Col. 8, lines 4 and 10, after "34b, delete the commas (",");

Line 9, after "35b", delete the comma (",");

Line 25, after "44b", delete the comma (",").

Col. 13, line 49, after "17f", insert a comma (",").

Col. 14, line 31, after "signals,", delete the comma (",").

Col. 17, line 61, delete "1a, 1b", both occurrences, and insert therefor --1a-1h--.

Col. 19, line 16, delete "56aand" and insert therefor --56a and--.

Col. 28, line 14, delete the dash ("-") before "transistor";

UNITED STATES PATENT AND TRADEMARK OFFICE
CERTIFICATE OF CORRECTION

PATENT NO. : 5,406,184
DATED : April 11, 1995
INVENTOR(S) : I. Bahn

It is certified that error appears in the above-indentified patent and that said Letters Patent is hereby corrected as shown below:

Col. 45, line 34, delete "49b" and insert therefor --49c--;

Line 64, delete "20b" and "21b" and insert therefor --20c-- and 21c--, respectively;

Line 65, delete "41b" and insert therefor --41c--.

Col. 46, line 13, delete "3" and insert therefor --three--;

Col. 48, line 33, delete "or" and insert therefor --of--.

Col. 50, lines 64 and 65, delete "not less than three".

Signed and Sealed this

Nineteenth Day of September, 1995

Attest:

BRUCE LEHMAN

Attesting Officer  Commissioner of Patents and Trademarks